(12) United States Patent
Gauthier

(10) Patent No.: US 8,575,483 B2
(45) Date of Patent: Nov. 5, 2013

(54) ELECTRICAL BOX FOR INSTALLATION IN INSULATED CONCRETE FORM CONSTRUCTION

(75) Inventor: Sébastien Gauthier, La Prairie (CA)

(73) Assignee: Ipex Technologies Inc., Mississauga, Ontario (CA)

( * ) Notice: Subject to any disclaimer, the term of this patent is extended or adjusted under 35 U.S.C. 154(b) by 296 days.

(21) Appl. No.: 12/999,089

(22) PCT Filed: May 28, 2009

(86) PCT No.: PCT/US2009/045448
§ 371 (c)(1),
(2), (4) Date: Dec. 15, 2010

(87) PCT Pub. No.: WO2010/059267
PCT Pub. Date: May 27, 2010

(65) Prior Publication Data
US 2011/0108319 A1    May 12, 2011

Related U.S. Application Data

(60) Provisional application No. 61/117,439, filed on Nov. 24, 2008.

(51) Int. Cl.
*H01H 9/02*    (2006.01)
(52) U.S. Cl.
USPC ............. 174/58; 174/53; 174/50; 174/481; 220/3.2; 220/3.3; 248/906
(58) Field of Classification Search
USPC ........... 174/480, 481, 50, 53, 57, 58, 520, 61; 220/3.2–3.9, 4.02; 439/535, 536, 949; 248/906
See application file for complete search history.

(56) References Cited

U.S. PATENT DOCUMENTS

| | | | | |
|---|---|---|---|---|
| 5,550,322 A | * | 8/1996 | Tynan | 174/58 |
| 5,661,264 A | | 8/1997 | Reiker | |
| 6,641,423 B1 | | 11/2003 | Giro | |
| 6,831,228 B2 | * | 12/2004 | Lalancette et al. | 174/58 |
| 6,894,222 B2 | * | 5/2005 | Lalancette et al. | 174/58 |
| 6,932,628 B1 | | 8/2005 | Staedt | |
| 6,943,295 B2 | * | 9/2005 | Herth | 174/58 |
| 7,049,511 B2 | | 5/2006 | Gledhill et al. | |
| 7,075,004 B1 | * | 7/2006 | Gretz | 174/50 |
| 7,082,728 B1 | | 8/2006 | McConaughy et al. | |
| 7,173,184 B2 | * | 2/2007 | Hull et al. | 174/58 |
| 7,173,194 B2 | * | 2/2007 | Rupert | 174/481 |
| 7,323,638 B1 | | 1/2008 | Radosavljevic | |
| 7,381,891 B2 | | 6/2008 | Hull et al. | |
| 7,449,633 B2 | | 11/2008 | Lalancette et al. | |
| 7,595,446 B2 | * | 9/2009 | Turcovsky et al. | 174/50 |

* cited by examiner

OTHER PUBLICATIONS

International Search Report for Application No. PCT/US2009/0045448 mailed on Sep. 17, 2009, 5 pages.

*Primary Examiner* — Angel R Estrada
(74) *Attorney, Agent, or Firm* — K&L Gates LLP

(57) ABSTRACT

Various embodiments of an electrical box are provided for installation in insulated concrete forms ("ICFs") In at least one embodiment, the electrical box includes a container configured to receive an electrical device, and at least one anchoring member operably connected to the container In these embodiments, the anchoring member is movable between a storage position and an inserted position and the anchoring member is operable by a user without a tool Further, in these embodiments, the inserted position includes at least part of the anchoring member positioned outside the container such that the anchoring member is insertable into, for instance, a foam-based ICF Thus simple and efficient installation of electrical boxes in ICFs is provided.

28 Claims, 51 Drawing Sheets

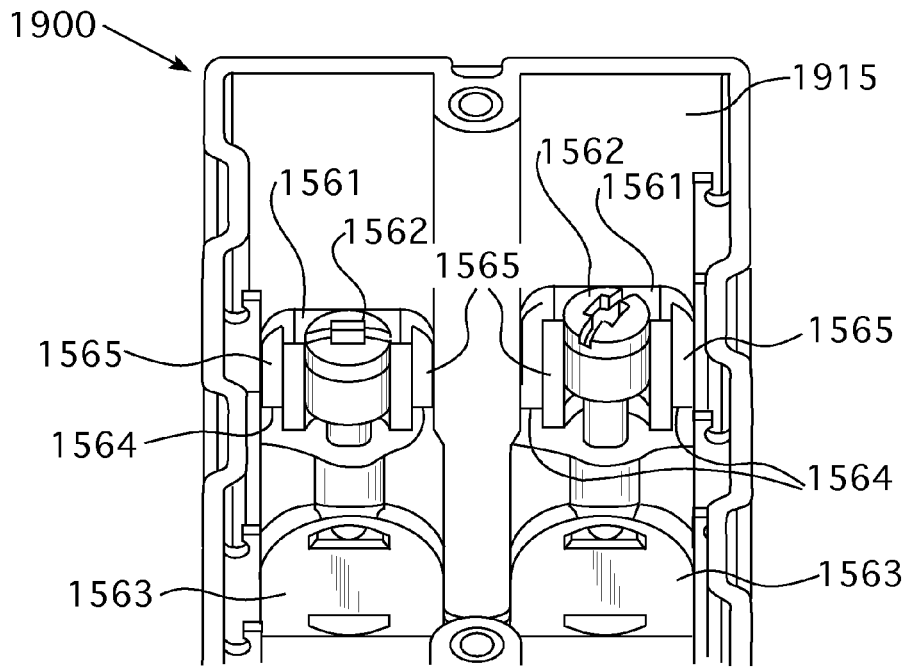
FIG. 82
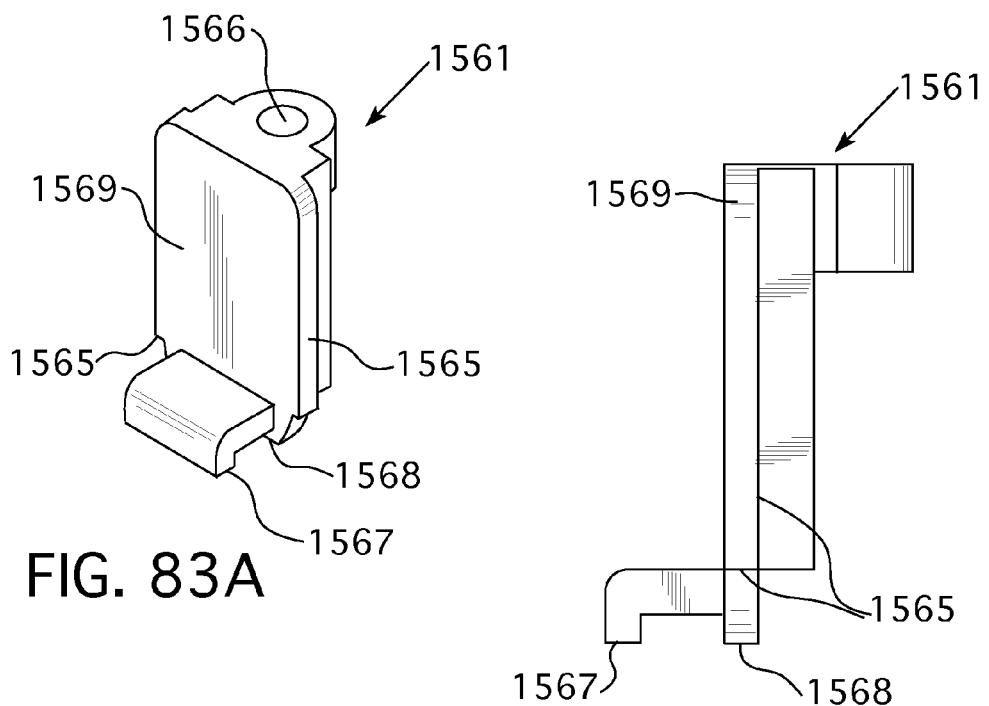
FIG. 83A
FIG. 83B

ELECTRICAL BOX FOR INSTALLATION IN INSULATED CONCRETE FORM CONSTRUCTION

RELATED APPLICATION

The present application claims the benefits of priority of U.S. Provisional Application No. 61/117,439, filed on Nov. 24, 2008, the disclosure of which is hereby incorporated herein by reference.

BACKGROUND

The present disclosure generally relates to electrical boxes for use in building construction and more particularly to an electrical box for installation in insulated concrete form construction.

Hollow foam blocks called insulating concrete forms or insulated concrete forms ("ICFs") are becoming increasingly popular to provide insulated concrete construction for residential as well as commercial structures. These hollow blocks weigh less than standard masonry blocks because they commonly are made of expanded polystyrene. They typically either stack together like large interconnecting, building blocks or are separate panels connected with plastic ties.

During construction, the forms are filled with concrete, becoming a permanent part of the wall assembly as well as adding approximately a two-inch thick layer of foam insulation to each side of the wall. Reinforcing bars can be added to enhance structural stability and provide, for instance, increased earthquake safety.

In more detail, insulated concrete forms typically are constructed from a foamed plastic and usually have a generally rectangular shape to facilitate interconnection. In a desirable variation thereof, separate extruded flat foamed plastic insulation boards are supported in an aligned, spaced opposing arrangement, forming constructed ICFs that define the thickness of the wall and forms the outer surfaces of the wall. As rows of such constructed formed ICFs are stacked, horizontal and vertical metal reinforcing bars (rebar) are installed inside the cavity. When the required height of ICF forms is attained, concrete is poured into the cavity defined between the insulation boards forming the walls of the ICF. After the concrete has cured, the concrete and rebar act as the structural members of the building. The foam ICFs are left in place to provide thermal and acoustic insulation, fire protection, space to run electrical conduit and plumbing, and backing for drywall, gypsum, and other similar board types on the interior walls and for stucco, brick, or other siding on the exterior walls.

After construction of the ICF walls, various additional items may be installed, such as the aforementioned electrical and plumbing systems. The electrical systems include electrical boxes that can support various electrical devices including, but not limited to, outlets and switches. Consequently, there is a need for improved electrical boxes for use in ICF construction. The foregoing discussion is intended only to illustrate some of the shortcomings present in the field of the invention at the time, and should not be taken as a disavowal of claim scope.

SUMMARY

In various embodiments, a method for installing an electrical box is provided. In at least one embodiment, the method can comprise the steps of placing the electrical box into an electrical box recess in an insulated concrete form, wherein the electrical box comprises a container configured to receive an electrical device and an anchoring member movably connected to the electrical box, and pressing on the anchoring member with a person's hand such that the anchoring member moves from a storage position to an inserted position. In these embodiments, the inserted position includes at least part of the anchoring member embedded in at least a portion of the insulated concrete form.

Also, in various embodiments, an electrical box is provided. In at least one embodiment, the electrical box can comprise a container configured to receive an electrical device and at least one anchoring member operably connected to the container. In these embodiments, the container comprises at least one wall, the at least one wall defines a hole therethrough, and the at least one wall defines an opening sized and configured to insertably receive the electrical device. Further, in these embodiments, the anchoring member is movable between a storage position and an inserted position and the anchoring member is movable between the storage position and the inserted position by a user without a tool. Additionally, in these embodiments, at least part of the anchoring member is positioned outside the container when in the inserted position and part of the anchoring member is positioned within the hole and the anchoring member is configured to anchor the container to an object outside the container when the anchoring member is in the inserted position.

In various embodiments, an electrical box is provided that can comprise a container configured to receive an electrical device, and at least one cantilevered anchoring member projecting from the container. In these embodiments, the container comprises at least one wall, the at least one wall defines an opening sized and configured to insertably receive the electrical device, and the anchoring member is configured to grip a surface when the surface applies an external force on the anchoring member towards the container.

In various embodiments, an electrical box is provided that can comprise a container configured to receive an electrical device, the container comprising at least one wall, the at least one wall defining an opening sized and configured to insertably receive the electrical device, at least one positioning tab projecting from the wall, and at least one anchoring member comprising helical threads extending from a user operable portion of the at least one anchoring member. In these embodiments, the at least one positioning tab defines a hole therethrough, wherein the at least one positioning tab includes at least one stop formed therein. Further, in these embodiments, the at least one anchoring member is configured to rotate in a first direction with respect to the at least one positioning tab such that the helical threads are advanced through the hole, and the at least one stop of the at least one positioning tab is configured to engage the user operable portion such that further rotation in the first direction is inhibited once the at least one anchoring member reaches a fully inserted position.

In various embodiments, an electrical box is provided that can comprise a container configured to receive an electrical device, the container including at least one wall, wherein the wall defines a hole therethrough, wherein the at least one wall defines an opening sized and configured to insertably receive the electrical device, and at least one anchoring member insertable through the hole. In these embodiments, the anchoring member is movable through the hole by a user without a tool. Further, in these embodiments, the at least one anchoring member comprises an anchoring wall and a cantilevered arm extending from the anchoring wall, wherein the cantilevered arm is configured to lock the at least one anchoring member against the at least one wall of the container when the anchoring member is in a fully inserted position through the hole.

In various embodiments, an electrical box is provided that can comprise a container configured to receive an electrical device, the container including at least one wall, wherein the at least one wall defines a port therethrough, wherein the port is sized and configured to insertably receive an electrical cable, wherein the at least one wall defines an opening sized and configured to insertably receive the electrical device, and a bracket clamp movably engaged with the container such that it may be moved within the port, wherein the bracket clamp comprises at least two legs protruding from a body, wherein the at least two legs are configured to engage an electrical cable when the bracket clamp is moved toward an electrical cable inserted in the port.

This Summary is intended to briefly outline certain embodiments of the subject application. It should be understood that the subject application is not limited to the embodiments disclosed in this Summary, and is intended to cover modifications that are within its spirit and scope, as defined by the claims. It should be further understood that this Summary should not be read or construed in a manner that will act to narrow the scope of the claims.

BRIEF DESCRIPTION OF THE FIGURES

The novel features of the various embodiments are set forth with particularity in the appended claims. The various embodiments, however, both as to organization and methods of operation, may best be understood by way of example with reference to the following description, taken in conjunction with the accompanying drawings as follows.

FIG. 82 is a partial perspective view of the interior of a non-limiting embodiment of a single-gang electrical box for installation in ICF with the anchoring members removed; the electrical box includes ports and plastic bracket clamps configured to receive either metallic sheathed cables or non-metallic sheathed cables without requiring alteration of the bracket clamps.

FIG. 83A is a perspective view of a non-limiting embodiment of a bracket clamp that is configured to engage an electric cable.

FIG. 83B is a side view of the bracket clamp of FIG. 83A.

DETAILED DESCRIPTION

Figure 1:
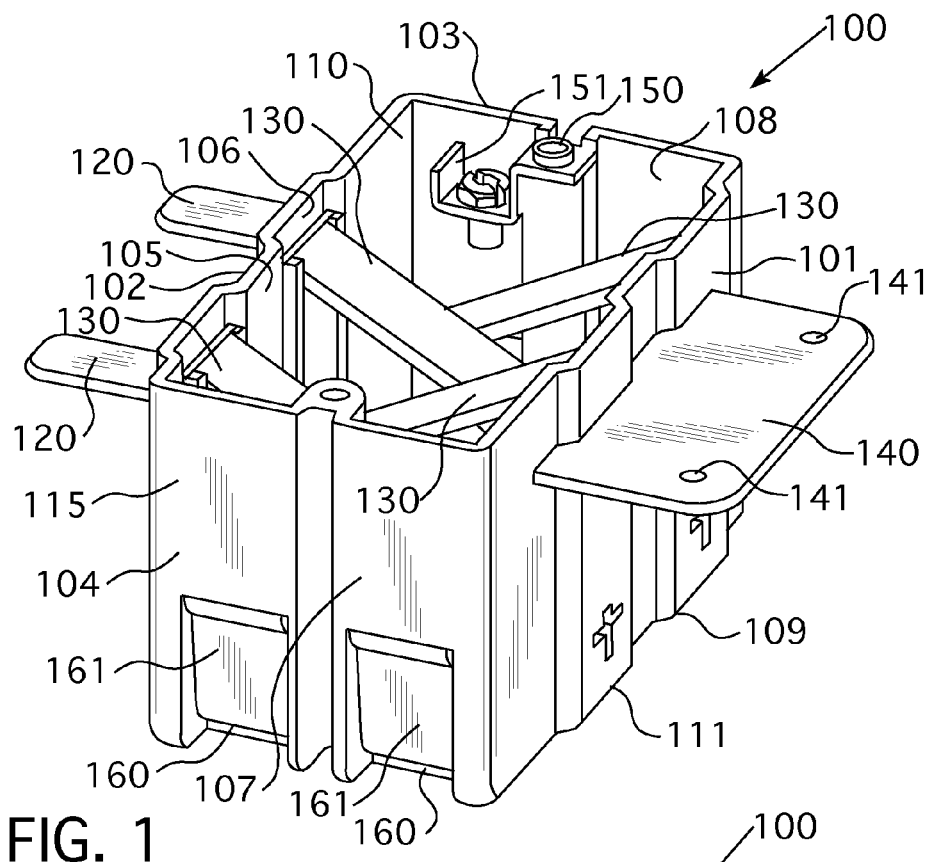
FIG. 1 is a perspective view of a non-limiting embodiment of an electrical box for installation in ICF with four anchoring members in storage positions.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present invention is defined solely by the claims. The features illustrated or described in connection with one exemplary embodiment may be combined with the features of other embodiments. Such modifications and variations are intended to be included within the scope of the present invention.

Before explaining the various embodiments in detail, it should be noted that the embodiments are not limited in their application or use to the details of construction and arrangement of parts illustrated in the accompanying drawings and description. The illustrative embodiments may be implemented or incorporated in other embodiments, variations, and modifications, and may be practiced or carried out in various ways. The following description, in conjunction with the accompanying drawings, are intended to convey all such modifications and variations.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. The description below is for the purpose of describing various embodiments of the invention and is not intended to limit the invention thereto.

The various embodiments described herein are directed to electrical boxes and more particularly to electrical boxes for installation in insulated concrete forms ("ICFs"). An exemplary, but non-limiting, ICF system is described in U.S. Pat. No. 6,170,220 to Moore, titled "Insulated concrete form," hereby incorporated by reference in its entirety. The various embodiments provide methods and devices useful in various buildings, including both commercial and residential construction. For example, in at least one embodiment, after preparing a recess in a foam-based ICF wall, an electrical box may be installed in the recess of the foam without the use of tools. A person may only need to use his or her hands to securely install the electrical box in the ICF. A variety of electrical box form factors are possible, including without limitation, single-gang, double-gang, and/or triple-gang electrical boxes and/or electrical boxes configured to support either or both metallic and non-metallic sheathed cables. These and other embodiments are now illustrated and described with reference to the following figures.

The term "box" as used herein describes a variety of containers and receptacles. When no specific shape is described, a typical rectangular box may be expected. Nevertheless, a box may have a horizontal cross section that is square, elongated, round or oval, sloped or domed top surfaces, or non-vertical sides.

Focusing now on at least one embodiment, an electrical box may be provided to a user with one or more anchoring members initially in storage positions. The electrical box may comprise a container configured to receive an electrical device and at least one anchoring member operably connected to the container such that the anchoring member is movable between a storage position and an inserted position. The anchoring member may be operable by a user without a tool. FIG. 1 is a perspective view of a non-limiting embodiment of an electrical box 100 for installation in ICF with four anchoring members 130 in storage positions. The electrical box 100 includes a container 115 that may be configured to receive at least one electrical device and at least one anchoring member 130 that is operably connected to the container 115 such that each anchoring member 130 is movable between a storage position and an inserted position. Exemplary electrical devices include, but are not limited to, electrical outlets, switches, receptacles, sockets, light switches, wall fixtures, ceiling fixtures, electrical junctions, control circuits, on-off switches, dimmer switches, ceiling fans, ceiling lights, wall lights, electrical components, and other electrical connections and/or controls. The container 115 has a front 110 and a back 111 and at least one side wall including first wall 101, second wall 102, third wall 103, and fourth wall 104. Further, the back 111 of the container 115 includes a fifth wall 109. The electrical box 100 includes various ports 160 in the container 115 such that wiring may be positioned through a wall of the container 115 to electrically connect to a received electrical device. Each port 160 may be configured to receive either non-metallic sheathed cables (e.g. ROMEX®, "NM" or "NMD" cables) or metallic sheathed cables (e.g. "armored" or "BX" cables). In an embodiment of FIG. 1, two ports 160 are formed at least partially in each of walls 103, 104 for a total of four such ports 160. Port 160 may be adapted to receive non-metallic sheathed cables and may include a clamp 161, which as shown in FIG. 1, may be molded integrally in a wall or walls of container 115 such that the clamp 161 elastically deflects when a wiring cable is passed therethrough. The integrally molded clamp 161 acts similar to a cantilever beam and, once displaced from its illustrated position, provides a clamping force to at least partially hold a cable inserted into the container 115. Further, the container may be configured to receive one or more electrical devices; in FIG. 1, the container is designed to hold one such electrical device.

The side walls 101, 102, 103, 104 define an opening 112 in the top 110 of the container 115 that is sized appropriately to receive the aforementioned electrical device or devices. The side walls 101, 102, 103, 104 have interior surfaces 108 that face an interior of the container 115 and exterior surfaces 107 that face out and away from the container 115. The interior surfaces may include one or more extensions 105 and/or recesses 106 that, as is explained in more detail below, provide locations for at least one anchoring member to reside in an inserted position.

The electrical box 100 may also include at least one set of metallic grounding components 151 mounted appropriately to the container 115 via a grounding fastener hole 150 in the same. Further, the electrical box 100 may comprise one or more positioning tabs to assist with maintaining an appropriate installation depth and/or position for the electrical box 100. In the embodiment of FIG. 1, two relatively small positioning tabs 120 abut and protrude out of the second wall 102 and one relatively large positioning tab 140 abuts and protrudes out of the first wall 101 of the container 115. In at least one embodiment, large positioning tab 140 includes two fastener holes 141 that serve to help mount the electrical box against an object when usage of one or more of the anchoring members 130 is impractical and is discussed in more detail below.

Figure 2:
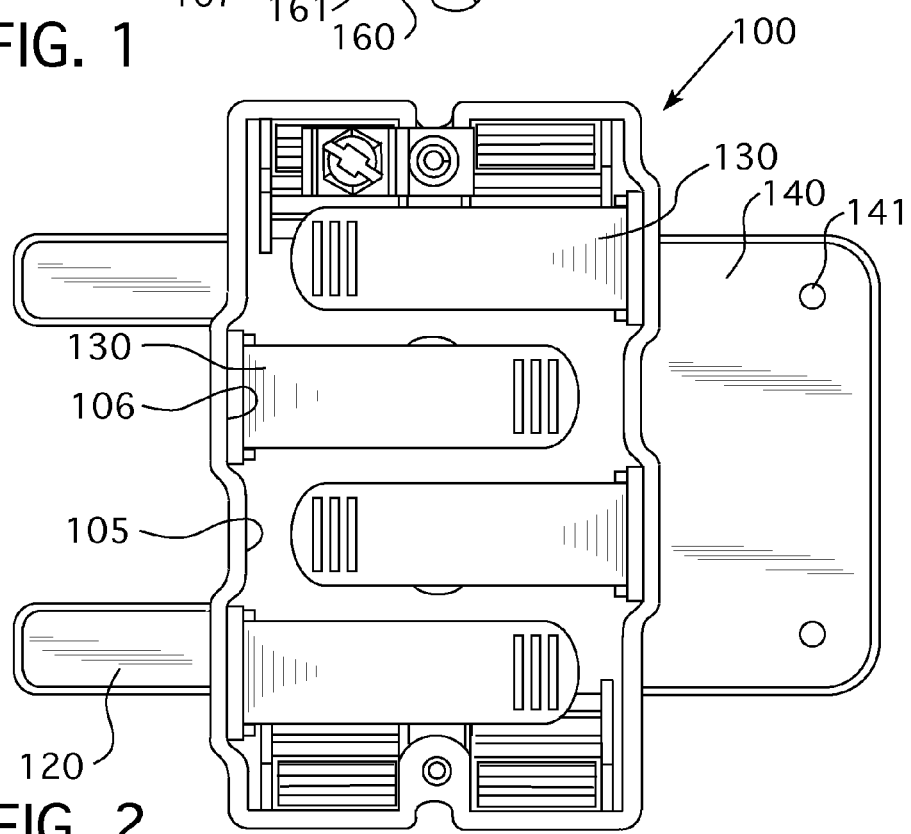
FIG. 2 is a front view of the electrical box of FIG. 1.

FIG. 2 is a front view of the electrical box 100 of FIG. 1. The side walls 101, 102, 103, 104 and the interior surface extensions 105 and the interior surface recesses 106 of the container can be seen. Each anchoring member 130 sits in a storage position and may be rotatably or hingedly mounted to the container 115 such that the at least part of the anchoring member 130 sits in a recess 106. As will be explained in more detail below, the storage position may include some or the entire anchoring member being positioned inside container 115 and may include the entire anchoring member 130 positioned inside the container 115. Contrarily, the inserted position may include some or the entire anchoring member being positioned outside container 115 and may include part of the anchoring member 130 positioned outside the container 115 and part of the anchoring member 130 positioned inside the container 115.

Figure 3:
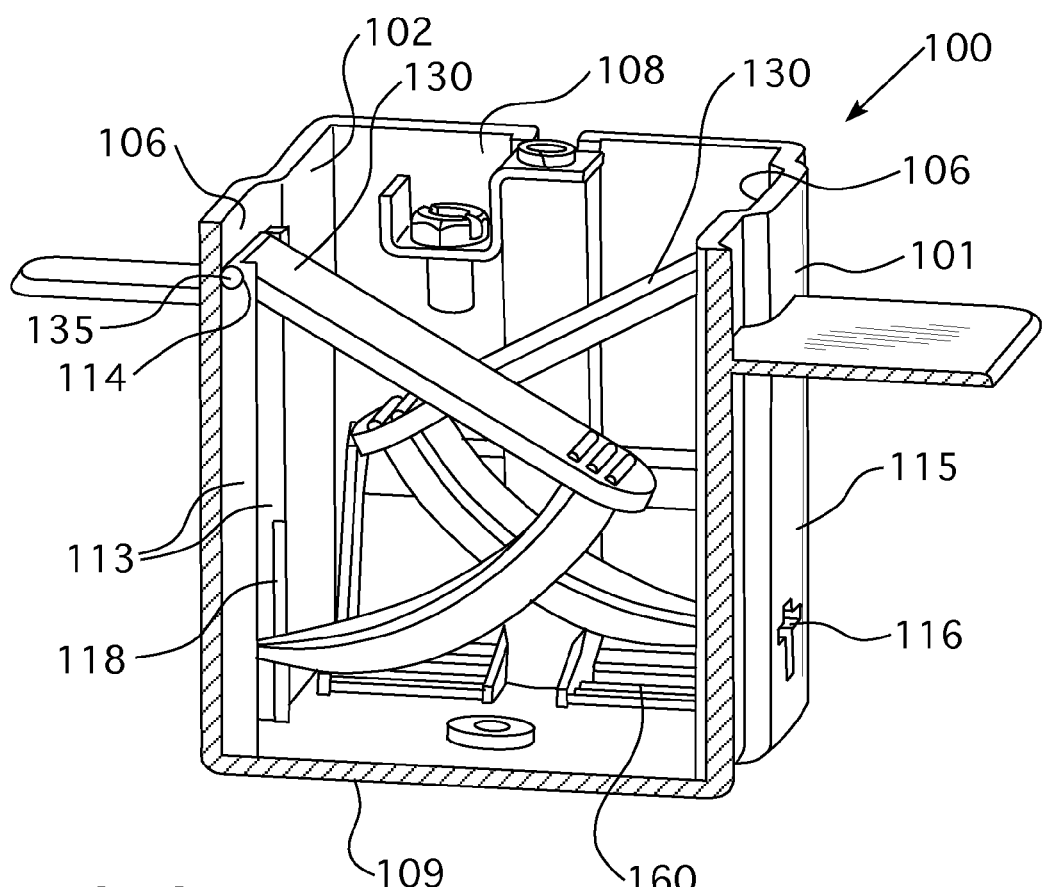
FIG. 3 is a perspective cross-sectional view of the electrical box of FIG. 1 showing two anchoring members in storage positions.

FIG. 3 is a perspective cross-sectional view of the electrical box 100 of FIG. 1 showing two anchoring members 130 in storage positions. Abutting a recess 106 of the interior surface 108 of either side walls 101, 102 may be at least one pair of anchoring member support walls 113. Each support wall 113 may be attached to one of side walls 101, 102 and disconnected from the fifth wall 109 such that each support wall 113 may elastically deflect away from its respective pairing support wall 113. Formed and facing each other in each pair of support walls 113 are anchoring member catches 118 that, as explained below, serve to hold anchoring member 130 in an inserted position after installation in an ICF. Also formed in the upper portion of the anchoring member support walls 113 and partially defined by side walls 101, 102 of the container 115 are anchoring member hinges 114. Each anchoring member 130 includes hinge protrusions 135 that cooperate with hinges 114 to form a hinged joint upon which each anchoring member 130 may rotate with respect to side walls 101, 102. In other words, each set of hinges 114 holds an anchoring member 130 and container 115 together such that an anchoring member 130 may swing relative to the container 115. In at least one embodiment, this rotational motion may be about an axis that is parallel to a plane defined by opening 112 of the container 115, for example. Further, the side walls 101, 102 each have at least one wall hole 116 defined therein adapted to receive insertably an anchoring member 130 during movement to and once located in the inserted position. The wiring ports 160 can also be seen from the inside of the container 115.

Figure 4:
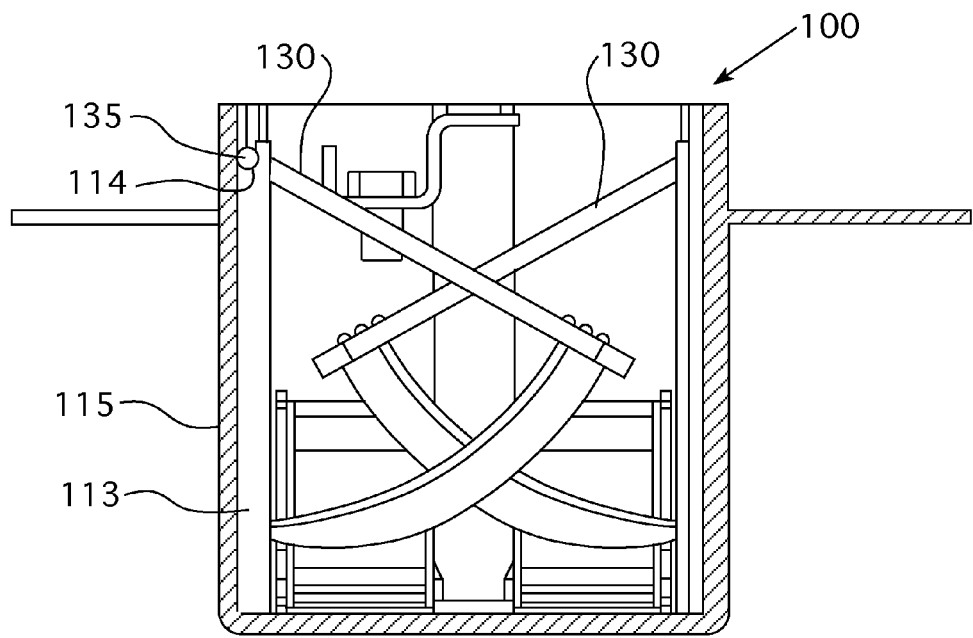
FIG. 4 is a cross-sectional view of the electrical box of FIG. 1, taken along the same section as that of FIG. 3.
Figure 5:
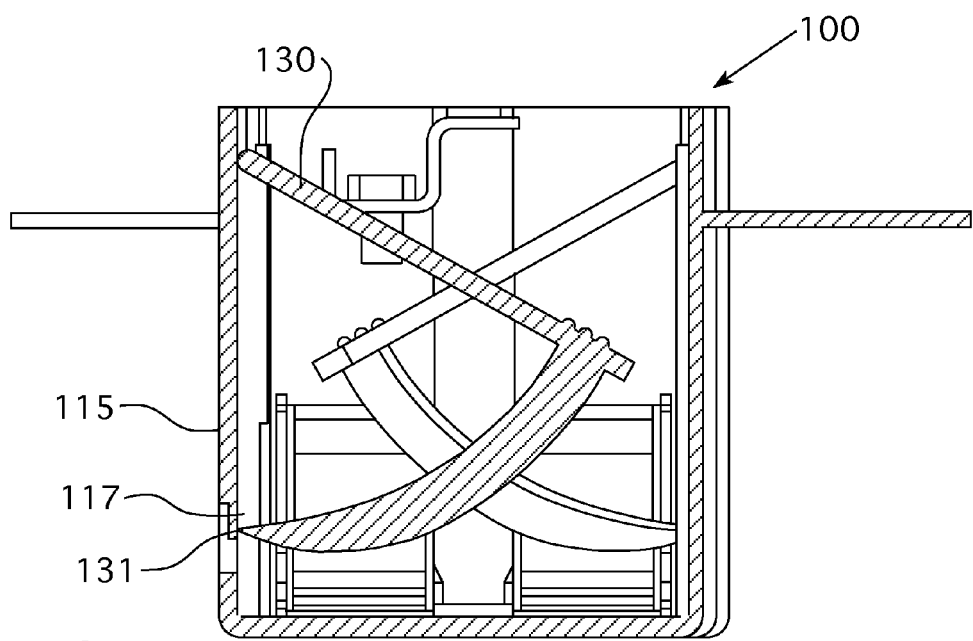
FIG. 5 is a cross-sectional view of the electrical box of FIG. 1, taken along a mid-plane of one of the anchoring members.

In various embodiments, the electrical box may include a stop configured to releasably hold an anchoring member in a storage position. For example, with reference now to FIGS. 4 and 5, FIG. 4 is a cross-sectional view of the electrical box 100 of FIG. 1, taken along the same section as that of FIG. 3. FIG. 5 is a cross-sectional view of the electrical box 100 of FIG. 1, taken along a mid-plane of one of the anchoring members 130. In at least one embodiment, each anchoring member 130 may include a tip 131 that contacts a deformable storage stop 117 when each anchoring member 130 is in a storage position. The storage stop 117 may be formed in side wall 102 and extend into the wall hole 116 such that stop 117 resists anchoring member 130 from passing through wall hole 116 and holds the anchoring member 130 entirely inside container. As will be explained in more detail below, the tip 131 of anchoring member 130 may elastically bend and/or permanently deform the storage stop 117 when a user applies sufficient force to the anchoring member such that it swings about hinge 114 from the storage position shown in FIG. 4 past the storage stop 117, through the wall hole 116, and to an inserted position seen in FIGS. 8-14 and described below. Alternatively, the storage stop 117 may be omitted and hinge protrusions 135 of anchoring member 130 and hinges 114 of container 115 may be sized such that there is sufficient friction between the container 115 and the anchoring member 130 so that the anchoring member 130 resists freely moving, without external force. In other words, friction between portions of the anchoring member 130 and container 115 may releasably hold the anchoring members 130 in the storage positions and thus remove the need for a storage stop.

Figure 6:
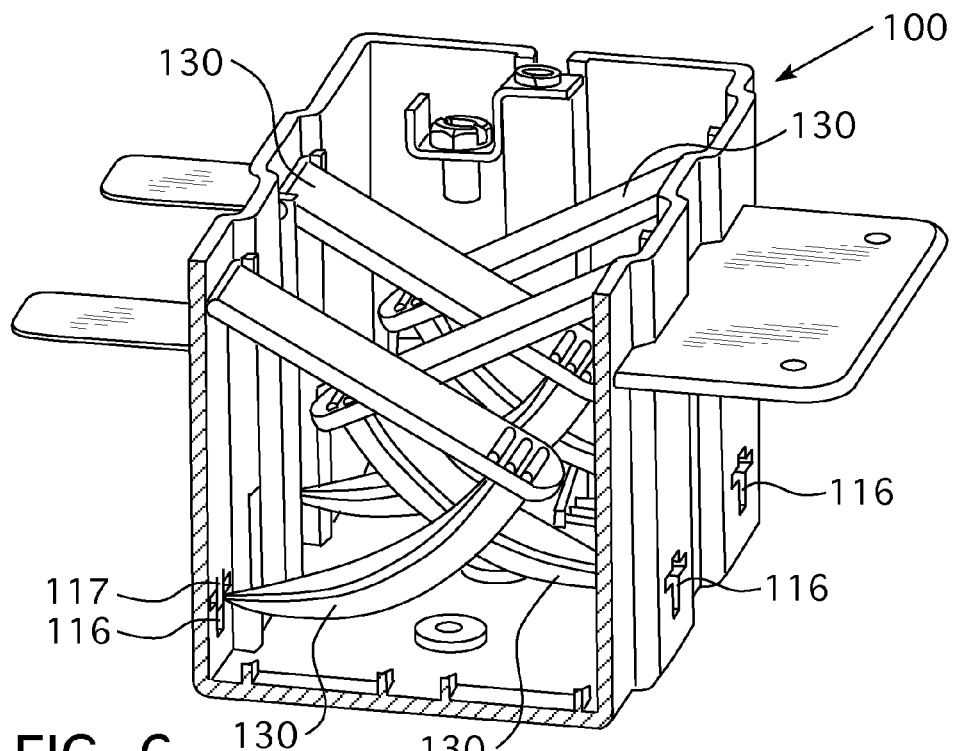
FIG. 6 is another perspective cross-sectional view of the electrical box of FIG. 1, showing the four anchoring members in storage positions.
Figure 7:
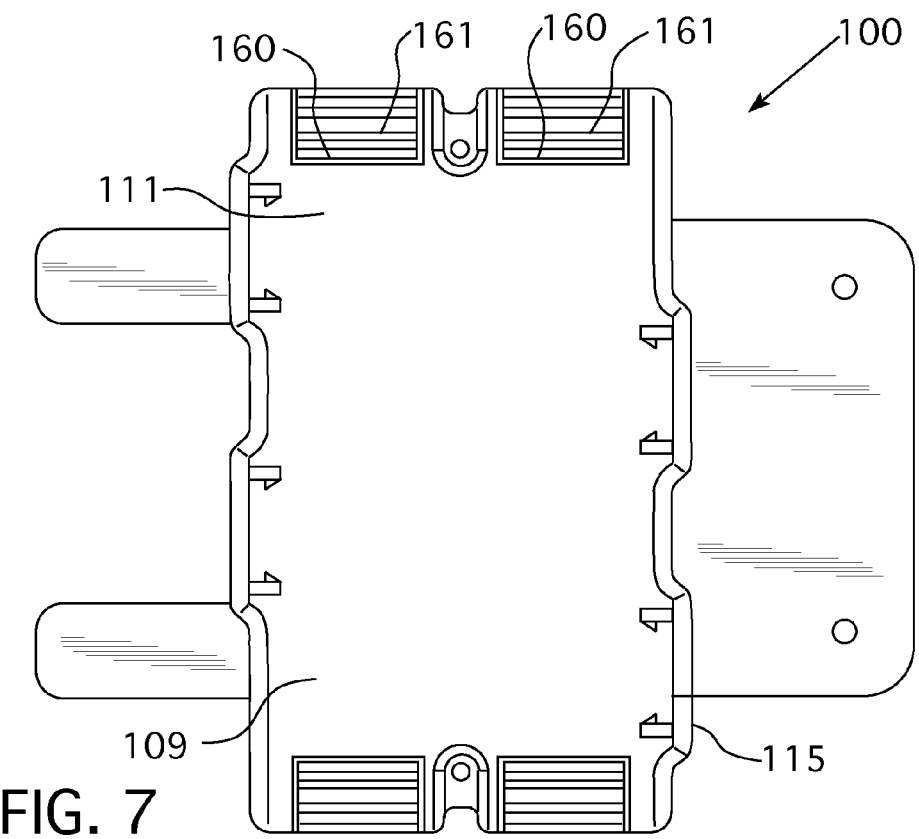
FIG. 7 is a back view of the electrical box of FIG. 1.

FIG. 6 is another perspective cross-sectional view of the electrical box 100 of FIG. 1, showing the four anchoring members 130 in storage positions. FIG. 7 is a back view of the electrical box 100 of FIG. 1. Fifth wall 109 can be seen forming the back 111 of the container 115 and wiring ports 160, including clamps 161, can also be seen.

Figure 8:
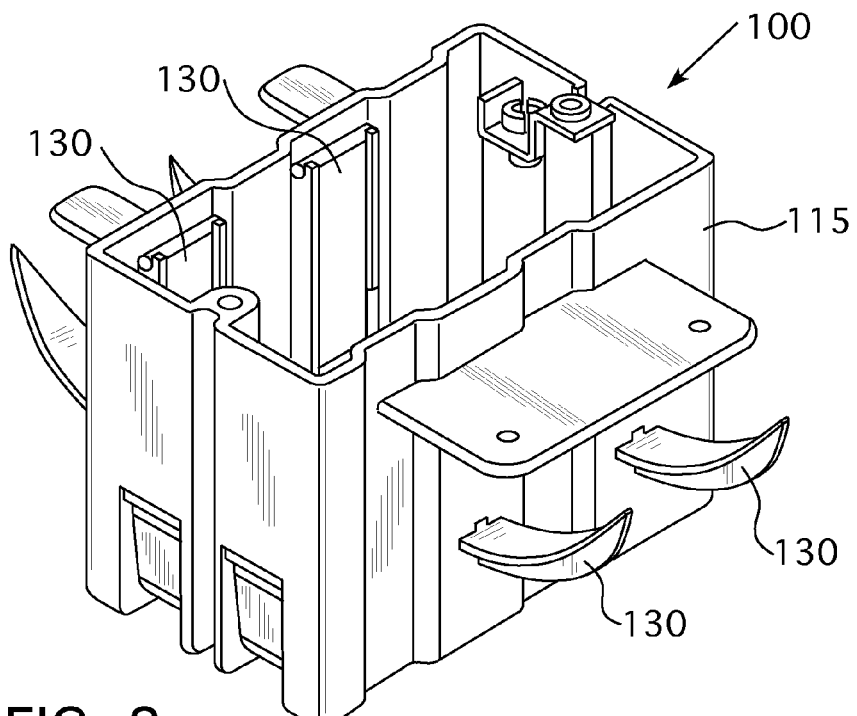
FIG. 8 is a perspective view of a non-limiting embodiment of an electrical box for installation in ICF with four anchoring members in inserted positions.

At least one embodiment includes the method of installing an electrical box into ICF construction by a user placing an electrical box into a prepared electrical box recess in the ICF and then causing one or more anchoring members to become embedded in the material of the ICF, without usage of a tool, by using his or her finger or fingers, thumb or thumbs, and/or hand or hands to press at least one anchoring member into an inserted position. As used herein, the term "hand" includes, but is not limited to, a person's digit or digits, i.e. one or more fingers and/or thumbs, and/or another part of a person's hand, such as his or her palm or knuckle. The inserted position may include at least part of the anchoring member positioned outside the container. FIG. 8 is a perspective view of a non-limiting embodiment of an electrical box 100 for installation in ICF with four anchoring members 130 in inserted positions. In each respective inserted position, at least part of the anchoring member 130 is positioned outside the container 115. The portion of each anchoring member 130 extending outside the container 115 is designed to penetrate and become embedded in the material of the ICF, which includes, but is not limited to, foam such as expanded polystyrene ("EPS") or STYROFOAM™.

Figure 9:
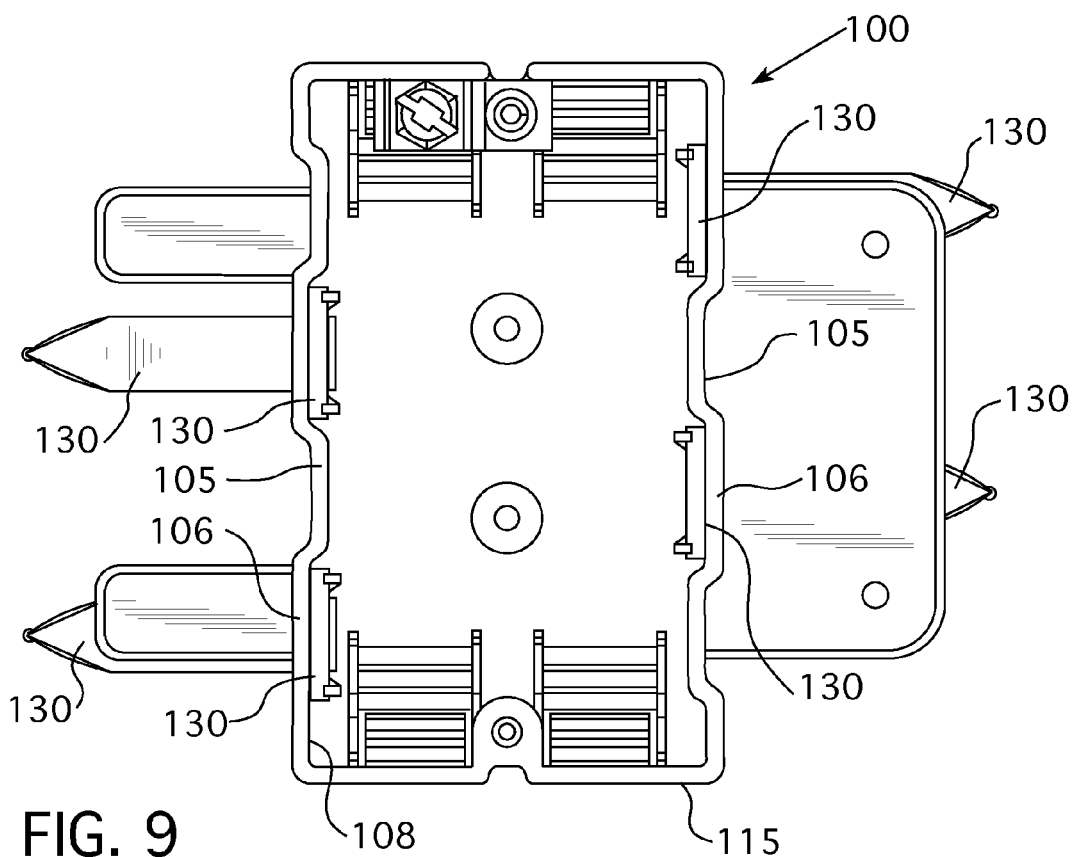
FIG. 9 is a front view of the electrical box of FIG. 8.

FIG. 9 is a front view of the electrical box 100 of FIG. 8. In this embodiment, the portion of anchoring members 130 remaining inside the container 115 are nested within recesses 106 of the container's 115 interior surfaces 108. This design provides that the interior space of the container 115 available for receiving electrical devices is not hindered by the portions of the anchoring members 130 remaining inside the container 115 when the anchoring members are in inserted positions as shown. Extensions 105 of the interior surfaces 108 are approximately flush with the anchoring member support walls 113 (not shown). Accordingly, recesses 106 may provide reduction of obstacles that could hinder installation of an electrical device, such as an outlet or switch, in the electrical box 100 once installed in ICF construction.

Figure 10:
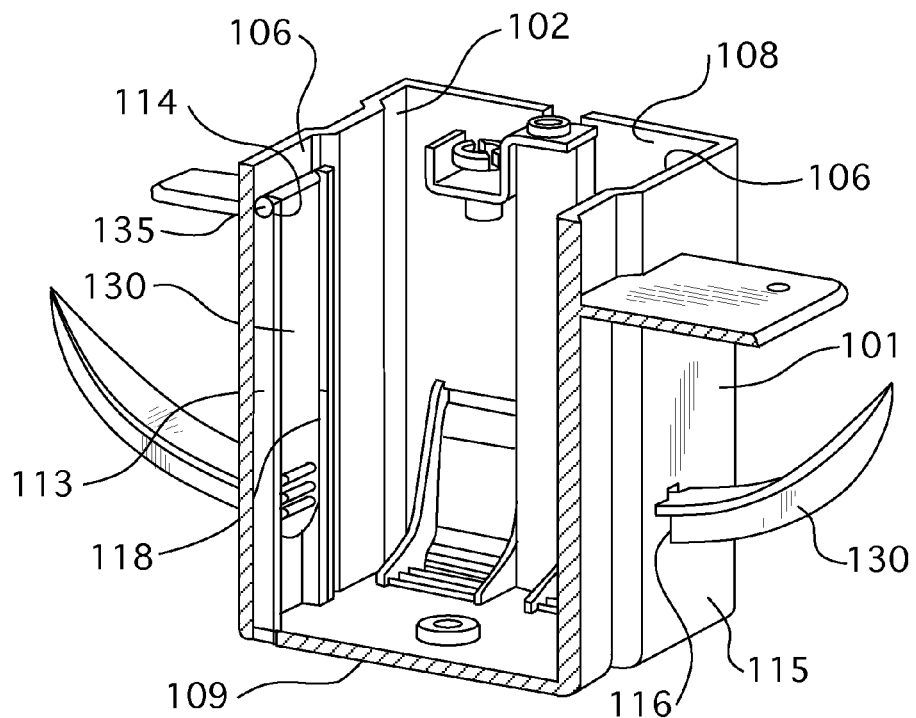
FIG. 10 is a perspective cross-sectional view of the electrical box of FIG. 8 showing two anchoring members in inserted positions.

FIG. 10 is a perspective cross-sectional view of the electrical box 100 of FIG. 8 showing two anchoring members 130 in inserted positions. Abutting a recess 106 of the interior surface 108 of either side walls 101, 102 are pairs of anchoring member support walls 113 that provide support to the anchoring members. Each support wall 113 may be attached to one of side walls 101, 102 and disconnected from the fifth wall 109 such that each support wall 113 may deflect elastically away from its respective pairing support wall 113. Formed and facing each other in each pair of support walls 113 may be anchoring member catches 118 that serve to hold anchoring member 130 in the shown inserted position after installation in an ICF. Briefly, a user may press an anchoring member 130 toward the inserted position such that part of the anchoring member contacts at least one, but in at least one embodiment, two catches 118. Each catch 118 may have a beveled shape such that contact with an anchoring member 130, while the latter is being pressed toward the inserted position, causes a support wall 113 to deflect elastically away from anchoring member 130. After the portion of anchoring member contacting the catch 118 is moved past the catch 118, the support wall 113 may bend or snap back into its original position, thereby holding the anchoring member in an inserted position. Also formed in the upper portion of the anchoring member support walls 113 and partially defined by side walls 101, 102 of the container 115 are anchoring member hinges 114. Each anchoring member 130 includes hinge protrusions 135 that cooperate with hinges 114 to form a hinged joint upon which each anchoring member 130 may rotate with respect to side walls 101, 102. In other words, each set of hinges 114 holds an anchoring member 130 and container 115 together such that an anchoring member 130 may swing relative to the container 115. Further, the side walls 101, 102 may each have at least one wall hole 116 adapted to insertably receive an anchoring member 130 during movement to and once located in the inserted position. Each wall hole 116 may be shaped complimentarily to guide and support an anchoring member 130. In other words, the wall hole 116 may be congruent in shape to the portion of the anchoring member 130 passing therethrough.

Figure 11:
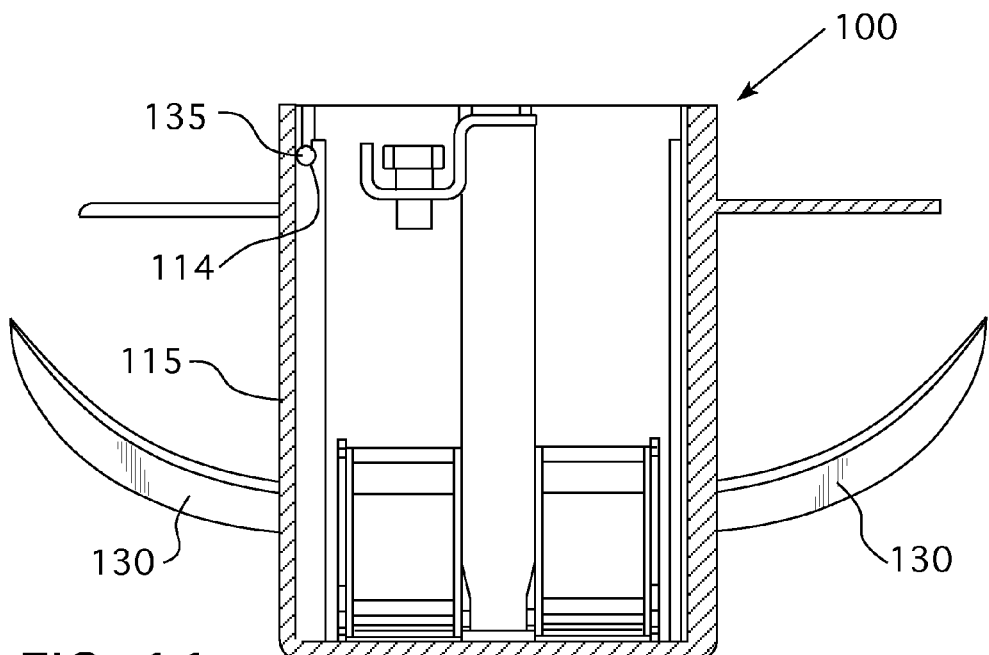
FIG. 11 is a cross-sectional view of the electrical box of FIG. 8, taken along the same section as that of FIG. 10.
Figure 12:
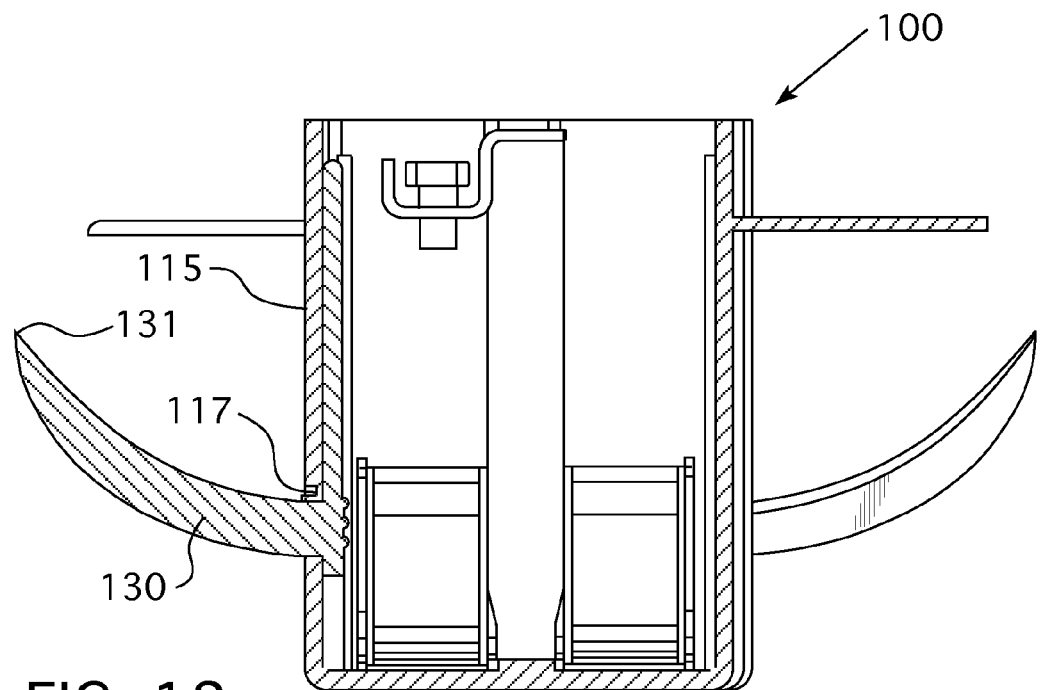
FIG. 12 is a cross-sectional view of the electrical box of FIG. 8, taken along a mid-plane of one of the anchoring members.

FIG. 11 is a cross-sectional view of the electrical box of FIG. 8, taken along the same section as that of FIG. 3. FIG. 12 is a cross-sectional view of the electrical box of FIG. 8, taken along a mid-plane of one of the anchoring members. During movement to the inserted position, an anchoring member 130 bent and/or permanently deformed the storage stop 117 from stop's 117 non-deformed position shown in FIG. 4 to stop's 117 deformed position shown in FIG. 12. The deformation of storage stop 117 may have occurred when a user applied force to the anchoring member such that the anchoring member 130 swung about hinge 114 from the storage position shown in FIG. 4 past the storage stop 117, through the wall hole 116 to the inserted position seen in FIG. 12.

Figure 13:
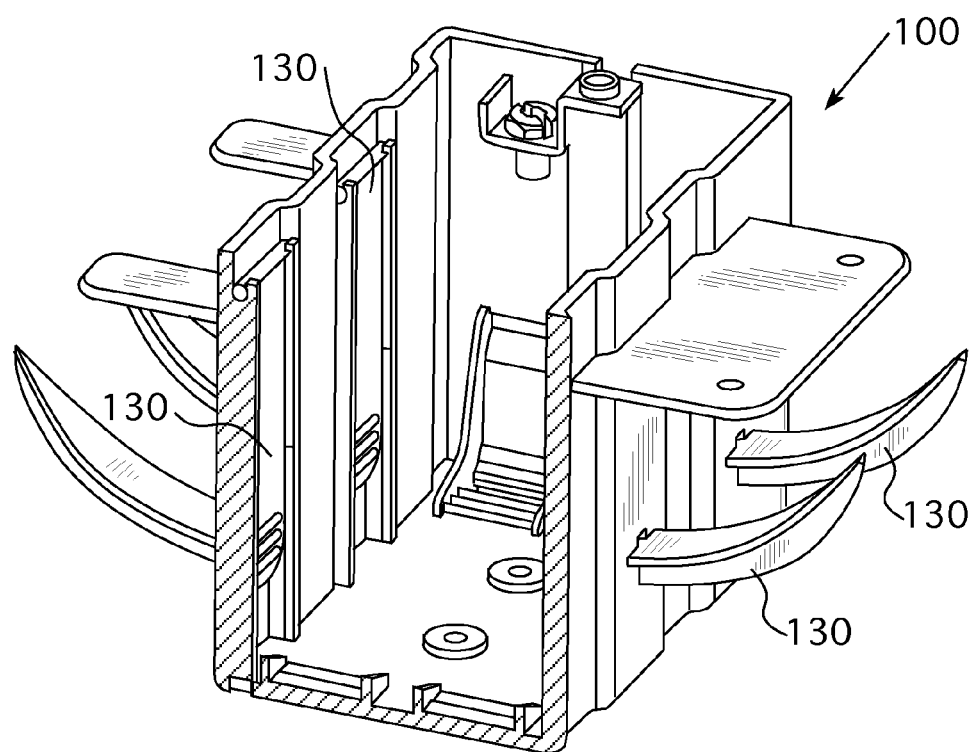
FIG. 13 is another perspective cross-sectional view of the electrical box of FIG. 8, showing the four anchoring members in inserted positions.
Figure 14:
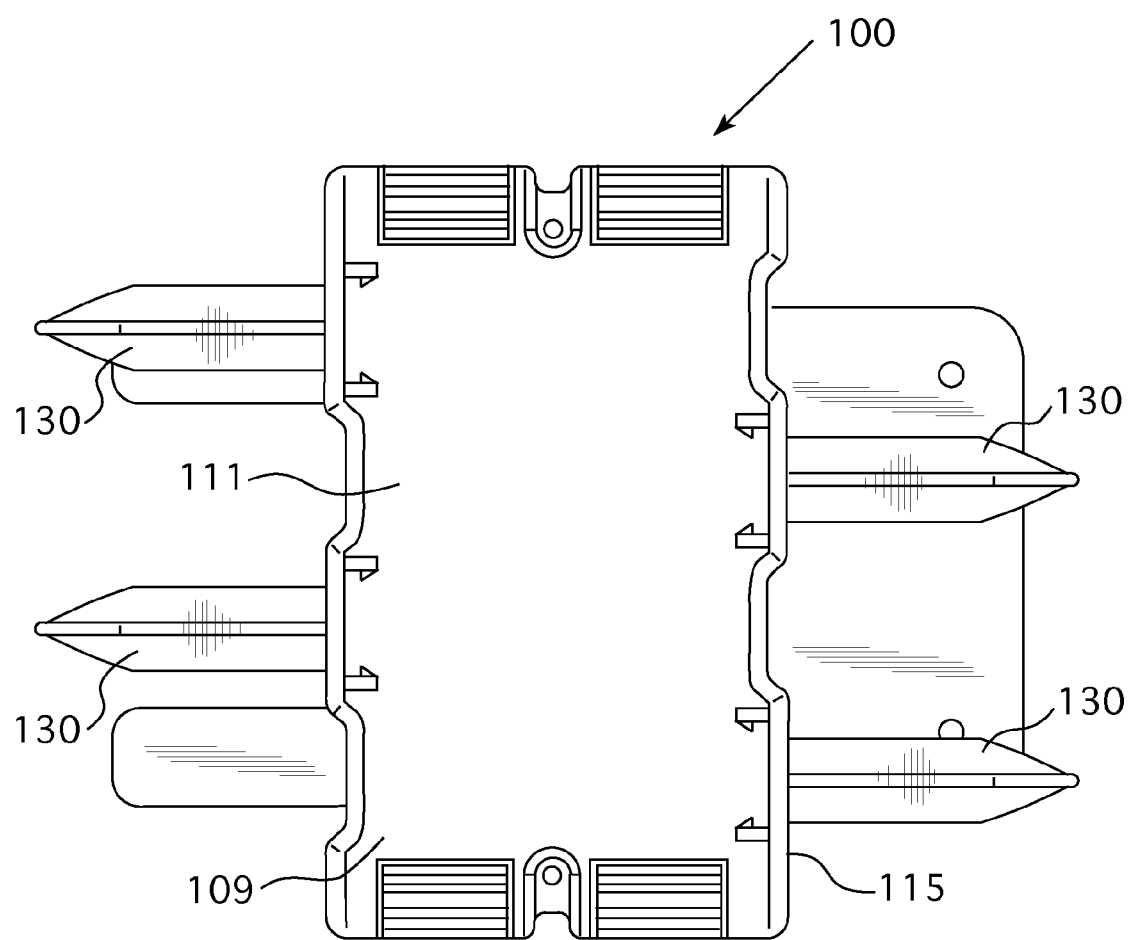
FIG. 14 is a back view of the electrical box of FIG. 8.

FIG. 13 is another perspective cross-sectional view of the electrical box of FIG. 8, showing the four anchoring members in inserted positions. FIG. 14 is a back view of the electrical box of FIG. 8. Fifth wall 109 can be seen forming the back 111 of the container 115 and anchoring members 130 can be seen protruding out from the container 115.

Figure 15A:
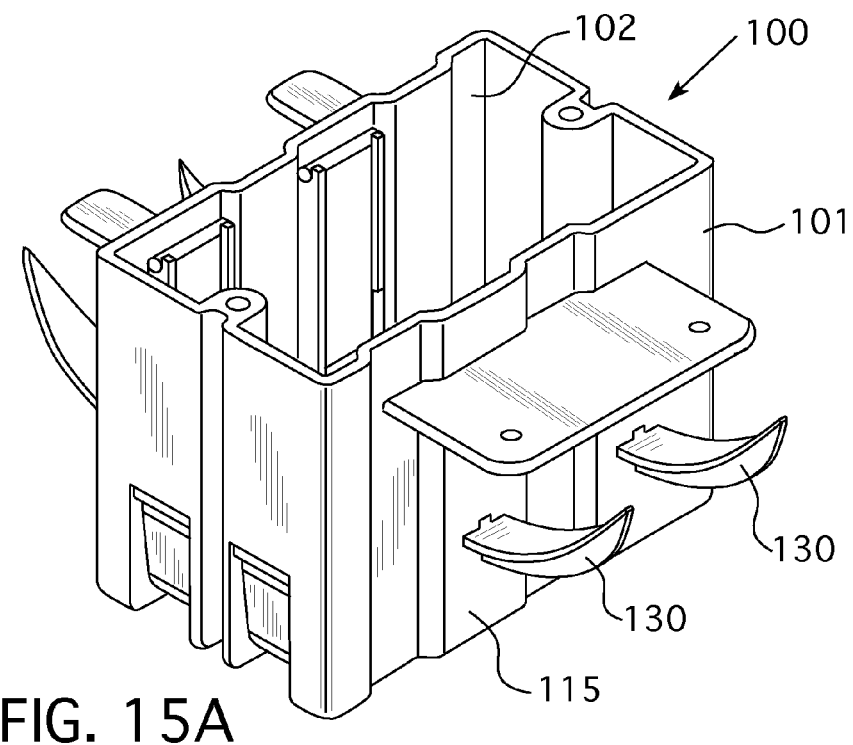
FIG. 15A is a perspective view of a non-limiting embodiment of an electrical box for installation in ICF with four anchoring members in inserted positions and with the box having side walls that are not substantially flat.
Figure 15B:
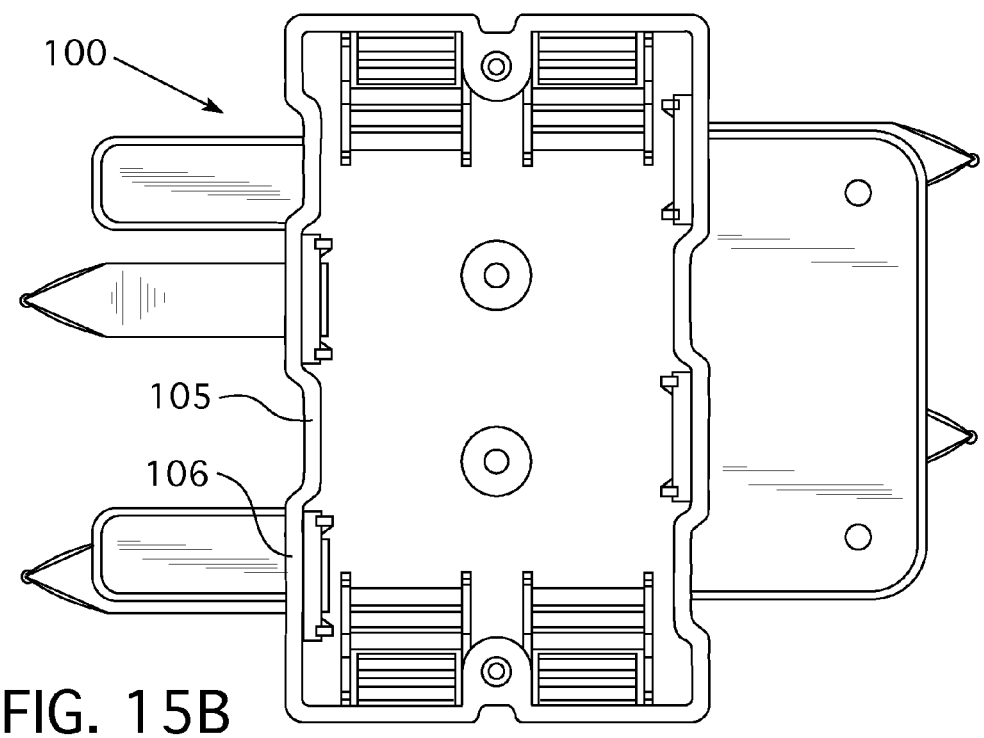
FIG. 15B is a front view of the electrical box of FIG. 15A.

FIG. 15A is a perspective view of a non-limiting embodiment of an electrical box 100 for installation in ICF with four anchoring members in inserted positions and with the box having side walls 101, 102 that are not substantially flat. FIG. 15B is a front view of the electrical box 100 of FIG. 15A. Interior surface recesses 106 and extensions 105 are shown creating at least part of each non-flat side wall 101, 102. As explained above, the recesses 106 receive the anchoring members 130 such that the interior space of the container 115 presents minimal obstacles to the installation of an electrical device in the electrical box 100.

Figure 16A:
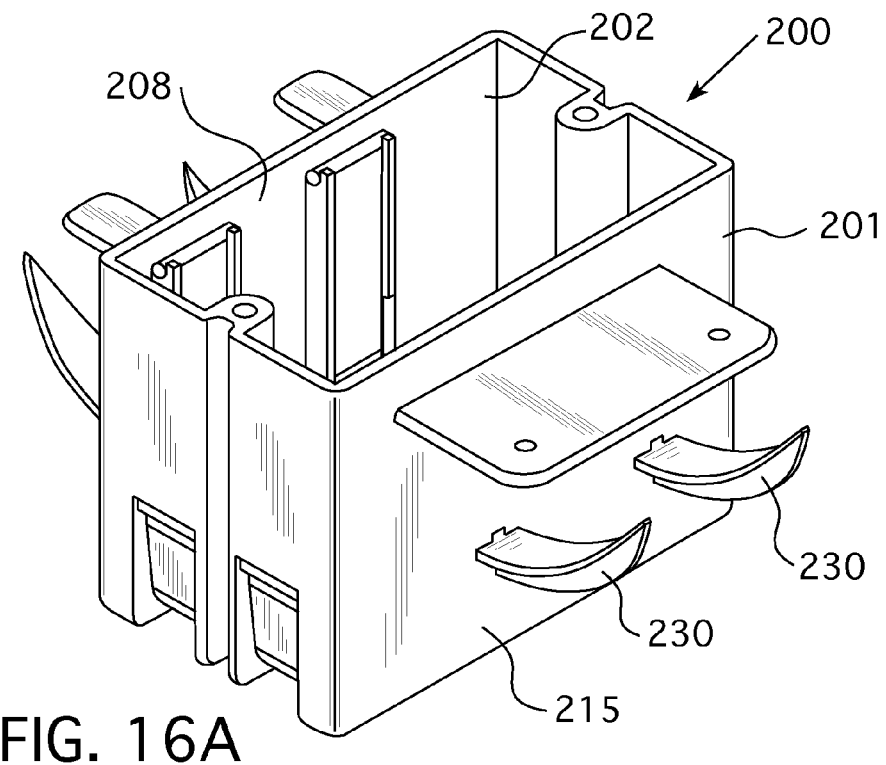
FIG. 16A is a perspective view of a non-limiting embodiment of an electrical box for installation in ICF with four anchoring members in inserted positions and with the box having side walls that are substantially flat.
Figure 16B:
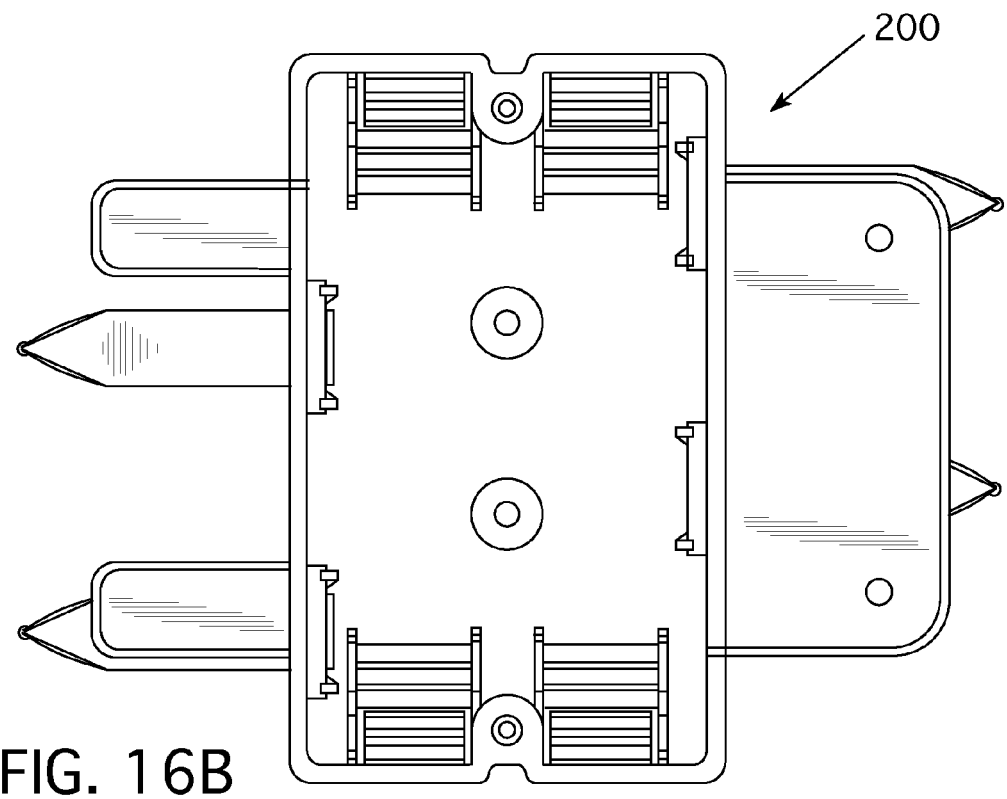
FIG. 16B is a front view of the electrical box of FIG. 16A.

FIG. 16A is a perspective view of a non-limiting embodiment of an electrical box 200 for installation in ICF with four anchoring members 130 in inserted positions and with the box having side walls that are substantially flat. Electrical box 200 is similar to electrical box 100 described above except that interior surfaces 208 of side walls 201, 202 do not include recesses or extensions thereby maximizing the interior volume of container 215. FIG. 16B is a front view of the electrical box of FIG. 16A.

Figure 17:
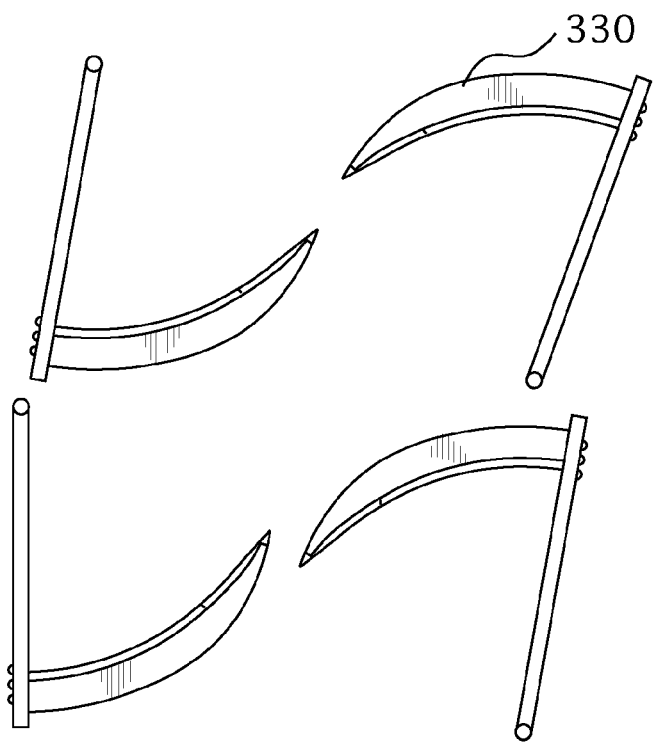
FIG. 17 is an illustration of four anchoring members before assembling in a container of an electrical box.
Figure 18:
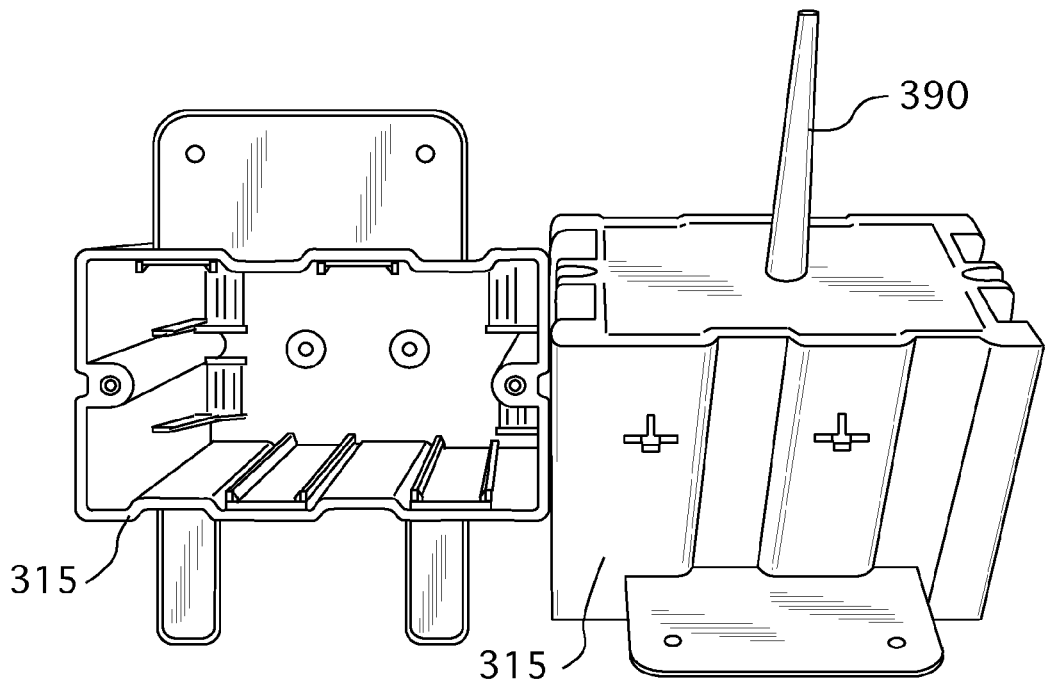
FIG. 18 is an illustration of two containers of single-gang electrical boxes before assembling each with four anchoring members; the container on the right-hand side of the figure still has excess material remaining from a molding process.
Figure 19:
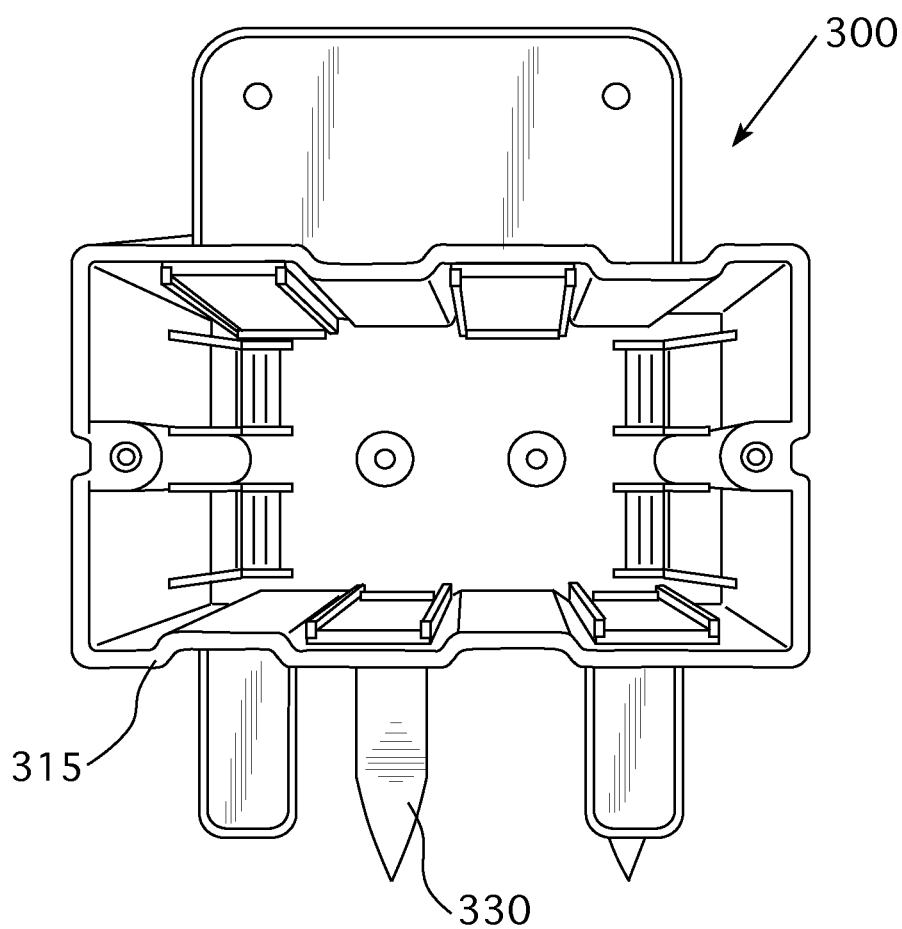
FIG. 19 is an illustration of an assembled single-gang electrical box including one container of FIG. 18 and the four anchoring members of FIG. 17; the anchoring members are in inserted positions.

An electrical box according to at least one embodiment may be made from various materials including, but not limited to, metal, plastic, and the like. The various components, excluding the metallic grounding components 151, may be molded from any appropriate moldable material, including, but not limited to, polycarbonate, NORYL®, polyvinyl chloride ("PVC"), and other suitable polymers or combinations thereof. Each molded component may also be made from a material different from that used for another component. A container and anchoring members of an electrical box of at least one embodiment may be made from PVC. FIGS. 17-19 include illustrations of molded components of an electrical box for installation in ICF construction. FIG. 17 is an illustration of four anchoring members 330 before assembling in a container 315 of an electrical box 300. FIG. 18 is an illustration of two containers 315 of single-gang electrical boxes before assembling each with four anchoring members 330; the container on the right-hand side of the figure still has excess material 390 remaining from a molding process. Typically, after molding the container 315, any excess material 390 is removed, via, for example, a cutting process, before shipping a finished electrical box to a user. FIG. 19 is an illustration of an assembled single-gang electrical box 300 including one container 315 of FIG. 18 and the four anchoring members 330 of FIG. 17; the anchoring members 330 are shown in inserted positions.

Figure 20:
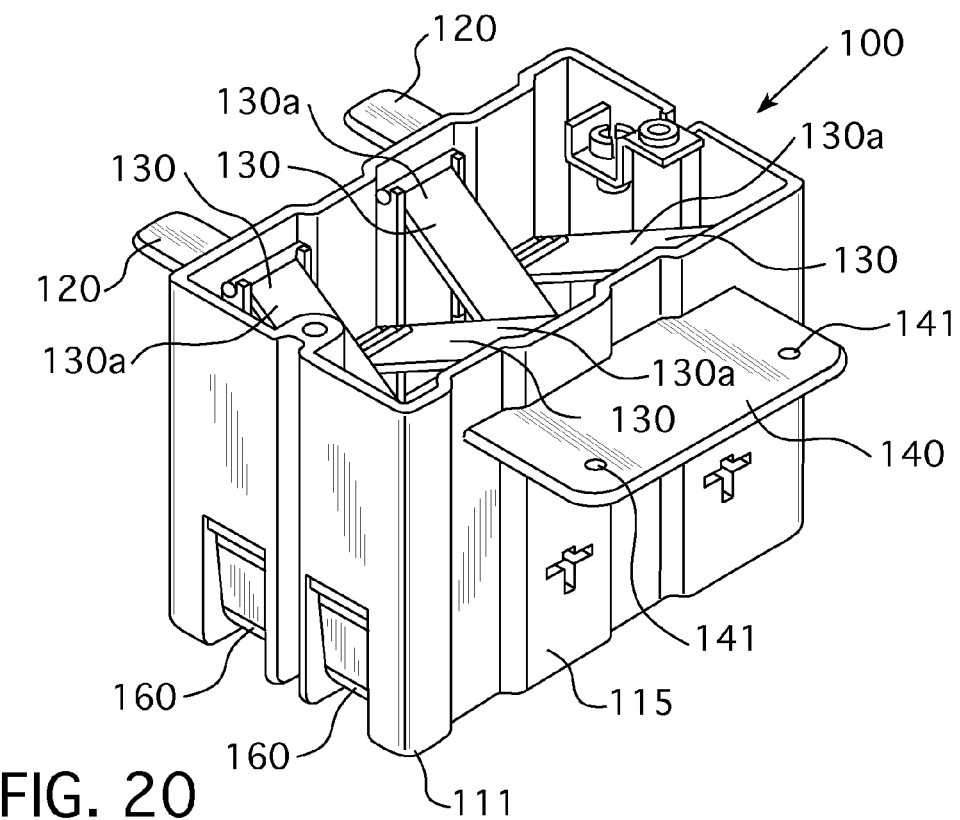
FIG. 20 is a perspective view of a non-limiting embodiment of a single-gang electrical box for installation in ICF with four anchoring members in storage positions; the electrical box is configured to receive non-metallic sheathed cables.
Figure 21:
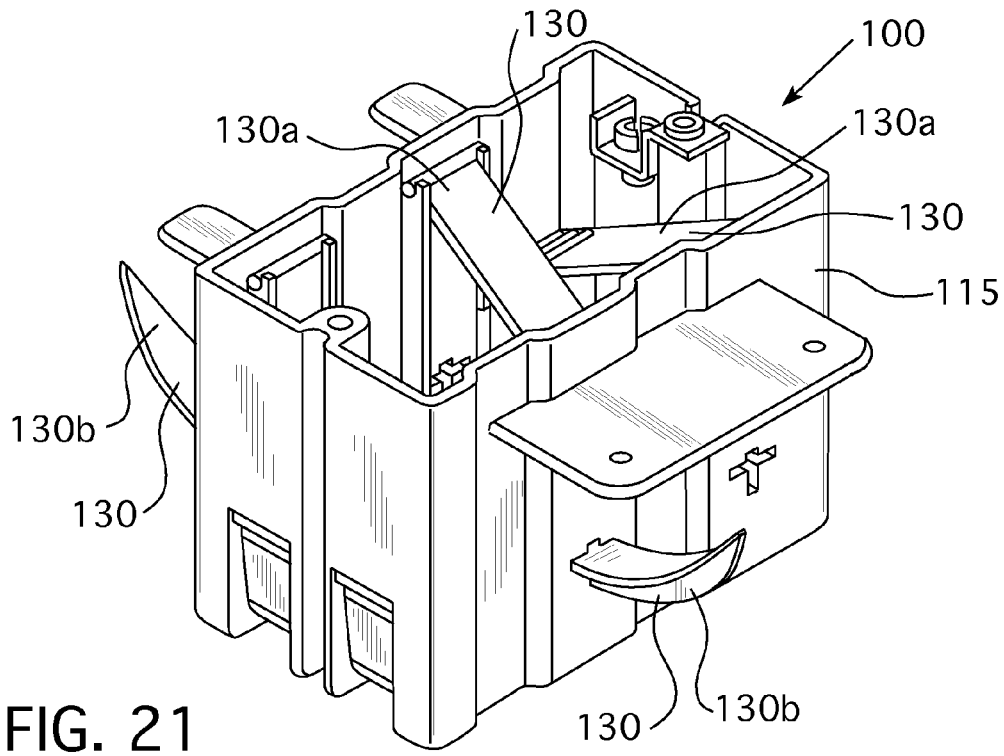
FIG. 21 is a perspective view of the electrical box of FIG. 20 with two anchoring members in inserted positions and two anchoring members in storage positions.
Figure 22:
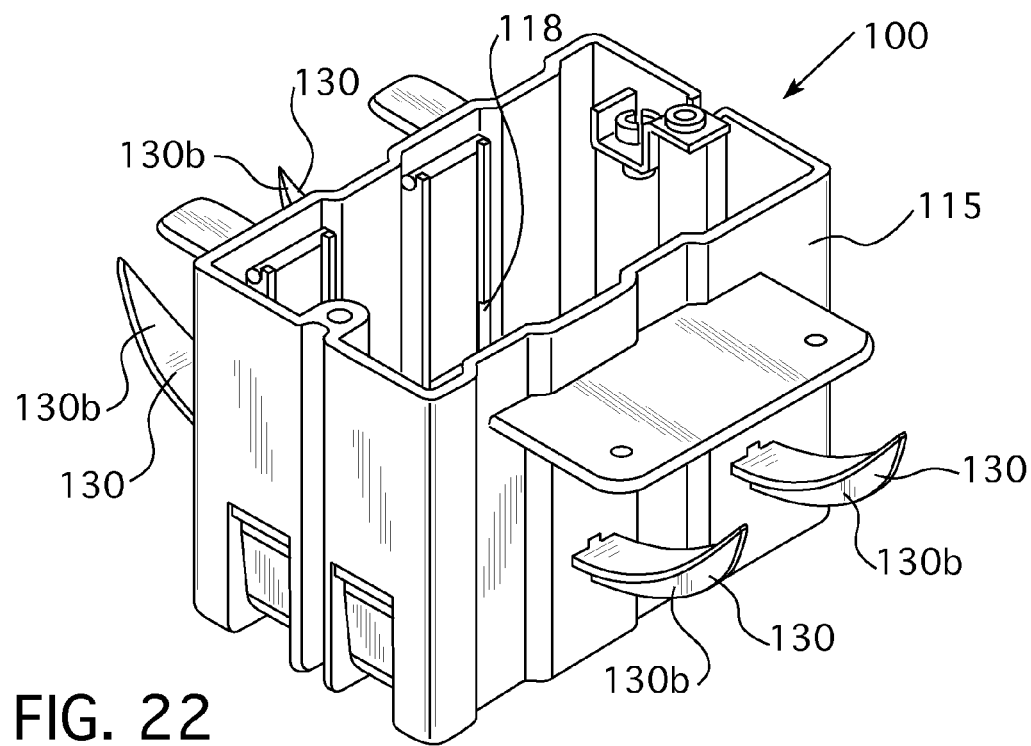
FIG. 22 is a perspective view of the electrical box of FIG. 20 with the four anchoring members in inserted positions.

FIGS. 20-22 help illustrate the respective steps involved in moving anchoring members to from an initial, storage position, to a final, installed, inserted position. FIG. 20 is a perspective view of a non-limiting embodiment of a single-gang electrical box 100 for installation in ICF with four anchoring members 130 in storage positions 130a; the electrical box 100 of FIG. 20 is configured to receive non-metallic sheathed cables through ports 160 and is similar to electrical box 100 described above. In addition to anchoring members 130, the electrical box 100 includes a container 115 configured to receive an electrical device and positioning tabs 120, 140. Container 115 includes a front 110 and a back 111. FIG. 21 is a perspective view of the electrical box 100 of FIG. 20 with two anchoring members 130 in inserted positions 130a and two anchoring members 130 in storage positions 130a. FIG. 22 is a perspective view of the electrical box 100 of FIG. 20 with the four anchoring members 130 in inserted positions 130b.

Briefly, the steps for installing the electrical box into ICF construction are as follows. First, a cavity (not shown) for the electrical box 100 is prepared in the ICF (also not shown). The cavity may be pre-formed, cut, or otherwise devised such that it is adapted to receive the container 115 of the electrical box 100. Also, at the same time, additional channels may be prepared in the ICF to carry electrical wiring/cables to and/or from the electrical box 100.

Second, the electrical box 100, with the anchoring members 130 in storage positions 130a (FIG. 20), is positioned in the ICF recess. Positioning tabs 120, 140 serve to prevent placing the electrical box 100 too far into the recess. Accordingly, the container 115 is positioned in the cavity of the ICF such that the front 110 of the container 115 protrudes from the cavity, in front of a surface of the ICF, and will become flush with any finishing materials, such as drywall, that may be added after installation of the electrical box. The front 110 of the container 115 may be between approximately ½ inches and ⅝ inches from the positioning tabs 120, 140 such that a ½ inch- and/or a ⅝ inch-thick drywall piece will mount flush with front 110.

Third, a user, using at least one of his or her fingers and/or thumbs, presses down on one or more anchoring members 130 from the front 110 of the container toward the back 111. All four anchoring members may be pressed at approximately the same time. However, as seen in FIG. 21, less than four may be concurrently pressed. As explained above, pressing or otherwise applying a force to the anchoring member 130 such that the anchoring member 130 moves from storage position 130a (FIG. 20) toward inserted position 130b (FIG. 21) causes the anchoring member to deform a storage stop 117 (see FIG. 12) and move through a hole in the container and into the material of the ICF. Once the inserted position 130b for each anchoring member 130 is reached, each anchoring member is held in the inserted position by at least one catch 118 (FIG. 22). Accordingly, the anchoring members 130 in inserted positions 130b (FIG. 22) serve to securely hold the electrical box 100 in the ICF to form a mounted electrical box. Additional stability is provided to the mounted electrical box 100 once drywall or other board-like material is placed over and contacts positioning tabs 120, 140. The positioning tabs may become sandwiched between a surface of the ICF and a surface of the drywall.

Alternatively, should the electrical box 100 be placed next to a plastic tie or other non-foam based structural support component of the ICF, the anchoring members 130 that would move toward large positioning tab 140 may not be insertable into the ICF owing to the increased rigidity of the structural support component. It is notable that the electrical box 100 may typically be oriented such that the large positioning tab 140 is along any such ICF structural support component; in other words, the electrical box 100 may be rotated about in any direction necessary such that the large positioning tab 140 is closer to any structural support component than small positioning tabs 120. In these cases, one or more anchoring members 130 may be removed from the electrical box 100 by removing hinge protrusions 135 of anchoring member 130 from anchoring member hinges 114. Then, the electrical box 100 may be secured to the structural support component by using fasteners, including, but not limited to screws, nails, bolts, etcetera, through fastener holes 141. Additionally, any anchoring members 130 remaining in the electrical box 100 may be pressed into inserted positions 130b. Therefore, in at least one embodiment, one side of the electrical box may be secured to the ICF by anchoring members 130 in inserted positions 130b and another side of the electrical box 100 may be secured to the ICF by fasteners inserted through fastener holes 141. Alternatively, all of the anchoring members 130 may be removed from the electrical box, as described above, and then the electrical box may be mounted directly to a non-ICF construction object, a wood stud, for example, if it is desired to use the box 100 in such a situation.

Additionally, the positioning tab 140 and fastener holes 141 may allow the electrical box 100 to be installed into non-ICF construction. For instance, should it be desirable to install the electrical box 100 to a non-ICF object, for example a wooden stud, then the anchoring members 130 can be removed from the electrical box 100, as described above, and the container 115 may then be secured to the non-ICF object by using fasteners through the fastener holes 141. Therefore, the electrical box 100 is well suited for use in a variety of construction types.

Figure 23:
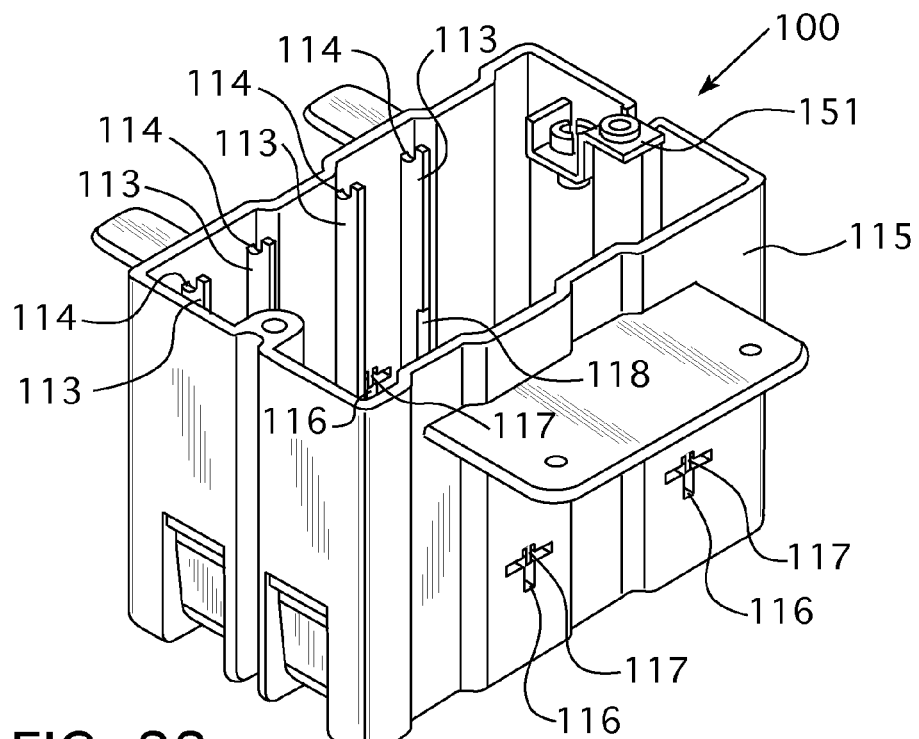
FIG. 23 is a perspective view of a container of the electrical box of FIG. 20.

Additional clarity regarding the electrical box 100 is provided by examining several of the electrical box 100 components before assembling with each other. FIGS. 23-28 show various views of some of the components of electrical box 100 of FIG. 20, before mounting anchoring members 130 within container 115. FIG. 23 is a perspective view of a container 115 of the electrical box 100 of FIG. 20. The features of the electrical box 100 (excluding the metallic grounding components 151 and the anchoring members 130) may be formed via a molding process such that they are unitary and integral with the container 115. Thus, in at least one embodiment, container 115 may comprise at least one pair of anchoring member support walls 113, at least one pair of anchoring member hinges 114, at least one pair of anchoring member catches 118, at least one deformable storage stop 117, and at least one wall hole 116.

Figure 24:
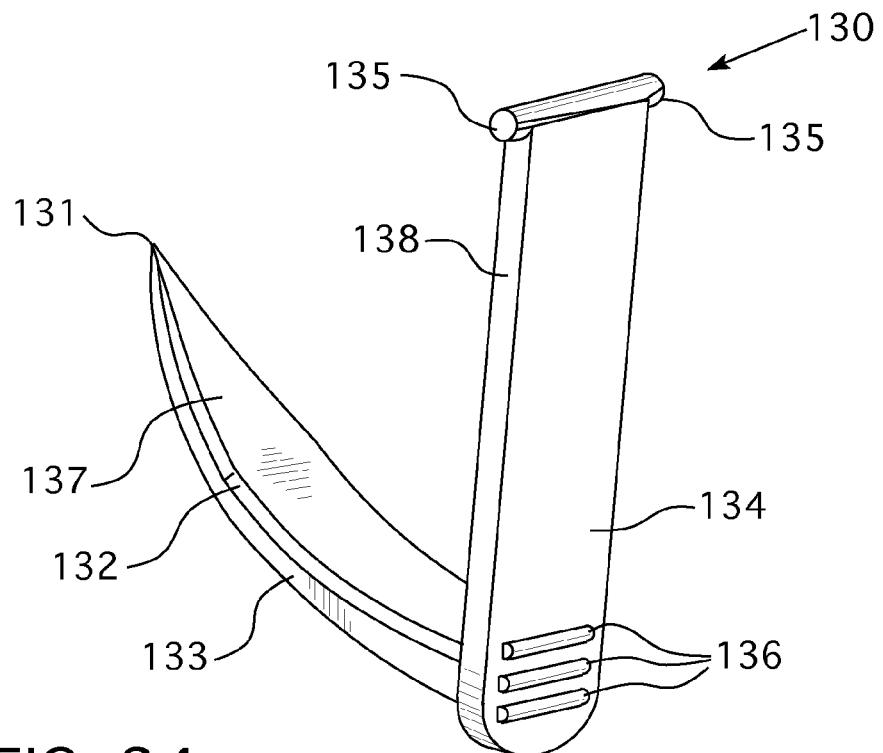
FIG. 24 is a perspective view of an anchoring member of the electrical box of FIG. 20.
Figure 25:
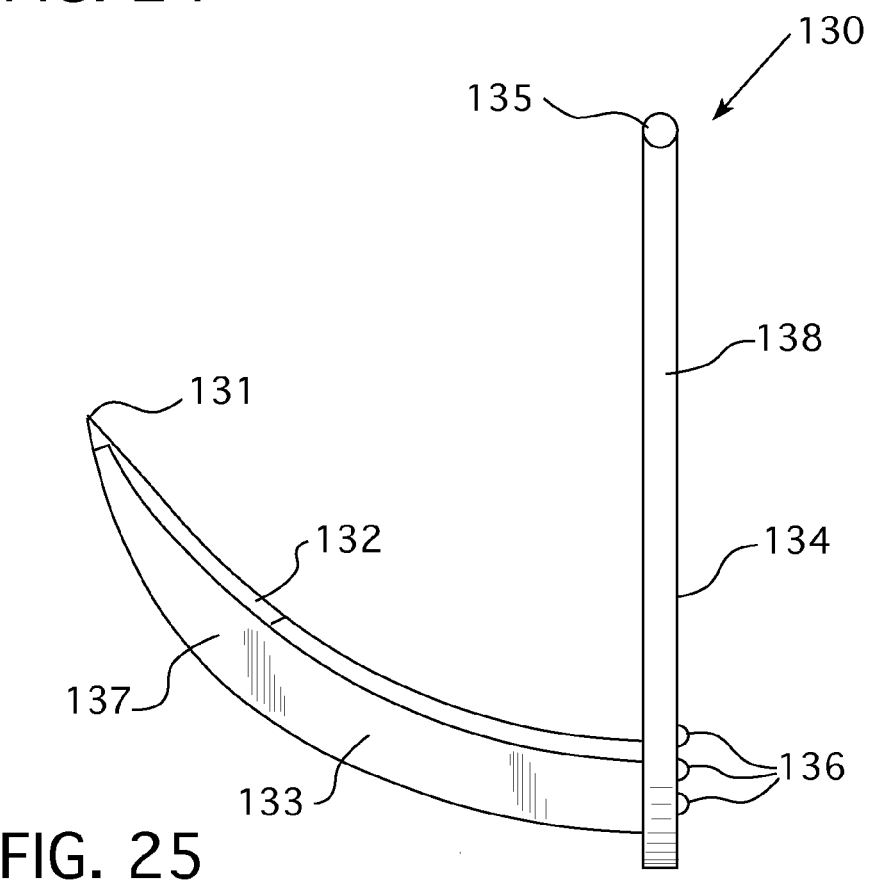
FIG. 25 is a side view of the anchoring member of FIG. 24.
Figure 26:
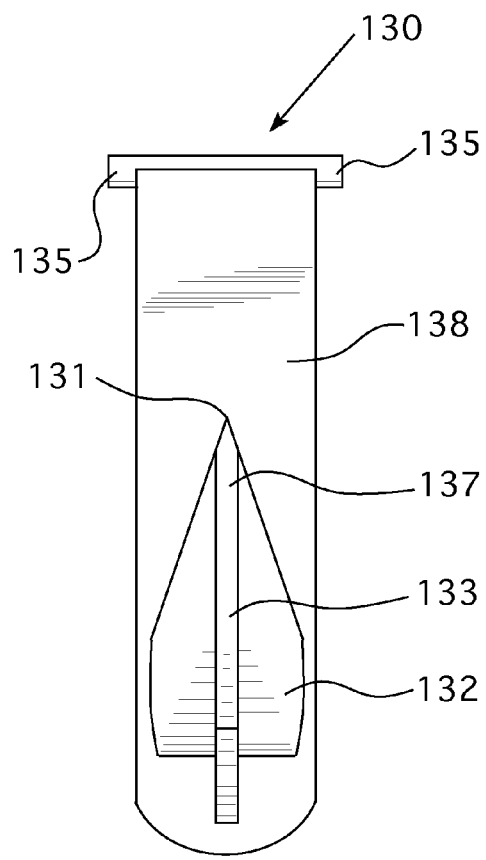
FIG. 26 is a front view of the anchoring member of FIG. 24.
Figure 27:
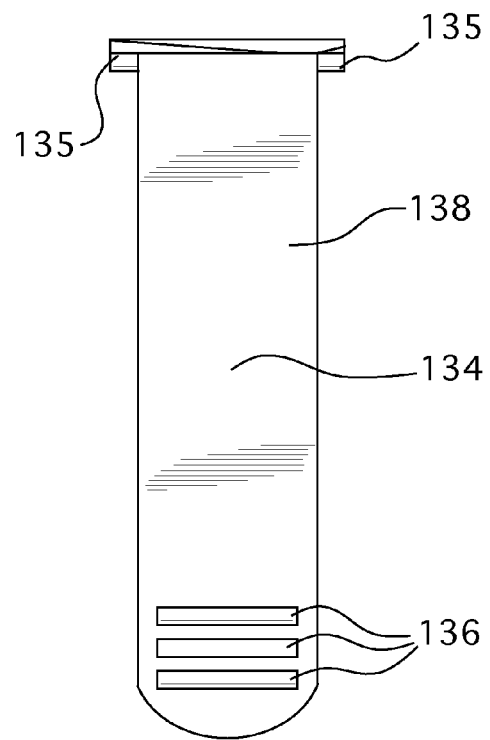
FIG. 27 is a back view of the anchoring member of FIG. 24.
Figure 28:
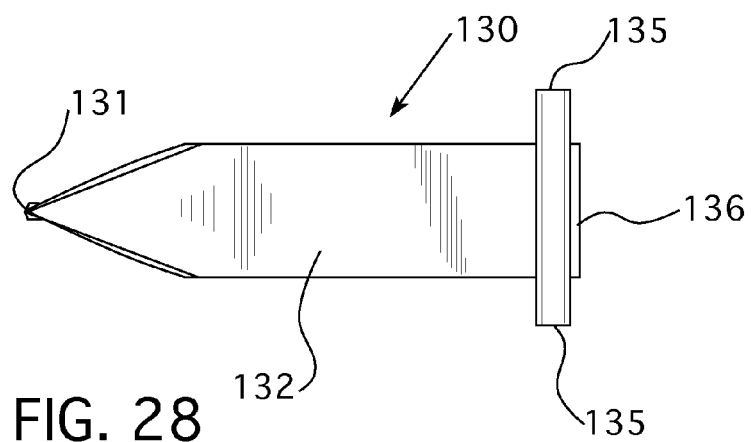
FIG. 28 is a top view of the anchoring member of FIG. 24.

FIGS. 24-28 illustrate various features of an anchoring member 130. FIG. 24 is a perspective view of an anchoring member 130 taken from the electrical box of FIG. 20. FIG. 25 is a side view of the anchoring member 130 of FIG. 24. FIG. 26 is a front view of the anchoring member 130 of FIG. 24. FIG. 27 is a back view 130 of the anchoring member of FIG. 24. FIG. 28 is a top view of the anchoring member 130 of FIG. 24. Anchoring member 130 may comprise an insertable portion 137 including a top tapered wall 132 and a bottom tapered wall 133 that together taper to a tip 131, a finger operable portion 138 including a finger operable surface 134 and textured finger grips 136, and hinge protrusions 135 protruding from finger operable portion 138. Generally, the insertable portion 137 may extend from the finger operable portion such that the insertable portion 137 may also comprise a prong. For example, tapered walls 132, 133 may each protrude away from finger operable surface 134 and toward tip 131 to form a prong. Tip 131 may provide a piercing force when, as described above, anchoring member 130 is moved into an ICF material. Bottom tapered wall 133 extends transversely from front tapered wall to provide support to top tapered wall during and after insertion of the insertable portion into an ICF material. Top tapered wall 132 may be configured to provided enhanced surface area contact with an ICF material such that when installed in an electrical box 100 and forces are directed toward the front 110 of the box, top tapered wall provides reduced stress on the ICF material, thereby holding the electrical box 100 in an ICF material. In other words, top tapered wall 132 may be configured to resist pulling forces applied to electrical box 100 that otherwise may lead to the electrical box becoming dislodged from an ICF cavity in which the box is mounted. Also, top tapered wall 132 and bottom tapered wall 133 may be curved to follow an arc defined by rotation of hinge protrusion 135 about anchoring member hinges 114 of container 115. Therefore, when anchoring member 130 swings from a storage position to an inserted position, tip 131 and tapered walls 132, 133 may move with decreased friction caused by contact with and through wall hole 116 of container 115. Further, another benefit of tapered walls 132, 133 being curved in the illustrated direction is that the insertable portion 137 of anchoring member 130 may act similar to a barb to resist dislodgment of a fully mounted electrical box 100. As mentioned above, the wall hole 116 (see, e.g., FIGS. 10 and 23) through which tapered walls 132, 133 may pass, may have a shape that is congruent to a cross-section of walls 132, 133.

Finger operable portion 138 may be configured to be operated by user's finger. This may be facilitated by providing finger operable surface 134 with sufficient width and length such that a finger may easily depress surface 134 to apply tip 131 with sufficient piercing force to pierce an ICF material and move toward an inserted position from a storage position. Finger grips 136 may help prevent a user's finger from slipping during the pressing action. Finger grips 136 alternatively may be replaced or supplemented by adding texture to the finger operable surface 134.

Focusing now on FIGS. 20-28 collectively, assembly of the electrical box 100 generally takes place by placing anchoring members 130 into a container 115 such that they are generally in an orientation similar to that of storage positions discussed above and seen, for example, in FIG. 20. Hinge protrusions 135 of each anchoring member 130 are then snapped into anchoring member hinges 114 and tip 131 of the anchoring member 130 is then allowed to touch the deformable storage stop 117 without deforming the same. Again, the stop 117 resists the anchoring member 130 from swinging towards an inserted position (see FIG. 5); adequate force must be supplied to the anchoring member in a direction toward the stop 117 to cause the stop 117 to deform and allow the anchoring member 130 to pass into and through the wall hole 116 (see FIG. 6). Generally, the insertable portion 137 of the anchoring member is sized and configured to pass through the wall hole 116 of container 115, but the finger operable portion 138 is sized and configured such that it does not pass through the hole 116, owing to finger operable portion 138 being larger than hole 116 and/or having various geometric features to prevent portion 138's passage through hole 116. Further, each anchoring member 130 is sized appropriately such that contact or interference between the interior surfaces 108 and the finger operable portion of anchoring member 130 resists the member's 130 rotating out the front 110 of the container 115. Accordingly, each anchoring member 130 is contained substantially within container 115 in a storage position until a user provides adequate force to rotate an anchoring member 130 toward, but not past, an inserted position.

The foregoing drawings and description generally describe a single-gang electrical box for installation in ICF where the electrical box is configured to receive non-metallic sheathed electrical cables (e.g. "NMD" cables). However, a variety of electrical box form factors are possible, including without limitation, single-gang, double-gang, and/or triple-gang electrical boxes and/or electrical boxes configured to support either or both metallic (e.g. "armored" or "BX" cables) and non-metallic sheathed cables. The "gang" multiple generally refers to the number of electrical devices that an electrical box is designed to support; however, it is possible that increased numbers of smaller electrical devices may be received in an electrical box of a specific gang. In other words, while a single-gang box may be designed to ideally hold one electrical device; two or more electrical devices may be installed in a single-gang electrical box provided that the electrical devices are appropriately sized. FIGS. 29-38 illustrate various exemplary, but non-limiting embodiments directed to an electrical box for installation in ICF having differing cable support designs and gang multiples.

Figure 29:
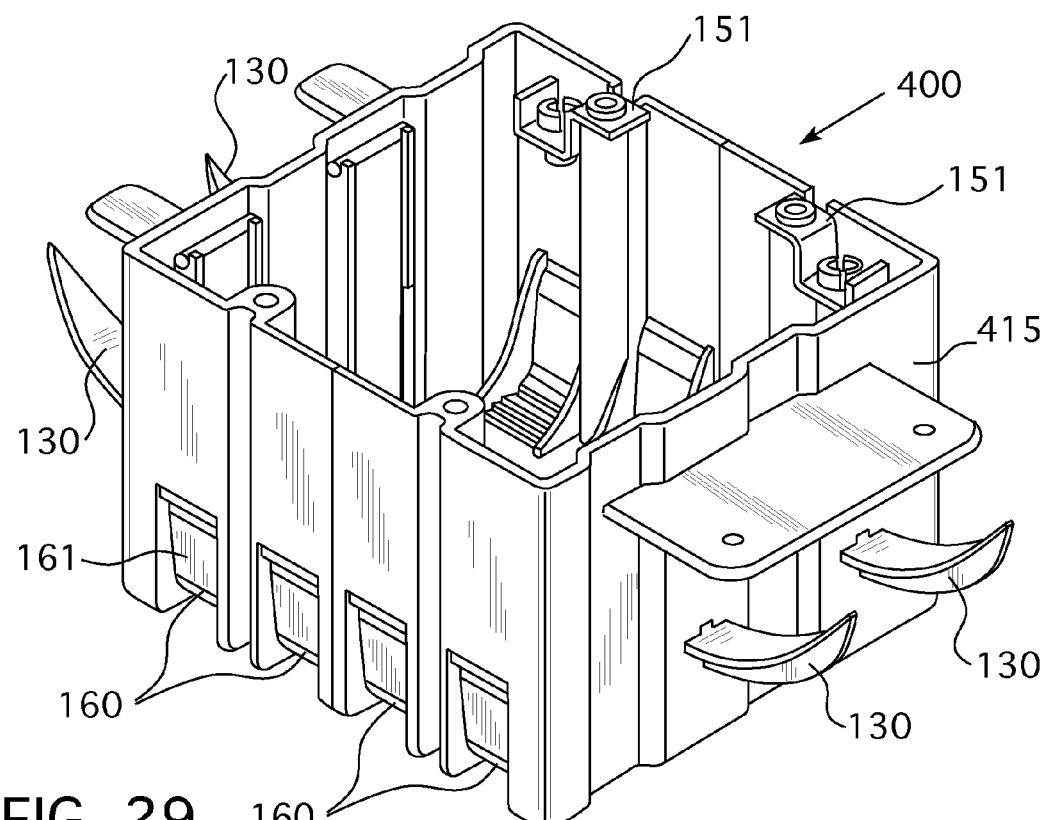
FIG. 29 is a perspective view of a non-limiting embodiment of a double-gang electrical box for installation in ICF with four anchoring members in inserted positions; the electrical box is configured to receive non-metallic sheathed cables.

FIG. 29 is a perspective view of a non-limiting embodiment of a double-gang electrical box 400 for installation in ICF with four anchoring members 130 in inserted positions; the electrical box is configured to receive non-metallic sheathed cables via ports 160. Each port 160 is adapted to receive at least one non-metallic sheathed cable and may include a clamp 161. Ports 160 and clamps 161 are similar to that described above. Notably, electrical box 400 includes two sets of metallic grounding components 151, at least eight ports 160 (four on each of two sides of the electrical box), and a container 415 appropriately sized to support two electrical devices. Anchoring members 130 and various other elements of electrical box 400 are similar to that of electrical box 100 described above.

Figure 30:
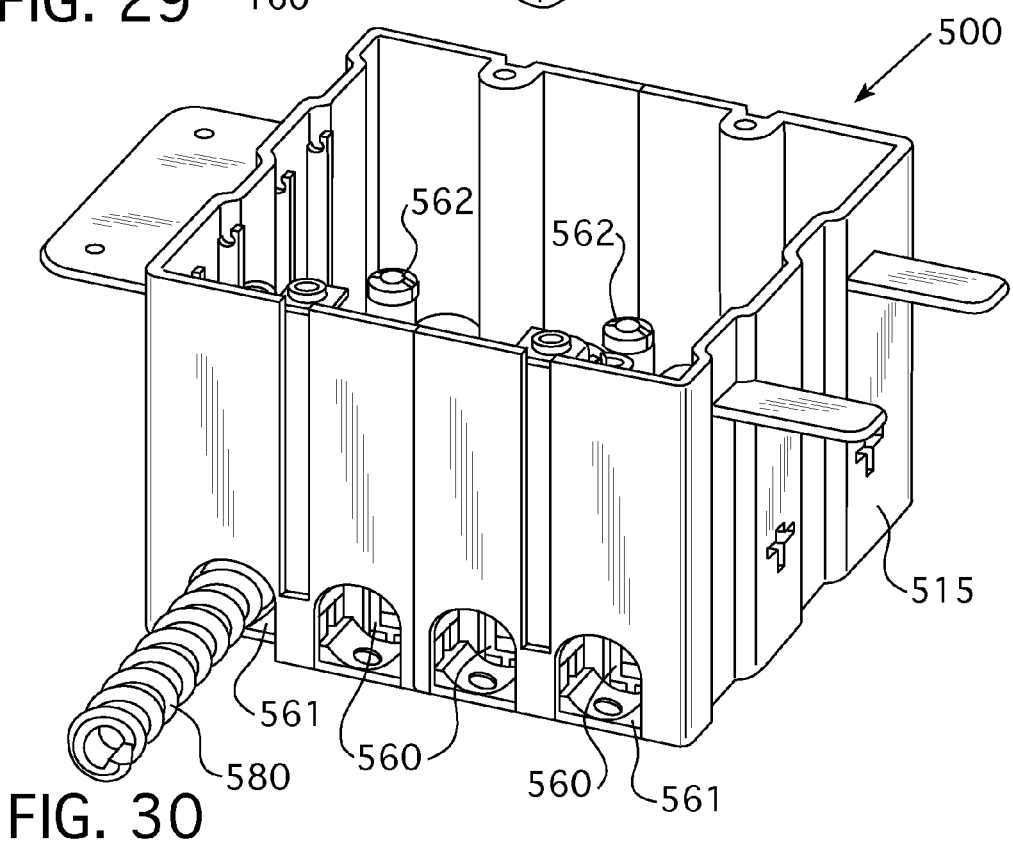
FIG. 30 is a perspective view of a non-limiting embodiment of a double-gang electrical box without anchoring members mounted therein; the electrical box is configured to receive metallic sheathed cables and one such cable is shown inserted into the container.
Figure 31:
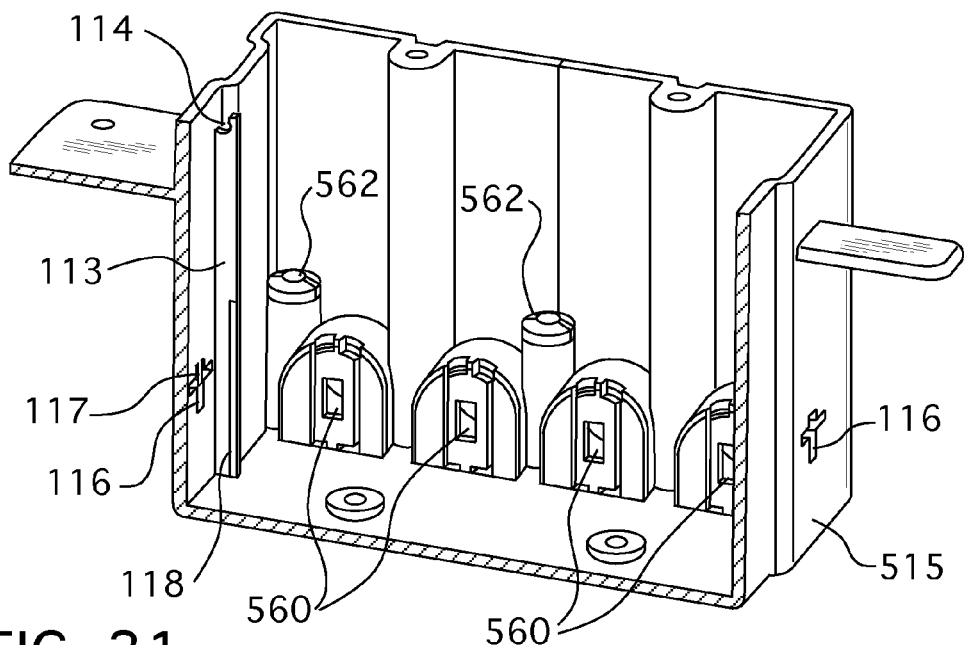
FIG. 31 is a perspective cross-sectional view of the electrical box of FIG. 30 showing metallic sheath cable receiving ports and bracket clamp adjustment screws of the electrical box.

FIG. 30 is a perspective view of a non-limiting embodiment of a double-gang electrical box 500 without anchoring members 130 mounted therein; the electrical box 500 is configured to receive metallic sheathed cables and a metallic sheathed cable 580 is shown inserted into the container 515. The electrical box 500 includes at least eight ports 560, four on each of two sides of the electrical box. Ports 560 are adapted to receive cable 580 and include bracket clamps 561. Bracket clamps are operably connected to bracket screws 562, which move bracket clamp 561 toward and away from container 515 when rotated by a driver. Briefly, the electrical box is initially supplied with the bracket clamps 561 in an open or non-clamped position, with a surface of the bracket clamp 561 approximately flush with a bottom of the electrical box 500. When a user desires to insert a cable into the electrical box 500, the user may break a knockout of a port 560 from inside the electrical box 100 by using a screwdriver, for example. Such a knockout can be seen from inside the electrical box as illustrated in FIG. 31. A cable 580 is then inserted into the container 515 of the electrical box 500 via port 560. The cable is inserted into the port 560 until the cable 580 reaches a back of port 560, adjacent to where a knockout was previously located. Note that in FIGS. 30-35, knockouts of ports 560 are not removed, including the port 560 in which the cable 580 is positioned. After placement, the cable 580 is held in place by adjusting bracket screw 562 to move bracket clamp 561 toward and into contact with cable 580. Screw 562 is tightened sufficiently such that bracket clamp 561 clamps cable 580 against container 515, as seen in FIG. 30. The various other elements of electrical box 400 are similar to that of electrical box 100 described above.

Figure 32:
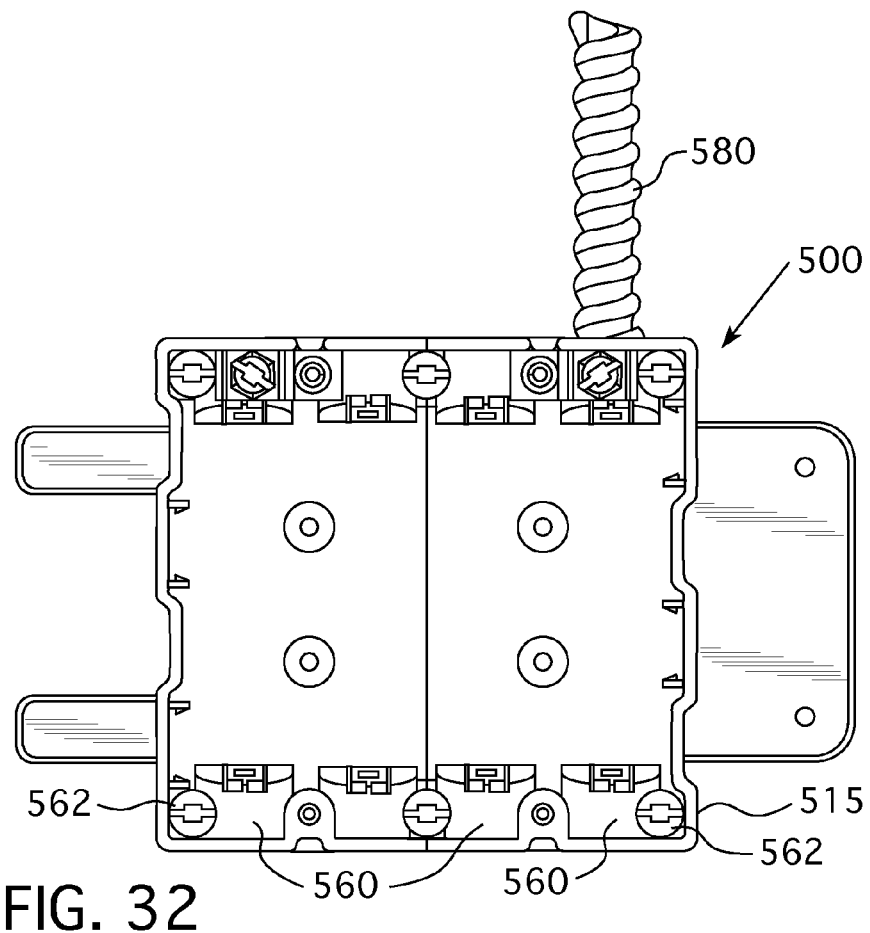
FIG. 32 is a front view of the electrical box and the metallic sheathed cable of FIG. 30.
Figure 33:
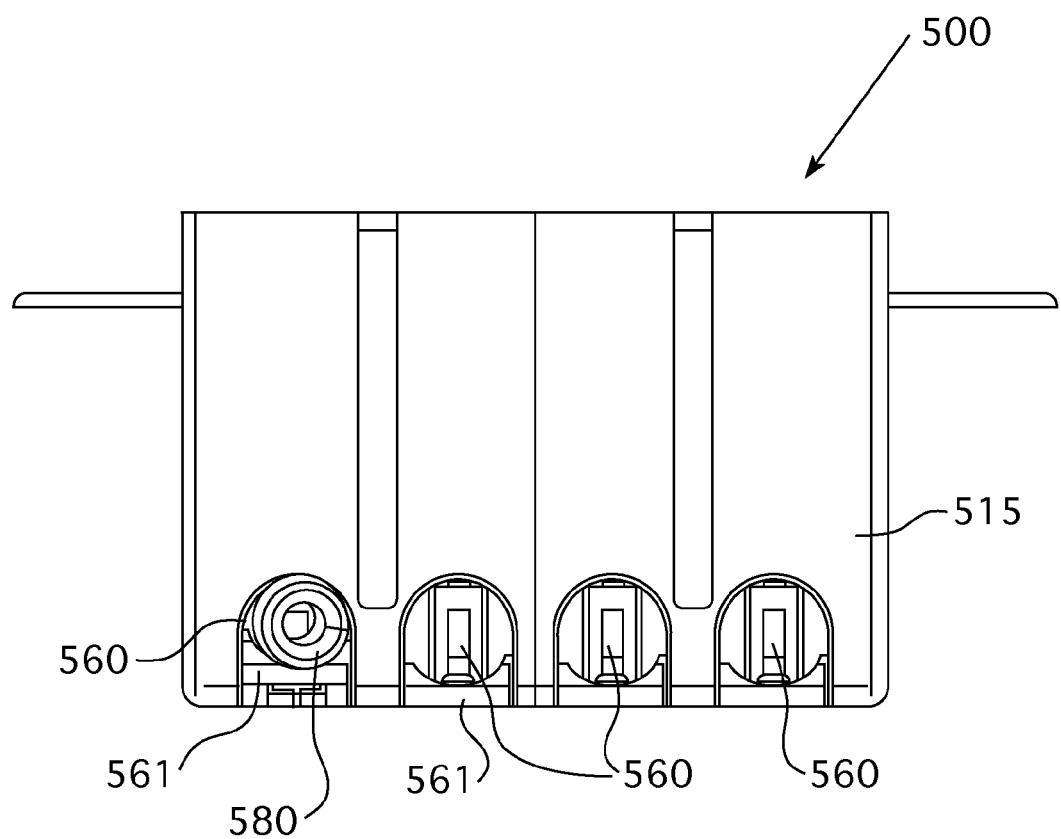
FIG. 33 is a side view of the electrical box and the metallic sheathed cable of FIG. 30; a bracket clamp of the electrical box has been clamped onto the cable.
Figure 34:
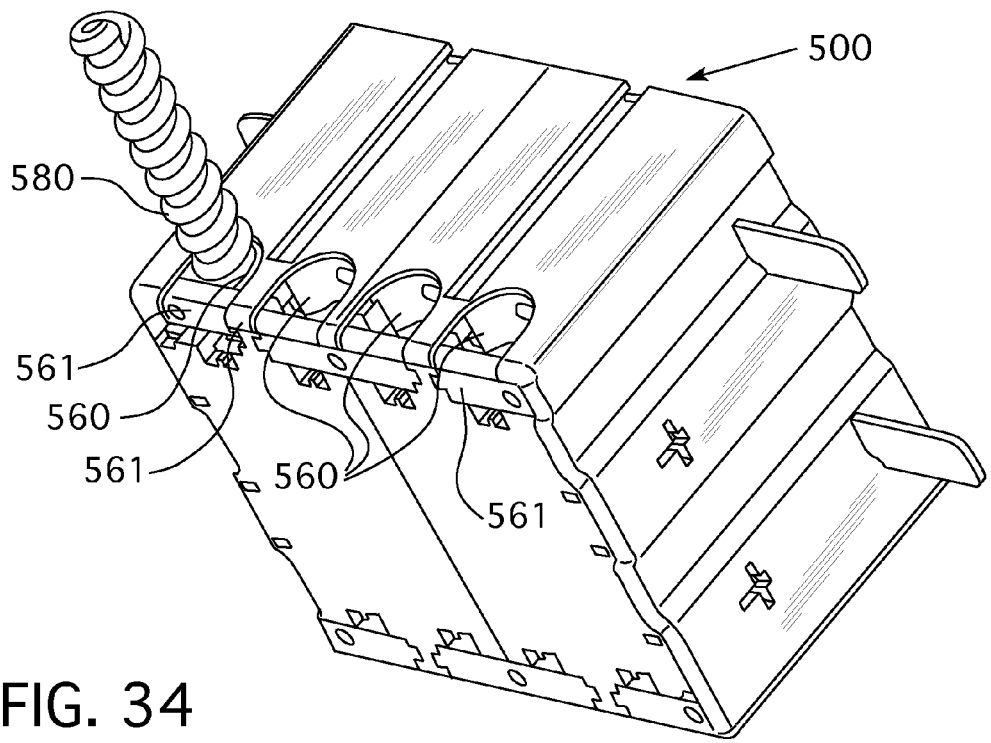
FIG. 34 is a perspective view of the electrical box and the metallic sheathed cable of FIG. 30; a bracket clamp of the electrical box has been clamped onto the cable.

FIG. 31 is a perspective cross-sectional view of the electrical box 500 of FIG. 30 showing metallic sheath cable receiving ports and bracket clamp adjustment screws 562 of the electrical box 500. Similar to electrical box 100 described above, electrical box 500 includes wall holes 116 for insertably receiving anchoring members 130 (not shown), anchoring member support walls 113, anchoring member hinges 114, deformable storage stops 117, and anchoring member catches 118. Bracket screws 562 can be more clearly seen supported by and within container 515. Ports 560 can also be seen formed in a wall or walls of container 515. FIG. 32 is a front view of the electrical box and the metallic sheathed cable of FIG. 30. FIG. 33 is a side view of the electrical box 500 and the metallic sheathed cable 580 of FIG. 30; cable 580 has been inserted into a port 560 and a bracket clamp 561 of the electrical box 500 has been clamped onto the cable. FIG. 34 is a perspective view of the electrical box 500 and the metallic sheathed cable 580 of FIG. 30; cable 580 has been inserted into a port 560 and a bracket clamp 561 of the electrical box 500 has been clamped onto the cable 580. As can be seen from the perspective of FIG. 34, each bracket clamp 561 may either provide clamping force on a cable 580 inserted into one port 560 (as illustrated) or on two cables inserted into two adjacent ports (e.g. the middle two of ports 560). The middle bracket clamp 561 spans two ports 560, whereas the outer bracket clamps span only one port 560 each.

Figure 35:
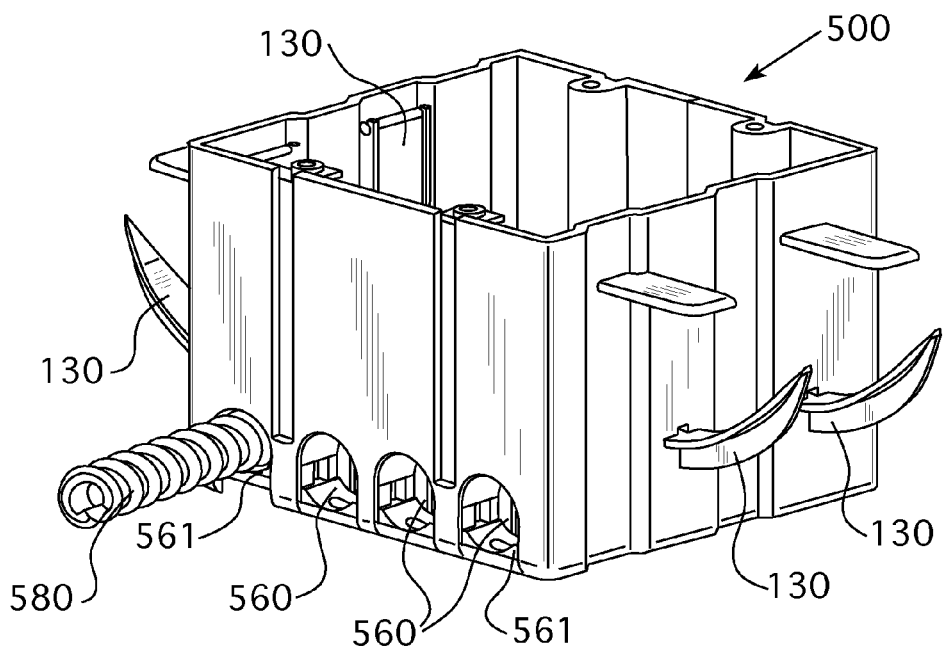
FIG. 35 is a perspective view of a non-limiting embodiment of a double-gang electrical box with anchoring members mounted therein; the electrical box is configured to receive metallic sheathed cables; the anchoring members are in inserted positions and a bracket clamp of the electrical box has been clamped onto a cable.

FIG. 35 is a perspective view of a non-limiting embodiment of the double-gang electrical box 500 of FIG. 30 with anchoring members 130 mounted therein; the electrical box 500 is configured to receive metallic sheathed cables; the anchoring members 130 are in inserted positions and a bracket clamp 561 of the electrical box 500 has been clamped onto a cable 580. Unless otherwise described, anchoring members 130 and various other elements of electrical box 500 are similar to that of electrical box 100 described above.

Figure 36:
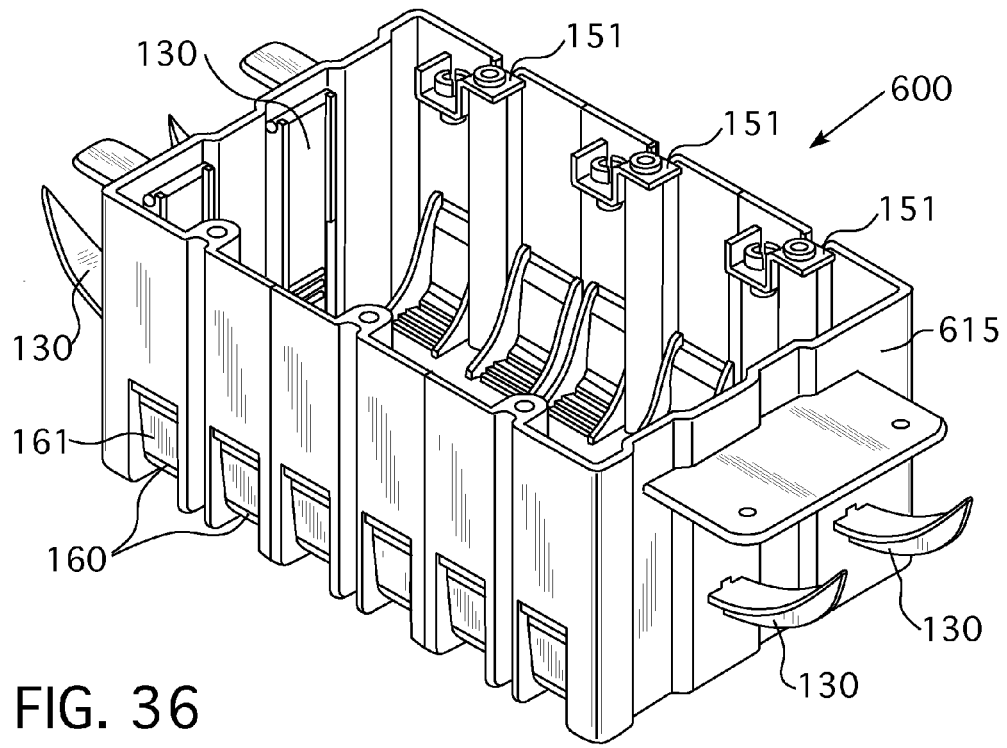
FIG. 36 is a perspective view of a non-limiting embodiment of a triple-gang electrical box with anchoring members in inserted positions; the electrical box is configured to receive non-metallic sheathed cables.

FIG. 36 is a perspective view of a non-limiting embodiment of a triple-gang electrical box 600 with anchoring members 130 in inserted positions; the electrical box is configured to receive non-metallic sheathed cables via ports 160. Each port 160 is adapted to receive at least one non-metallic sheathed cable and may include a clamp 161. Ports 160 and clamps 161 are similar to that described above. Notably, electrical box 600 includes three sets of metallic grounding components 151, at least twelve ports 160 (six on each of two sides of the electrical box), and a container 615 appropriately sized to support three electrical devices. Unless otherwise described, anchoring members 130 and various other elements of electrical box 600 are similar to that of electrical box 100 described above.

Figure 37:
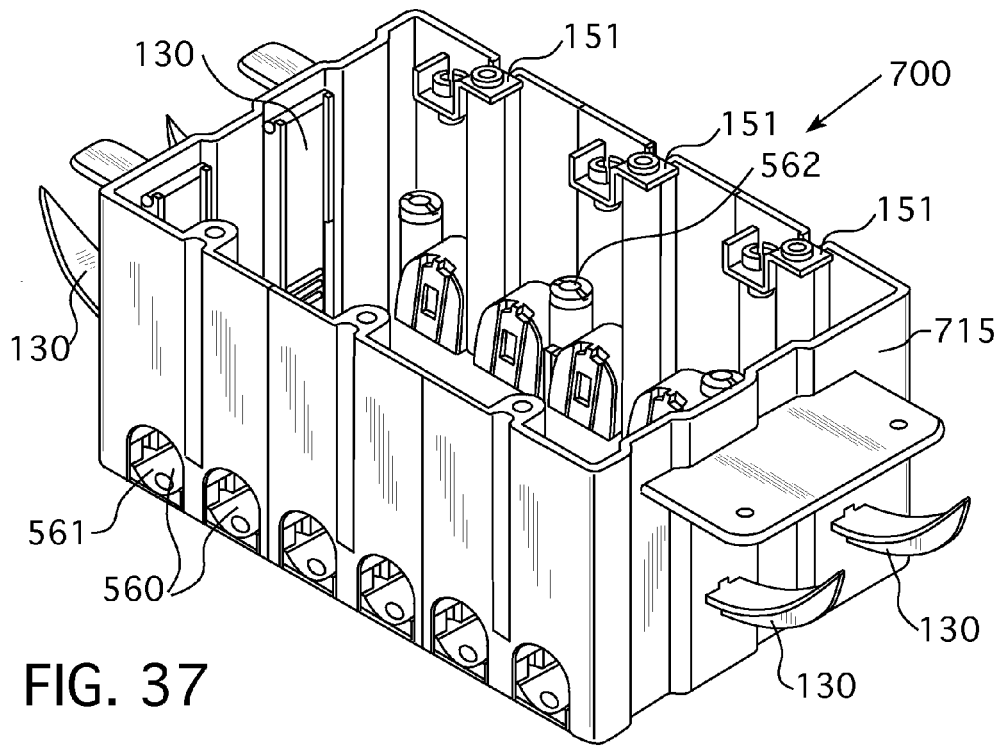
FIG. 37 is a perspective view of a non-limiting embodiment of a triple-gang electrical box with anchoring members in inserted positions; the electrical box is configured to receive metallic sheathed cables.

FIG. 37 is a perspective view of a non-limiting embodiment of a triple-gang electrical box 700 with anchoring members 130 in inserted positions; the electrical box 700 is configured to receive metallic sheathed cables via ports 560. Each port 560 is adapted to receive at least one metallic sheathed cable and may include a bracket clamp 561 that is adjusted by a bracket screw 562. Ports 560 and bracket clamps 561 are similar to that described above. Notably, electrical box 700 includes three sets of metallic grounding components 151, at least twelve ports 560 (six on each of two sides of the electrical box), and a container 715 appropriately sized to support three electrical devices. Unless otherwise described, anchoring members 130 and various other elements of electrical box 700 are similar to that of electrical box 100 described above.

Figure 38:
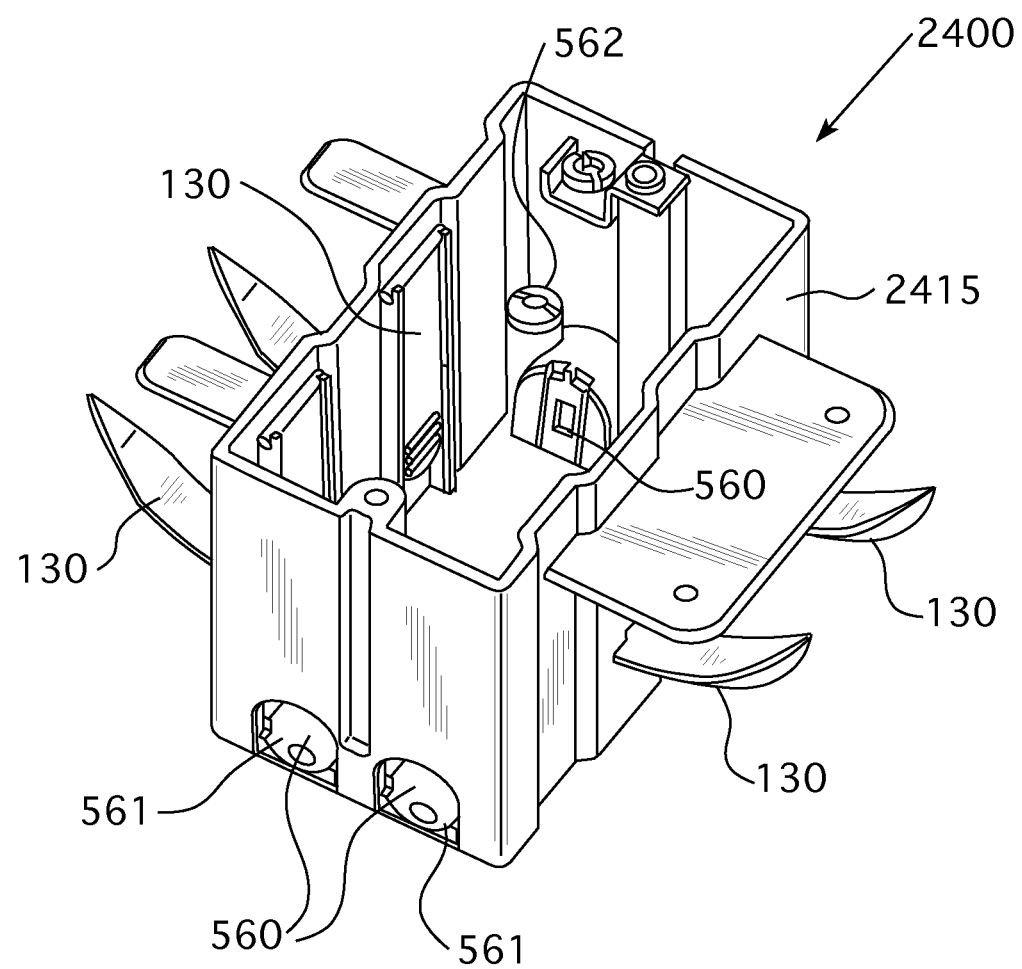
FIG. 38 is a perspective view of a non-limiting embodiment of a single-gang electrical box with anchoring members in inserted positions; the electrical box is configured to receive metallic sheathed cables.

FIG. 38 is a perspective view of a non-limiting embodiment of a single-gang electrical box 2400 with anchoring members 130 in inserted positions; the electrical box is configured to receive metallic sheathed cables via ports 560. Each port 560 is adapted to receive at least one metallic sheathed cable and may include a bracket clamp 561 that is adjusted by a bracket screw 562. Ports 560 and bracket clamps 561 are similar to that described above. Notably, electrical box 2400 includes one set of metallic grounding components 151, at least four ports 560 (two on each of two sides of the electrical box), and a container 2415 appropriately sized to support one electrical device. Unless otherwise described, anchoring members 130 and various other elements of electrical box 2400 are similar to that of electrical box 100 described above.

Figure 39:
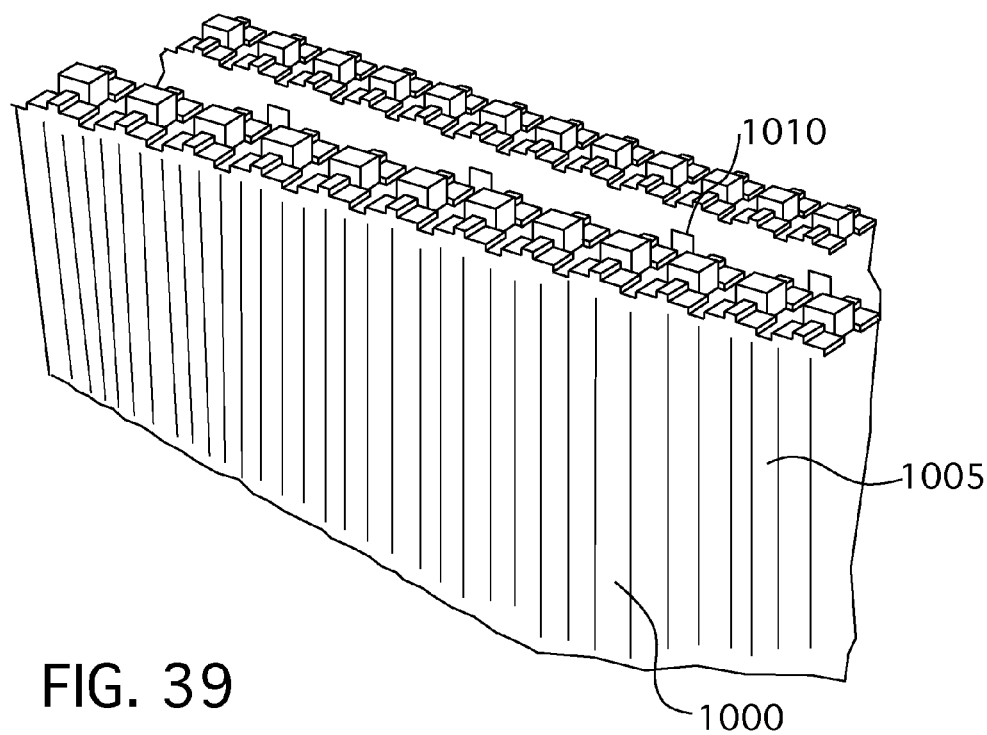
FIG. 39 is an illustration of a non-limiting embodiment of an ICF before any concrete has been poured into the ICF.
Figure 40:
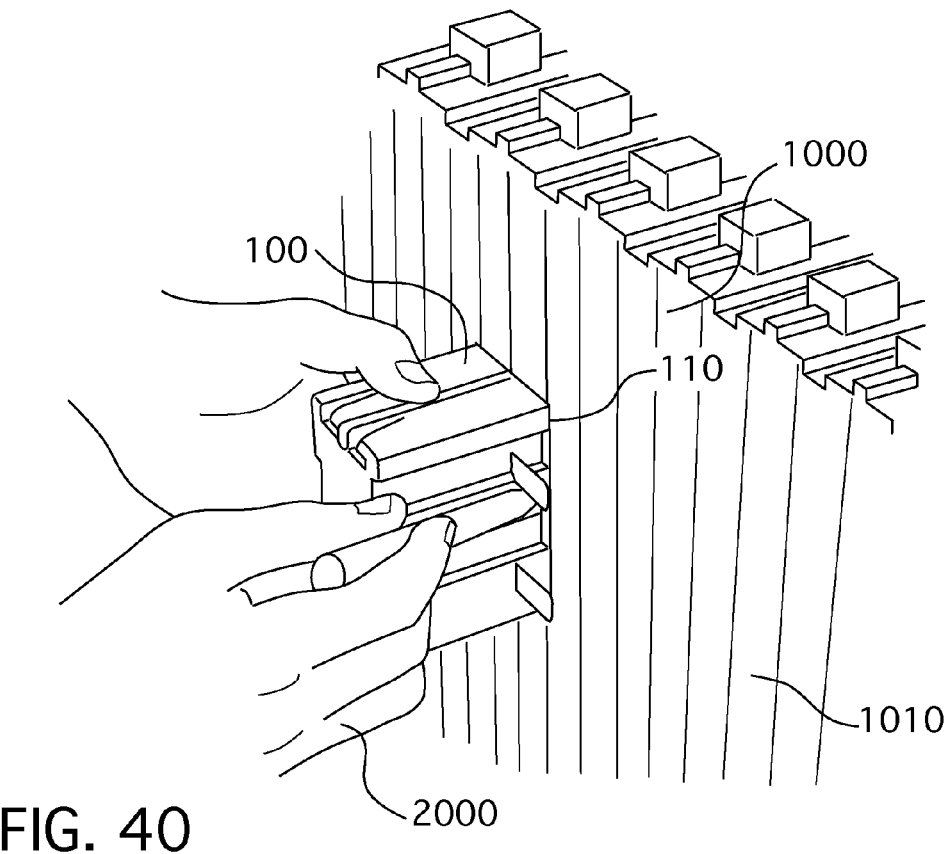
FIG. 40 is an illustration of a non-limiting embodiment of an electrical box positioned with its front against a surface of the ICF of FIG. 39 with a user tracing around the front of the ICF.
Figure 41:
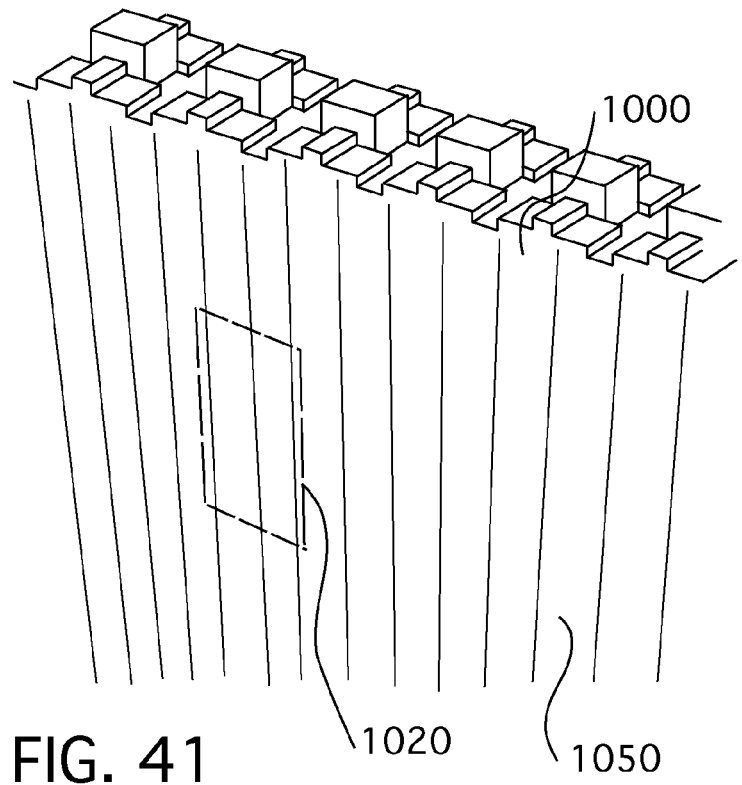
FIGS. 41-42 are illustrations of the ICF of FIG. 39 with traced markings left in the surface of the ICF by the tracing process shown in FIG. 40.
Figure 42:
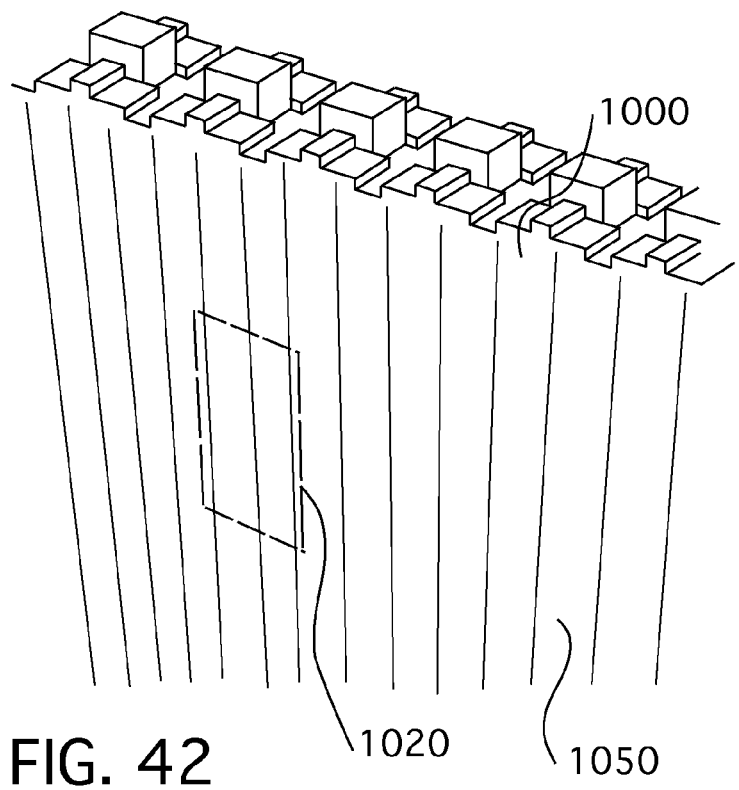
Figure 43:
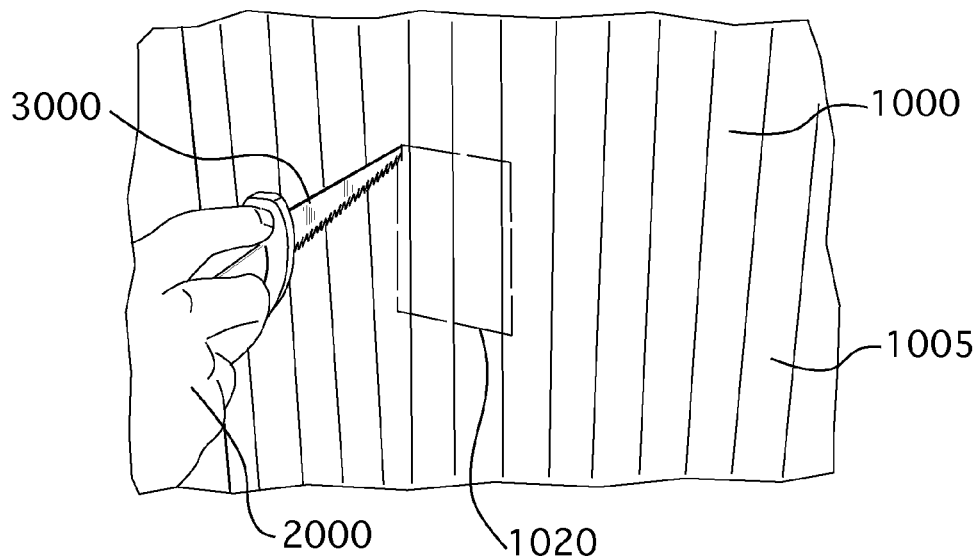
FIGS. 43-47 are illustrations of the ICF of FIGS. 41-42 showing a user applying a cutting tool thereto to cut into the surface of the ICF along the traced markings.
Figure 44:
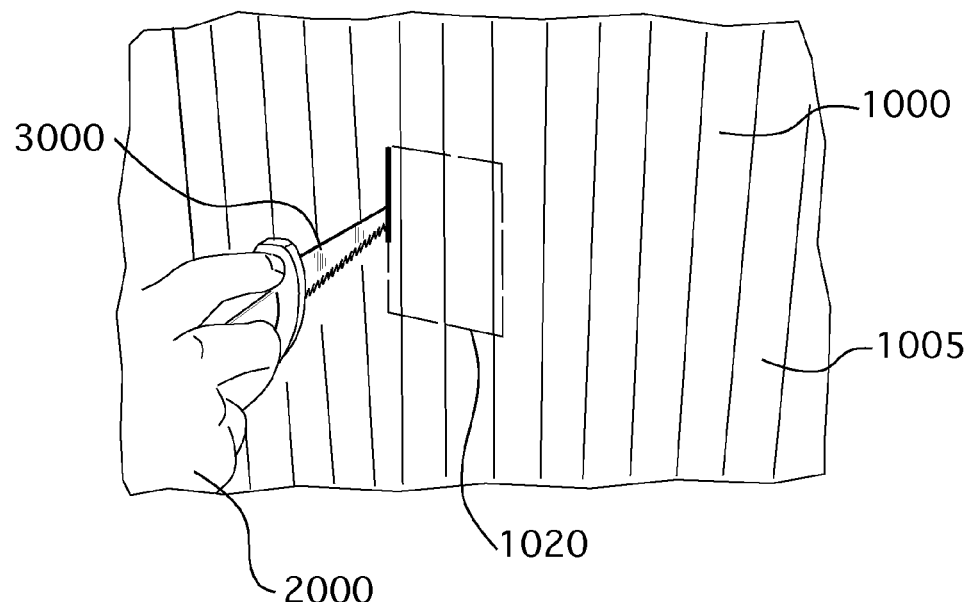
Figure 45:
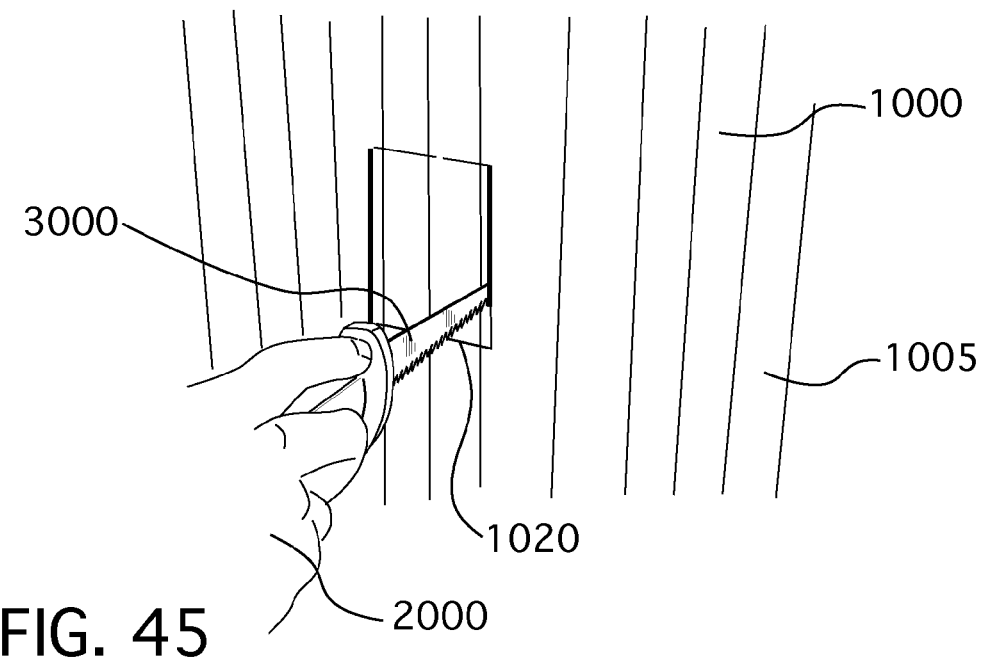
Figure 46:
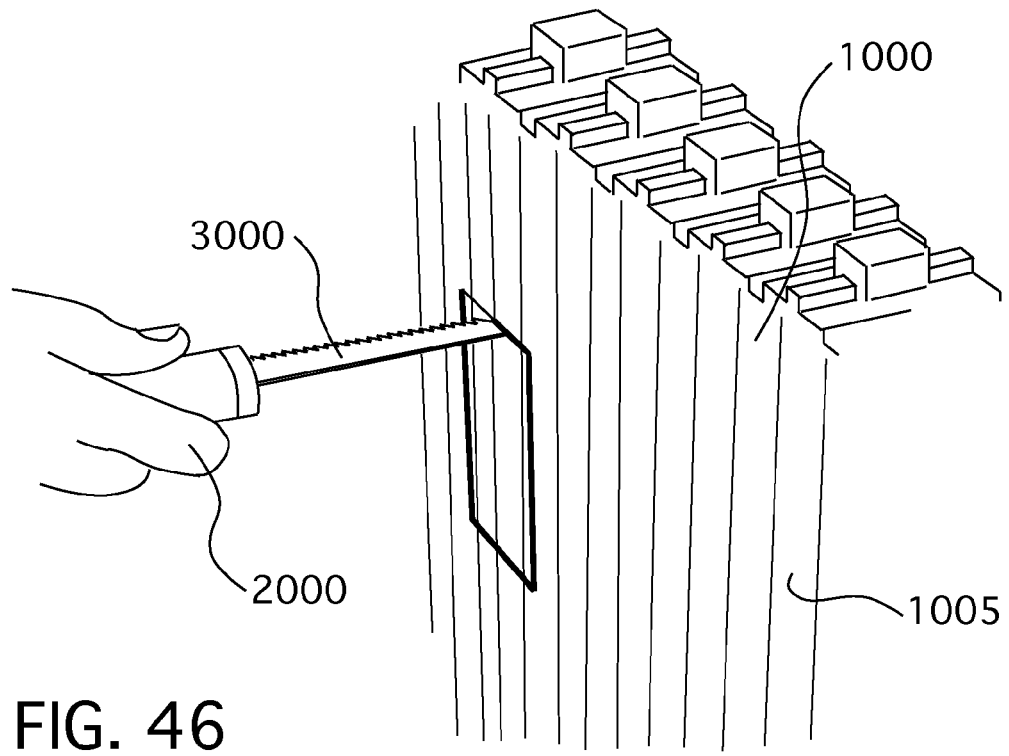
Figure 47:
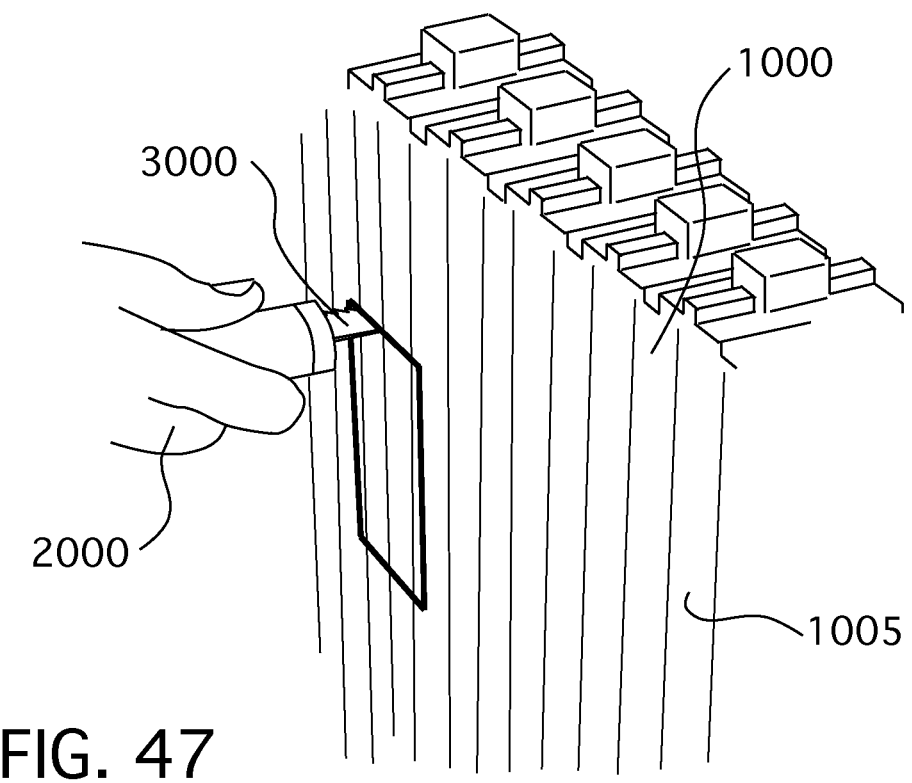
Figure 48:
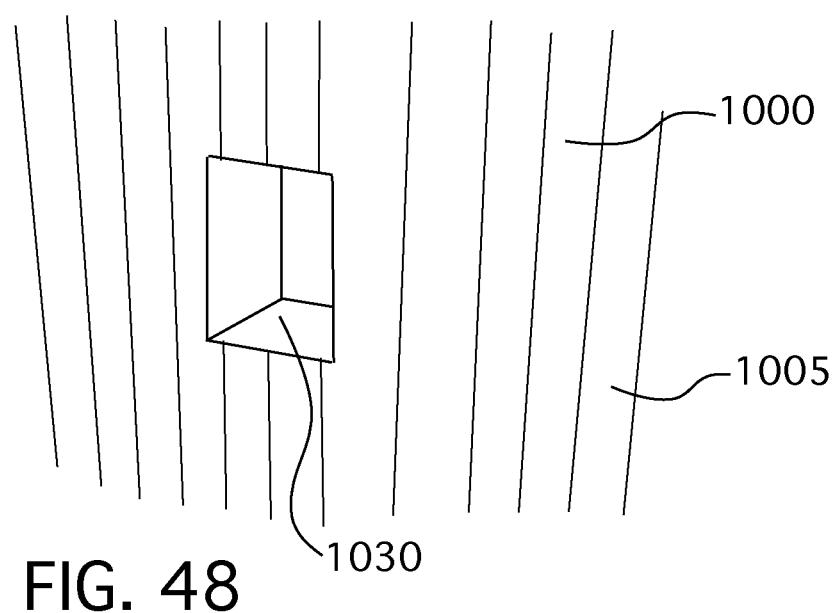
FIG. 48 is an illustration of the ICF showing a recess or cavity left after removal of ICF material freed from the cutting process of FIGS. 43-47.
Figure 49:
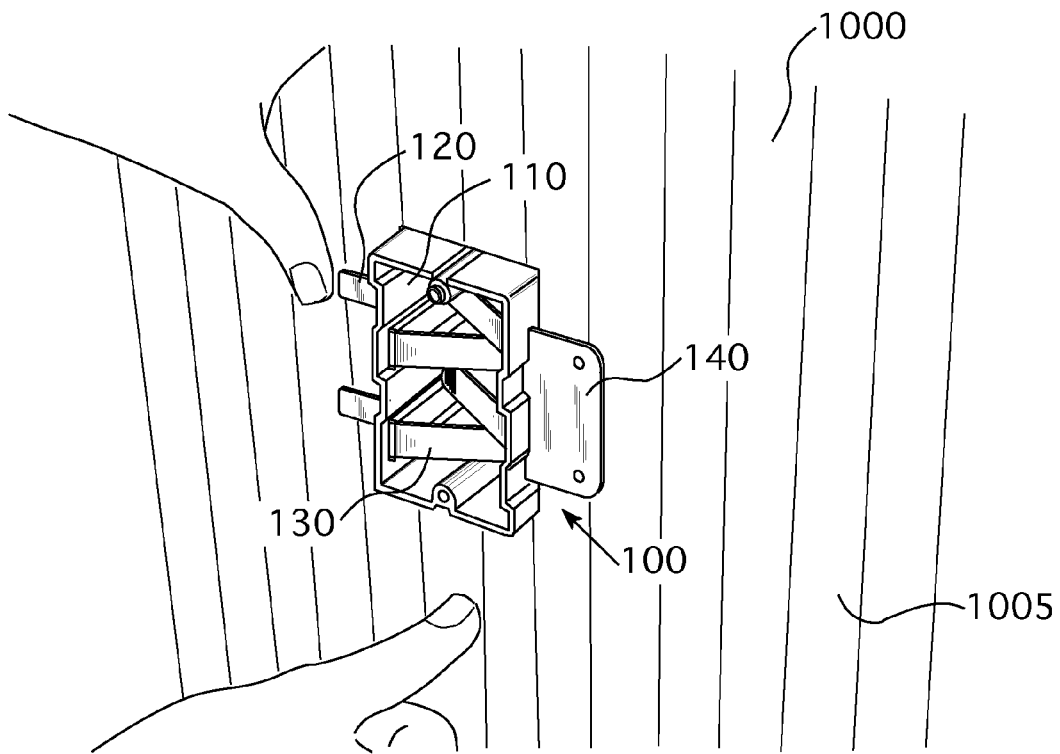
FIGS. 49-53 are illustrations of the electrical box 100 positioned in the cavity of the ICF of FIG. 48; four anchoring members are shown in storage positions.
Figure 50:
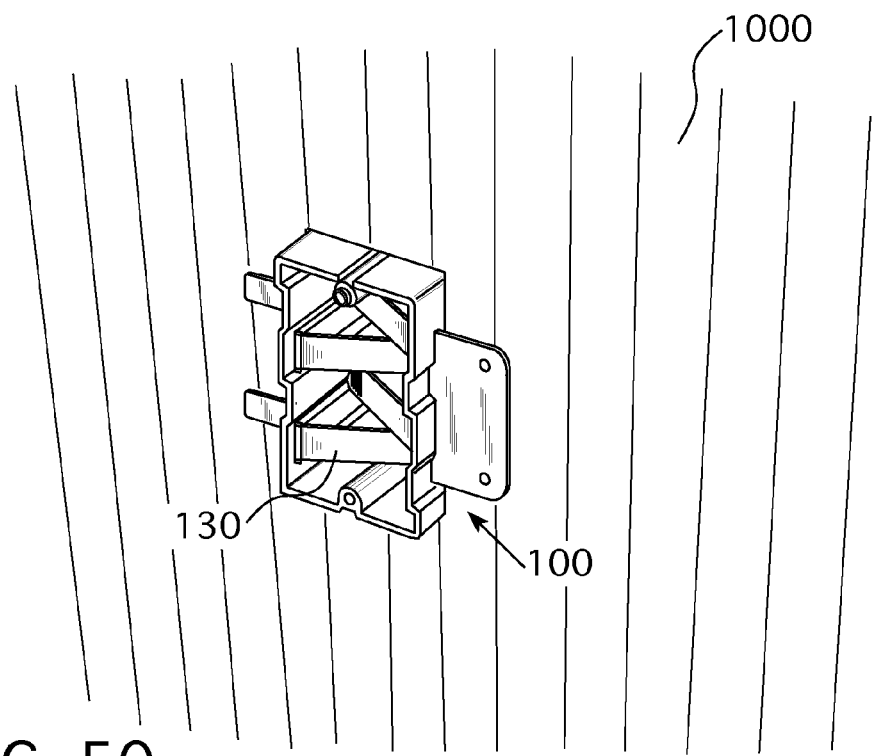
Figure 51:
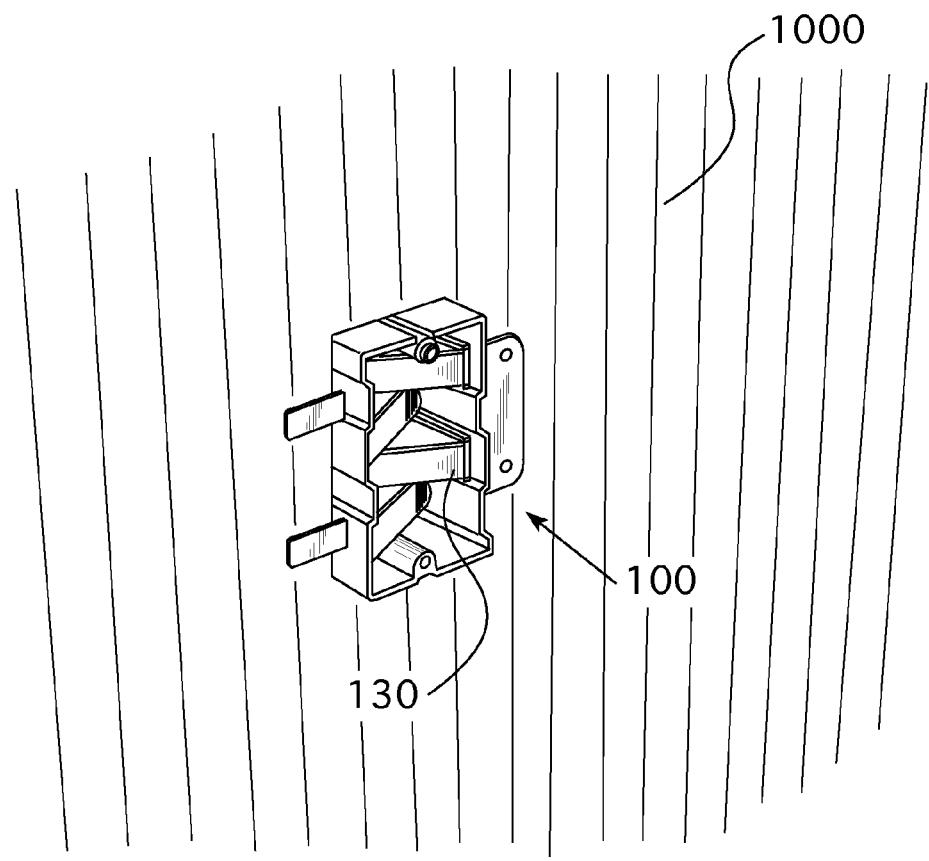
Figure 52:
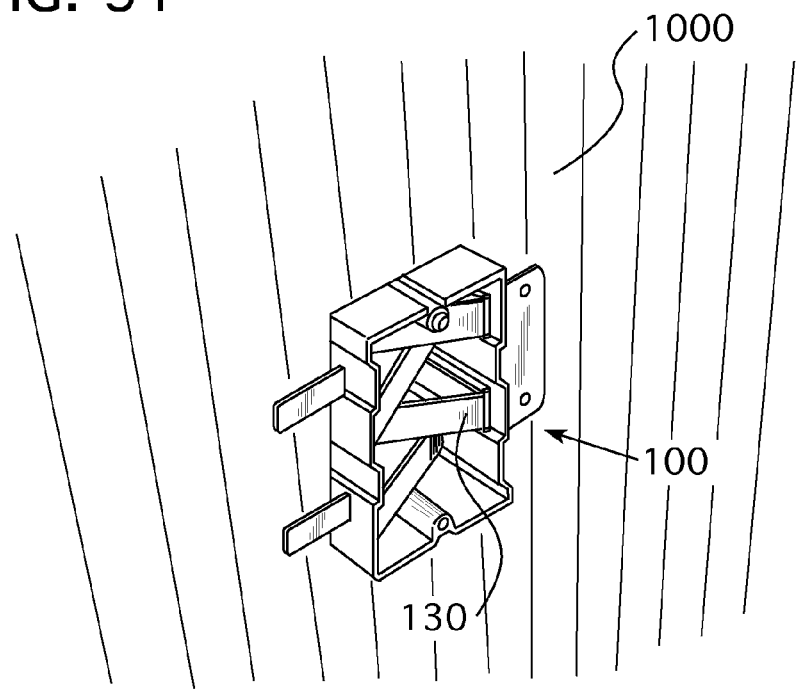
Figure 53:
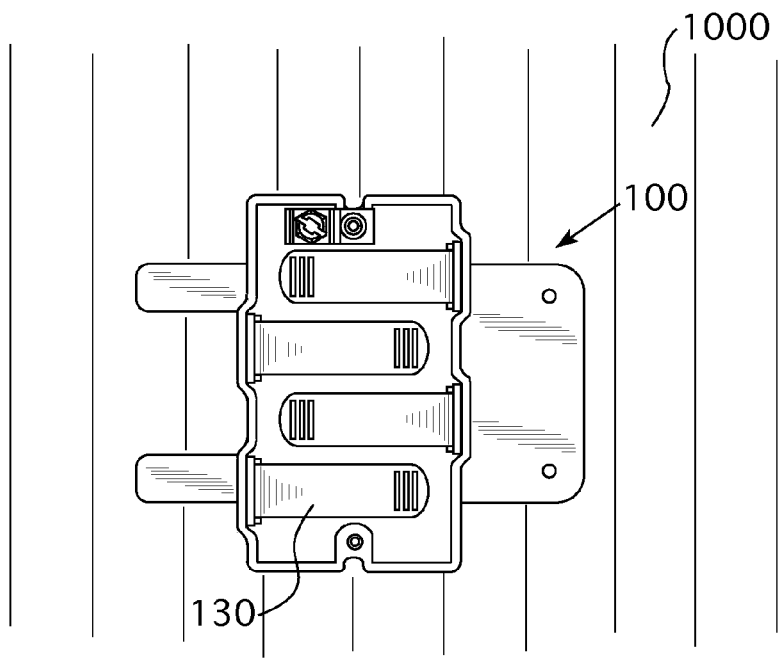
Figure 54:
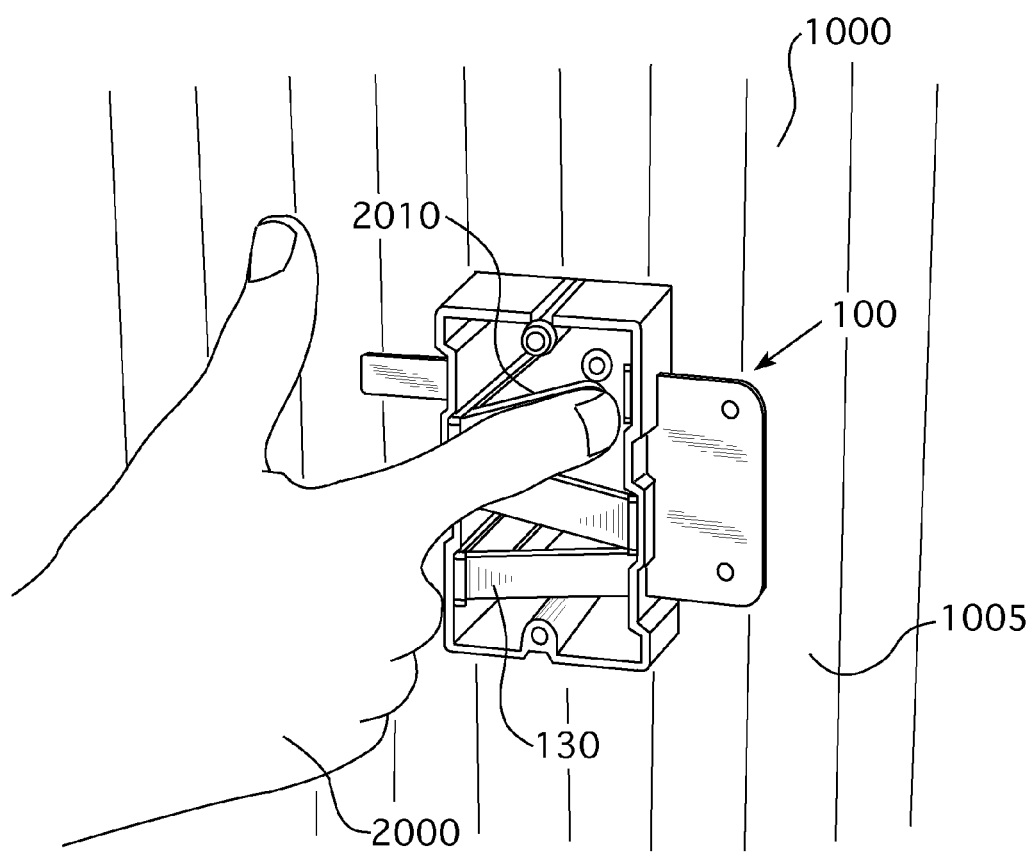
FIGS. 54-59 are illustrations of a user using a finger or thumb to press on an anchoring member of the electrical box of FIGS. 49-53 such that the anchoring member moves toward an inserted position.
Figure 55:
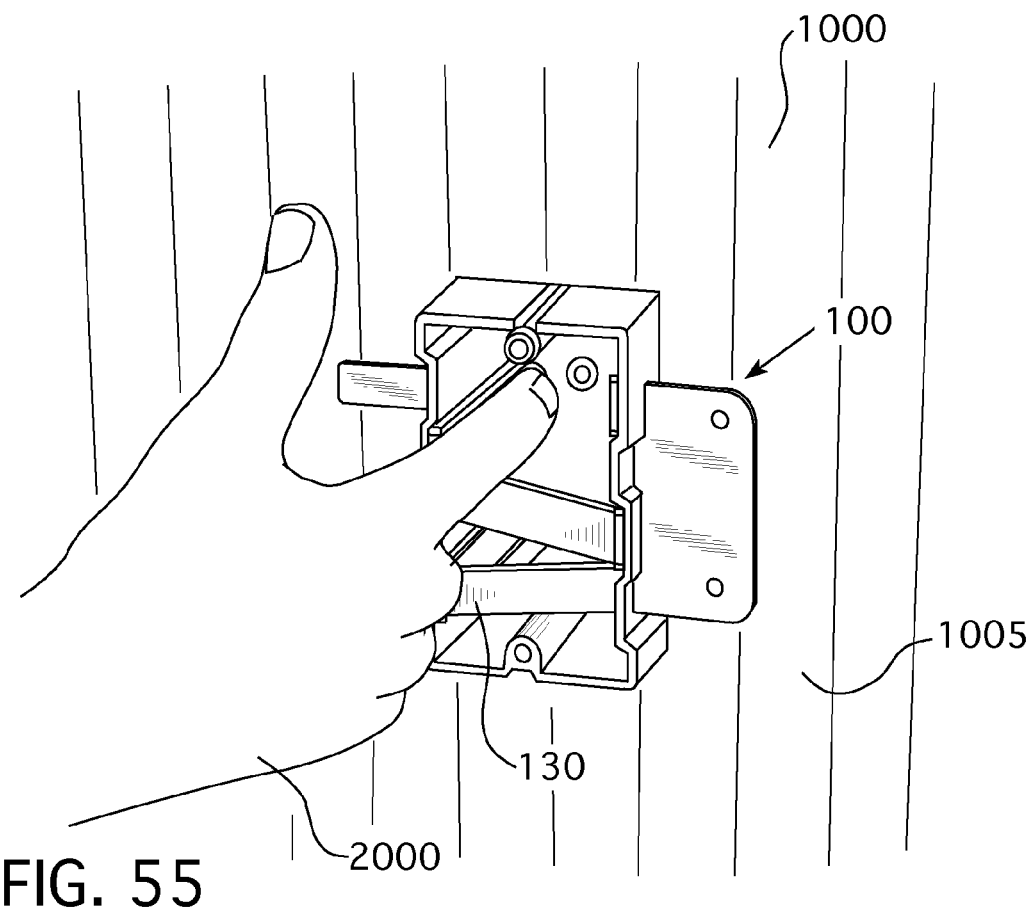
Figure 56:
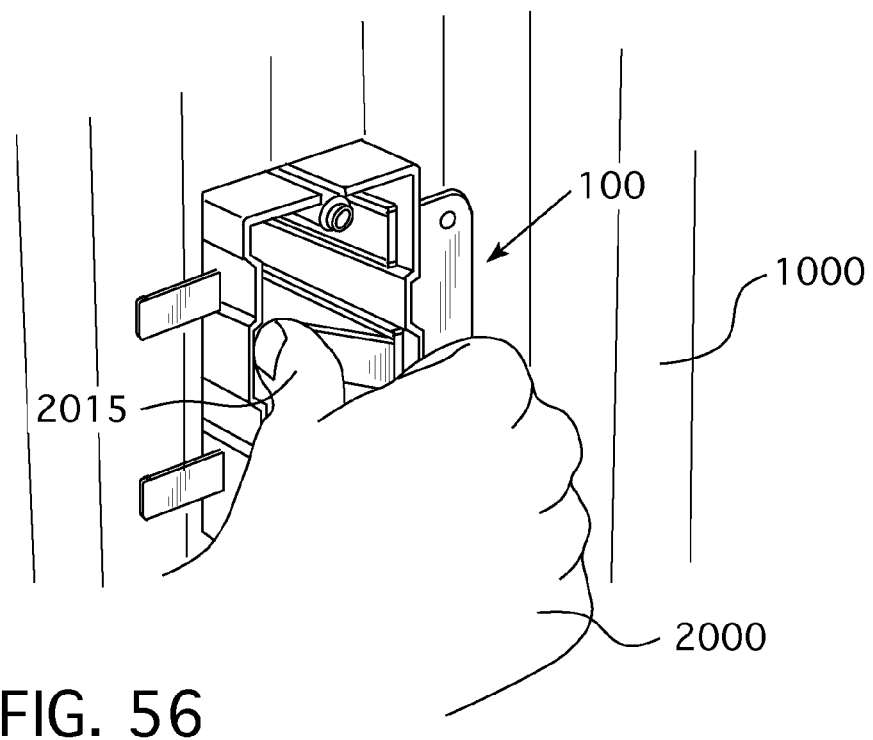
Figure 57:
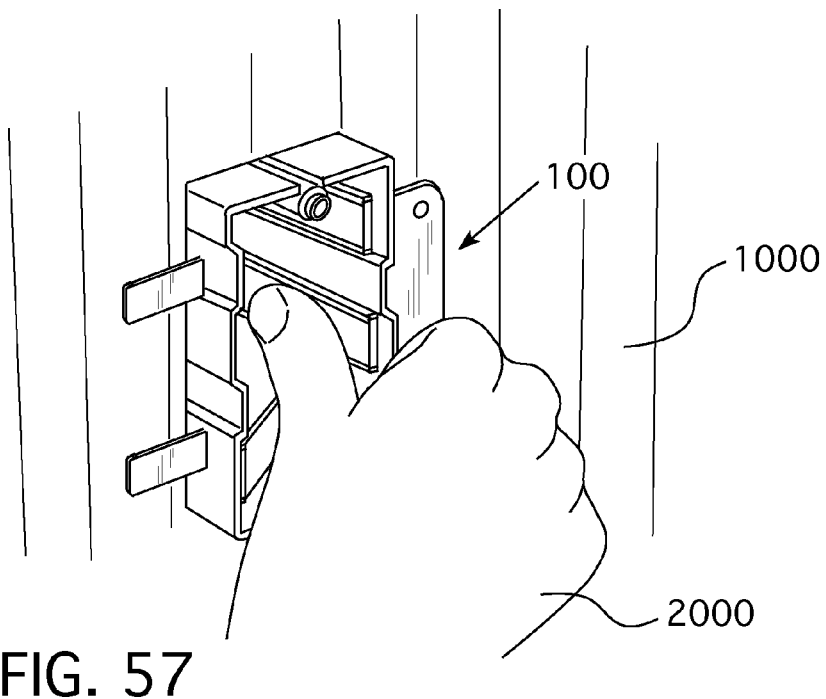
Figure 58:
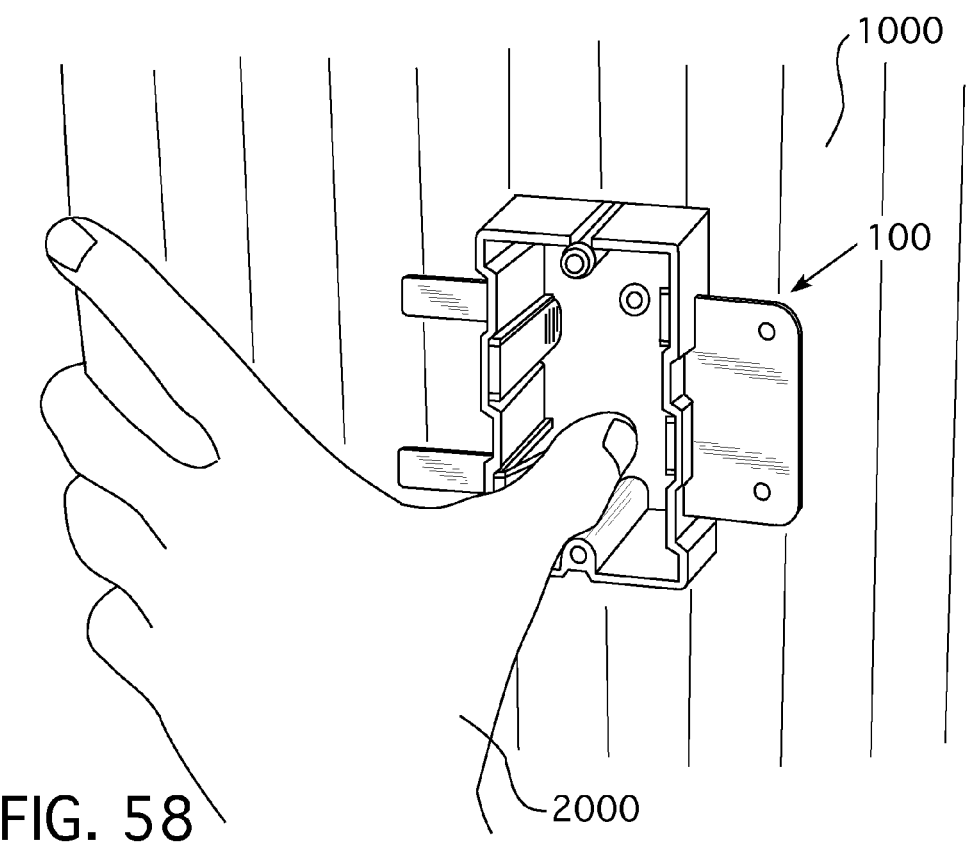
Figure 59:
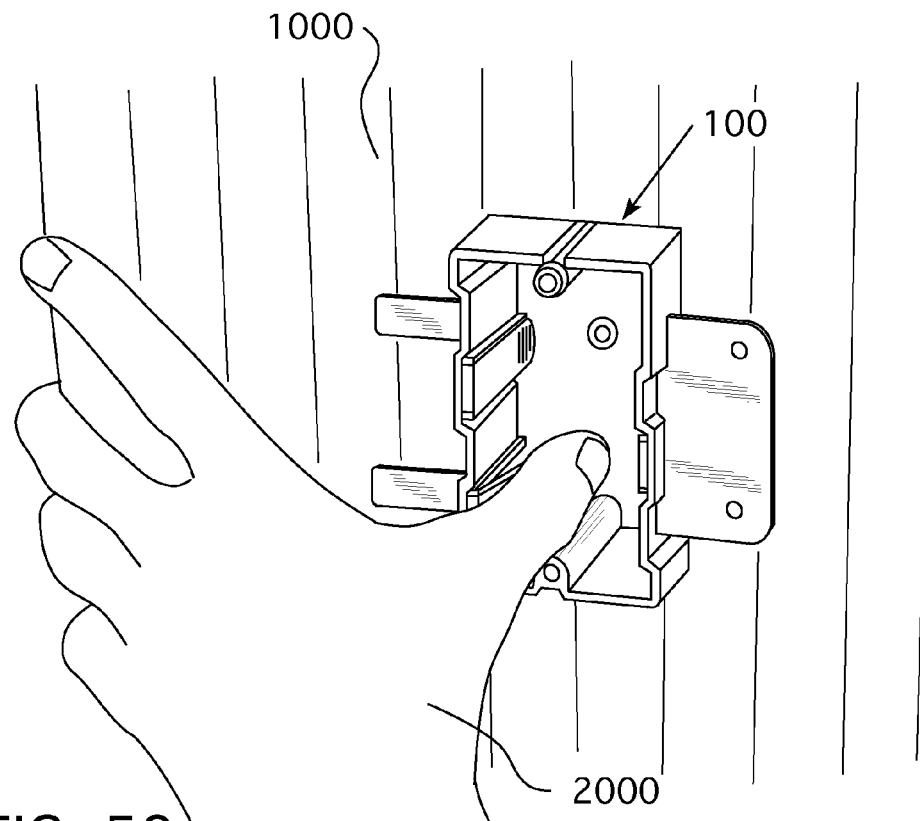

By way of example, FIGS. 39-61 provide illustrations of at least one embodiment showing various exemplary, but non-limiting, steps involved in preparing an ICF 1000 and installing an electrical box 100 therein. Electrical box 100 of FIGS. 39-61 is similar to electrical box 100 described above. FIG. 39 is an illustration of a non-limiting embodiment of an ICF 1000 before any concrete has been poured into the ICF. Here, ICF 1000 is made of a foam material, EPS and comprises at least one exterior surface 1005. Further, ICF 1000 includes non-foam based structural support components 1010 in the form of plastic ties. FIG. 40 is an illustration of a non-limiting embodiment of an electrical box 100 positioned with its front 110 against a surface of the ICF 1000 of FIG. 39 with a user 2000 tracing around the front 110 of the electrical box 100. The tracing may be done with a marker or other writing utensil that is capable of leaving a marking in the surface 1005 of the ICF 1000 such that the general profile of the front 110 of the electrical box is transferred to the surface 1005 of the ICF 1000. Alternatively, in various embodiments, a marking may be created by pressing at least a portion of the electrical box 100, e.g. the front 110, against the surface 1005 of the ICF 100 to leave a depression in the surface 1005 of the general profile of part of the electrical box 100, e.g. front 110. FIGS. 41-42 are illustrations of the ICF of FIG. 39 with traced markings 1020 left in the surface 1005 of the ICF 1000 by the tracing process shown in FIG. 40. FIGS. 43-47 are illustrations of the ICF 1000 of FIGS. 41-42 showing a user 2000 applying a cutting tool 3000 thereto to cut into the surface 1005 of the ICF 1000 along the traced markings 1020. Cutting tool 3000 may be a knife, saw, or other appropriate device that is capable of cutting EPS foam. Here, cutting tool 3000 is a hand saw. FIG. 48 is an illustration of the ICF showing a recess or cavity 1030 left after removal of ICF material freed from the cutting process of FIGS. 43-47.

FIGS. 49-53 are illustrations of the electrical box 100 positioned in the cavity 1030 of the ICF of FIG. 48; four anchoring members 130 of the electrical box 100 are shown in storage positions. Owing to positioning tabs 120, 140 of the electrical box 100, the front 110 of the electrical box is positioned approximately ½ inches away from the surface 1005 of the ICF 1000. As explained above, this provides an appropriate extension out from the ICF for the front 110 of the electrical box 100 to fit flush or as otherwise desired with a piece or pieces of drywall once hung on the ICF and appropriate cuts have been made to the drywall to receive a portion of the electrical box extending out of the ICF 1000.

Figure 60:
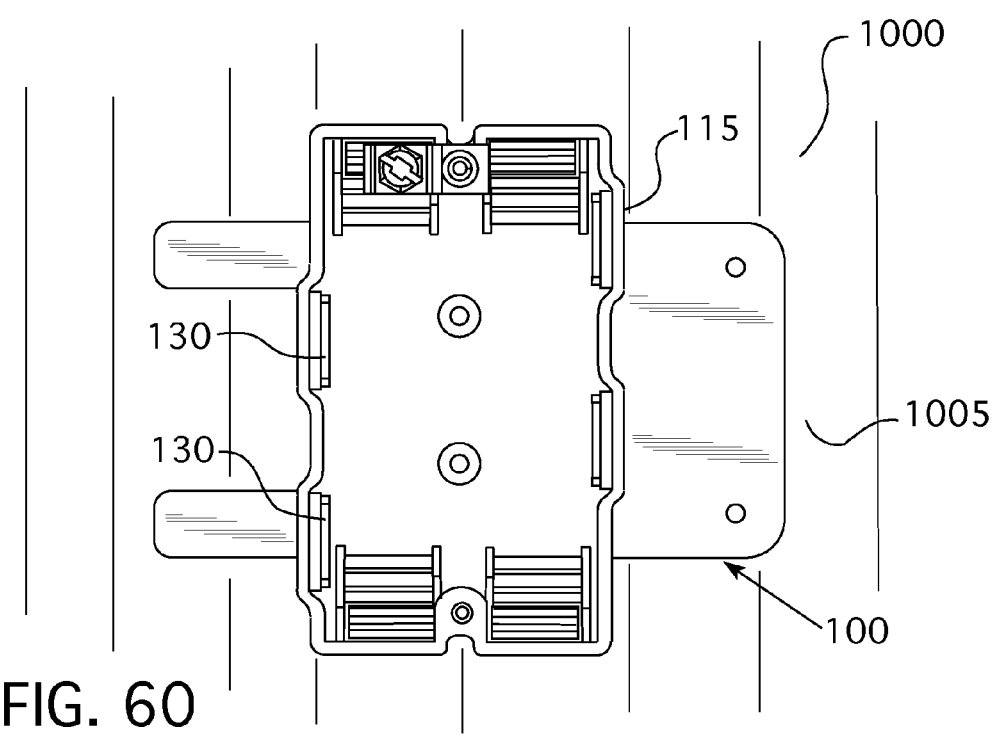
FIGS. 60-61 are illustrations of the electrical box of FIGS. 54-59 with all four anchoring members in inserted positions such that they are embedded in the material of the ICF such that the electrical box is anchored to the ICF; the space inside the container of the electrical box is now ready to receive an electrical device.
Figure 61:
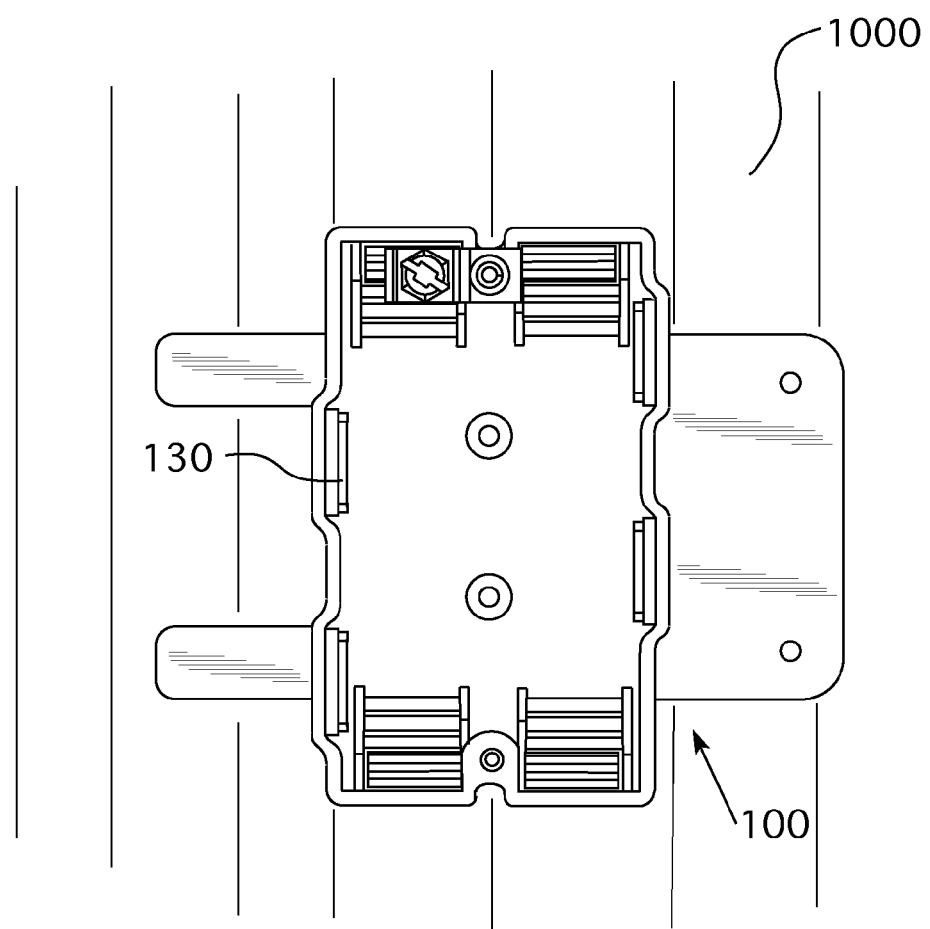

FIGS. 54-59 are illustrations of a user 2000 using a finger 2010 or thumb 2015 to press on different anchoring members 130 of the electrical box 100 of FIGS. 49-53 such that each anchoring member 130 moves toward an inserted position and into the material of the ICF 1000. Here, each anchoring member 130 is being pressed one at a time; however, as explained above, multiple anchoring members 130 may be pressed at approximately the same time. FIGS. 60-61 are illustrations of the electrical box 100 with all four anchoring members 130 in inserted positions such that they are embedded in the material of the ICF and the electrical box 100 is thus anchored to the ICF; the space inside the container 115 of the electrical box 100 is now ready to receive an electrical device.

Figure 62:
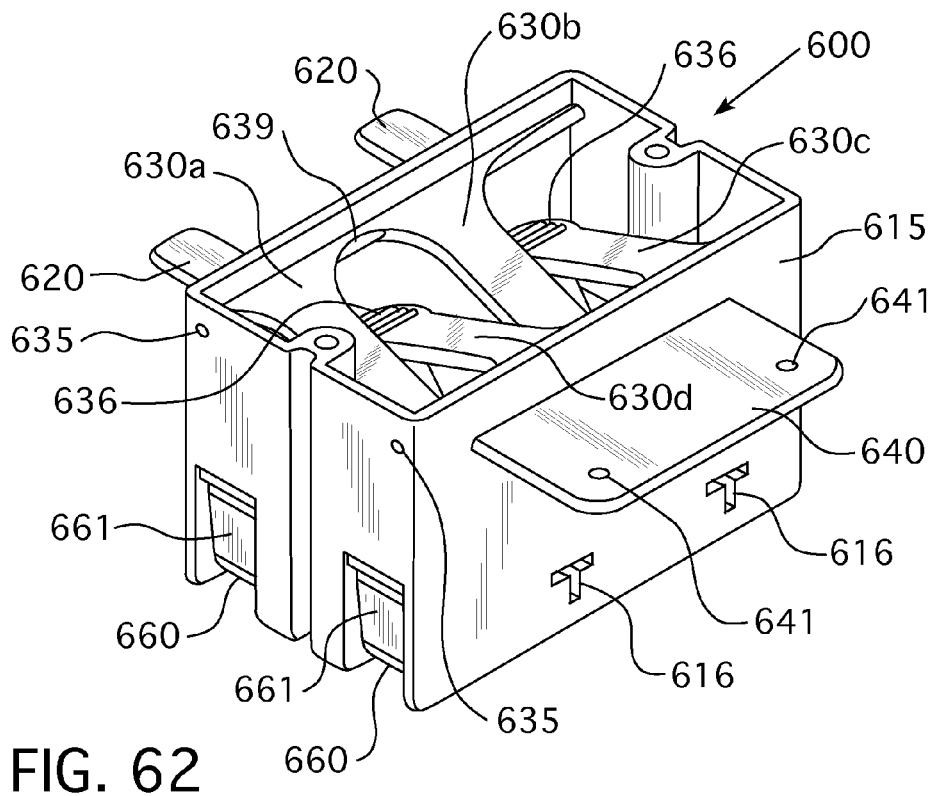
FIG. 62 is a perspective view of a non-limiting embodiment of an electrical box for installation in ICF with two pairs of interconnected anchoring members in storage positions.
Figure 63:
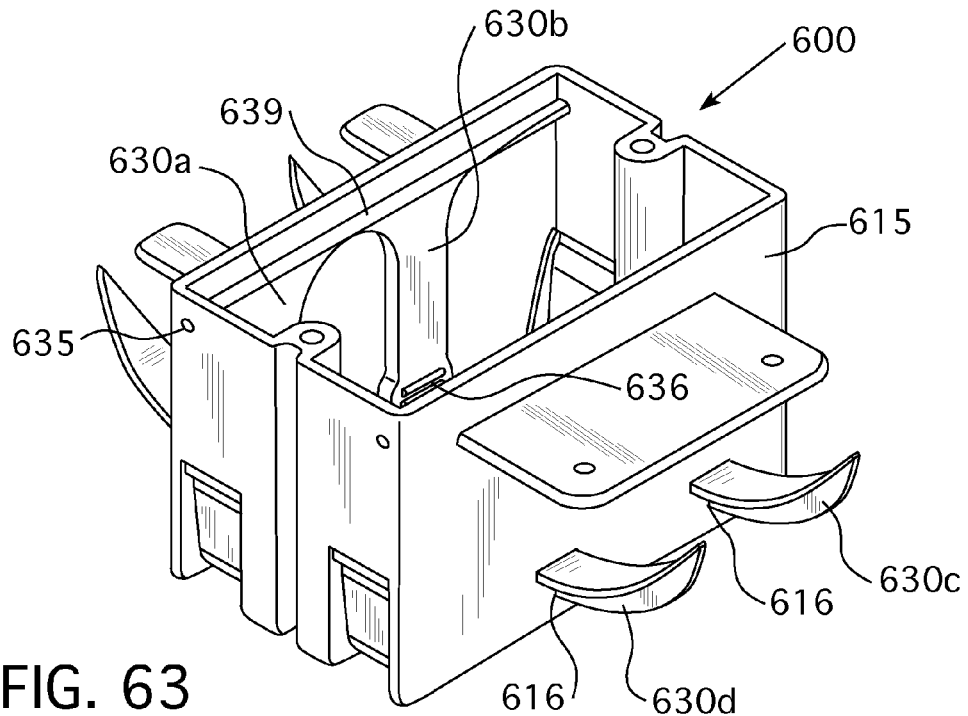
FIG. 63 is a perspective view of the electrical box of FIG. 62 with the two pairs of interconnected anchoring members in inserted positions.

In various embodiments described above, each anchoring member has been designed to independently rotate about an axis that is parallel to a plane of an opening of a container of the respective electrical box. Alternative embodiments are also possible for providing an anchoring member or members that may move from a storage position inside a container to an inserted position at least partially outside the container. For example, in various embodiments and referring to FIGS. 62-63, an electrical box may be provided that comprises at least two or more anchoring members, where the two or more anchoring members are connected to each other. FIG. 62 is a perspective view of such a non-limiting embodiment of an electrical box 600 for installation in ICF with two pairs of interconnected anchoring members 630a,b and 630c,d shown in storage positions. FIG. 63 is a perspective view of the electrical box 600 with the two pairs of interconnected anchoring members 630a,b and 630c,d shown in inserted positions. Anchoring member 630a may be connected to anchoring member 630b by intermediate portion 639. Intermediate portion 639, anchoring member 630a, and anchoring member 630b may be unitary and integrally formed from one piece of material, plastic, for example. Anchoring member pair 630c,d may be symmetric with anchoring member pair 630a,b and thus contain similar portions. Additionally, at the rotational ends of anchoring member pairs 630a,b and 630c,d are hinge protrusions 635 that may cooperate with holes formed in the side walls of container 615 to form hinged joints about which the anchoring member pairs 630a,b and 630c,d may rotate. Accordingly, each pair of anchoring members 630a,b and/or 630c,d may be rotated in unison about their respective rotational axes.

Further, electrical box 600 may be similar to other electrical boxes described above. For example, each anchoring member 630*a,b,c,d* may have textured finger grips 636 and, when pressed, are designed to drive a portion of anchoring member 630*a,b,c,d* through wall holes 616 defined in side walls of container 615 (compare FIG. 62 with FIG. 63). Ports 660 may include integral molded clamps 661 or other types of port components as described above. Positioning tabs 620, 640 and fastener holes 641 are also similar to that previously described as well.

Figure 64:
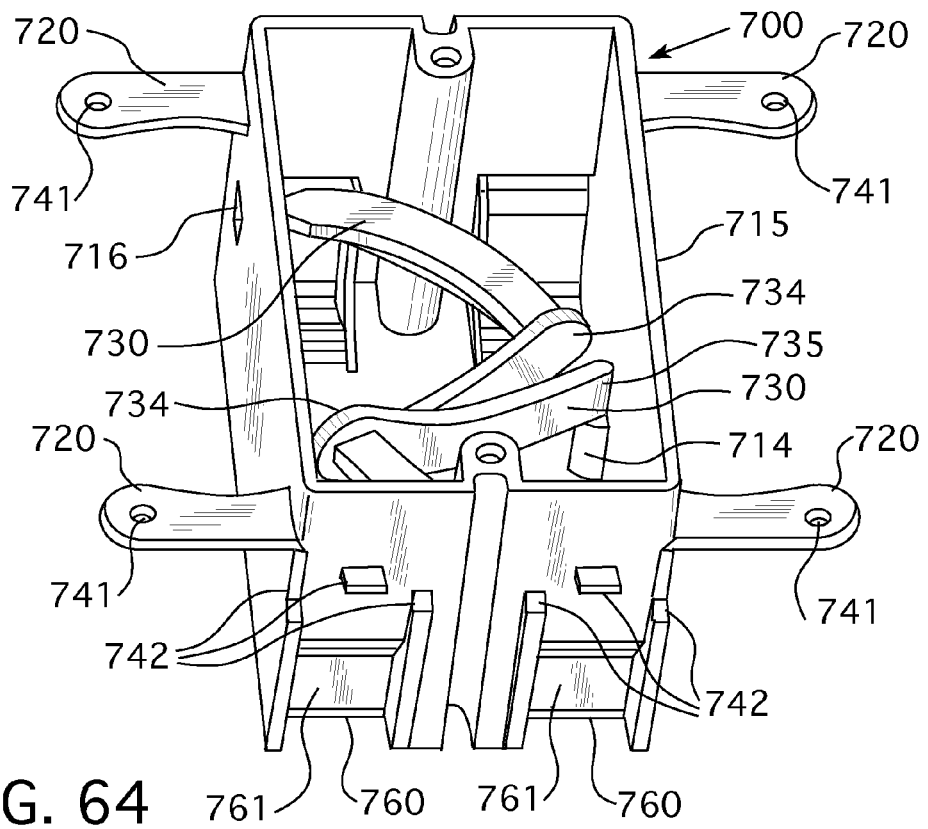
FIG. 64 is a perspective view of a non-limiting embodiment of an electrical box for installation in ICF with two anchoring members in storage positions; the anchoring members may rotate about an axis that is perpendicular to the opening of the electrical box.
Figure 65:
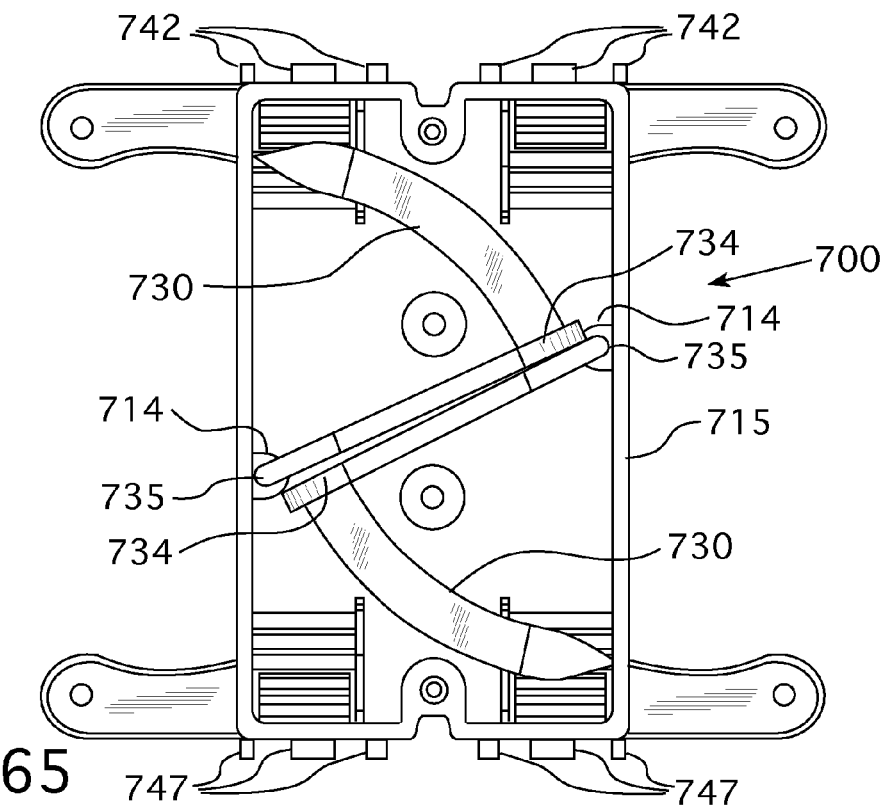
FIG. 65 is a front view of the electrical box of FIG. 64.
Figure 66:
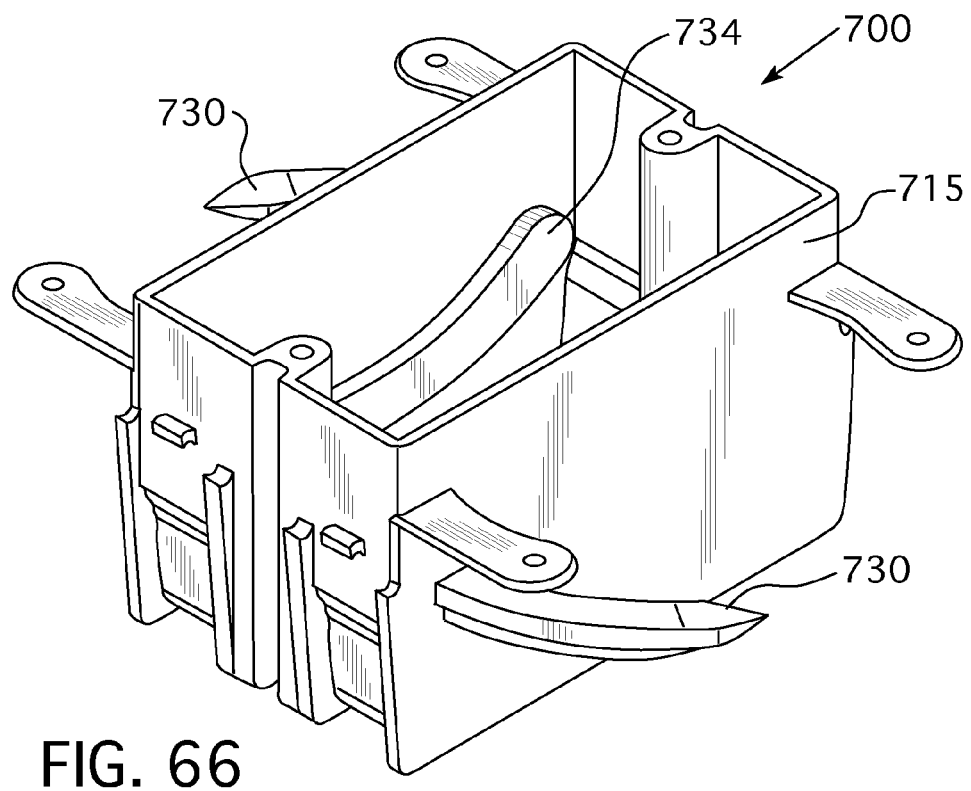
FIG. 66 is a perspective view of the electrical box of FIG. 64 with the two anchoring members in inserted positions.

In various embodiments and referring now to FIGS. 64-66, an electrical box may be provided comprising at least one wall defining an opening sized and configured to receive an electrical device, where the opening defines a plane, and at least one anchoring member may be rotatably mounted to the container of the electrical box such that the anchoring member may rotate about an axis that is perpendicular to the plane of the opening. FIG. 64 is a perspective view of a non-limiting embodiment of an electrical box 700 for installation in ICF with two anchoring members 730 in storage positions; the anchoring members may rotate about an axis that is perpendicular to the opening of the electrical box 700. FIG. 65 is a front view of the electrical box 700 of FIG. 64. FIG. 66 is a perspective view of the electrical box 700 of FIG. 64 with the two anchoring members 730 in inserted positions. Each anchoring member 730, which may be symmetric with the other member, may include a finger operable surface 734. Anchoring member 730 may be curved and/or contoured such that a sufficient portion of finger operable surface 734 is presented to a part of a user's hand when the anchoring members 730 are in storage positions as shown in FIG. 64. Hinge end 735 of anchoring member 730 may be received in hinge 714 formed in the interior of container 715 to form a hinged joint about which anchoring member 730 may rotate from a storage position (FIGS. 64-65) to an inserted position (FIG. 66) through wall hole 716 when a user presses on finger operable surface 734 of at least one of the anchoring members 730.

Further, electrical box 700 may be similar to other electrical boxes described above. For example, ports 760 may include integral molded clamps 761 or other types of port components as described above. Positioning tabs 720 and fastener holes 741 may be also similar to that previously described, except that each tab 720 may be generally about the same size and each positioning tab 720 may also include a fastener hole 741. Additionally, electrical box 700 may include captive nail guides 742 for attaching the electrical box 700 to a wood stud with a nail, for example, where it is undesirable to use fastener holes 741.

Figure 67:
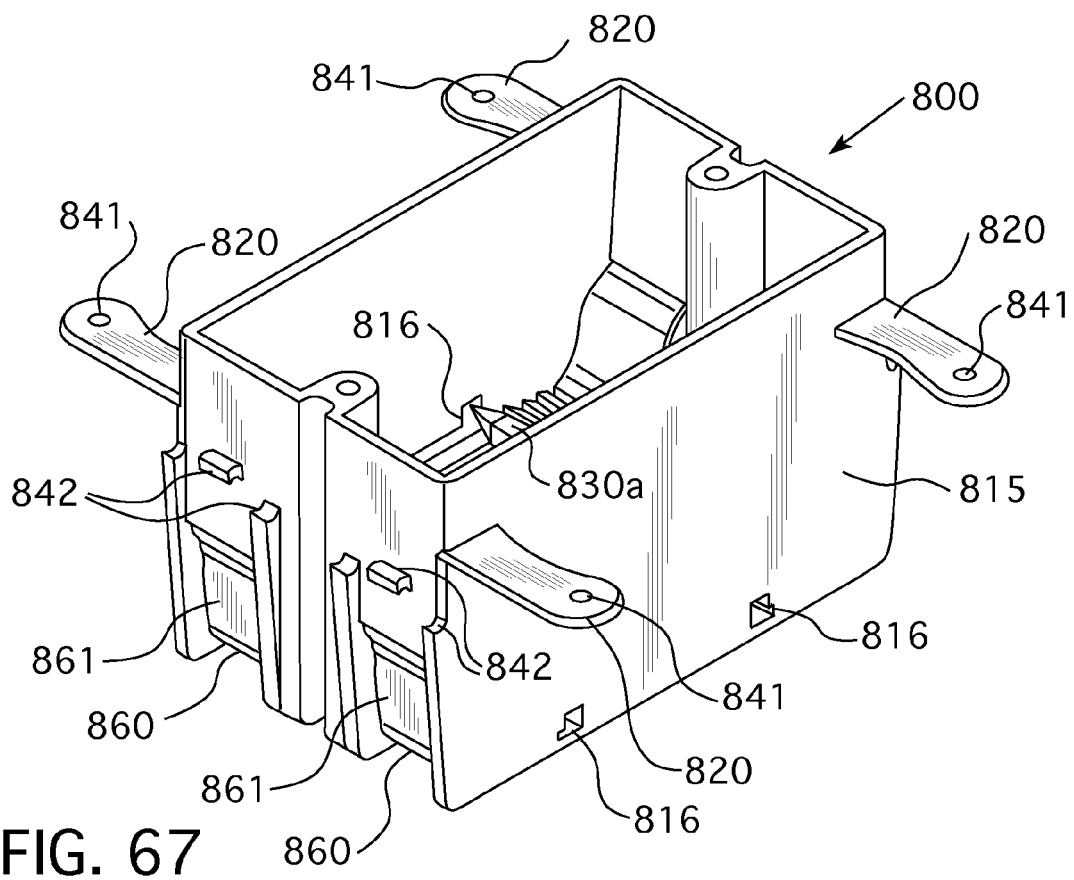
FIG. 67 is a perspective view of a non-limiting embodiment of an electrical box for installation in ICF with two pairs of translating but non-rotating anchoring members in storage positions.
Figure 68:
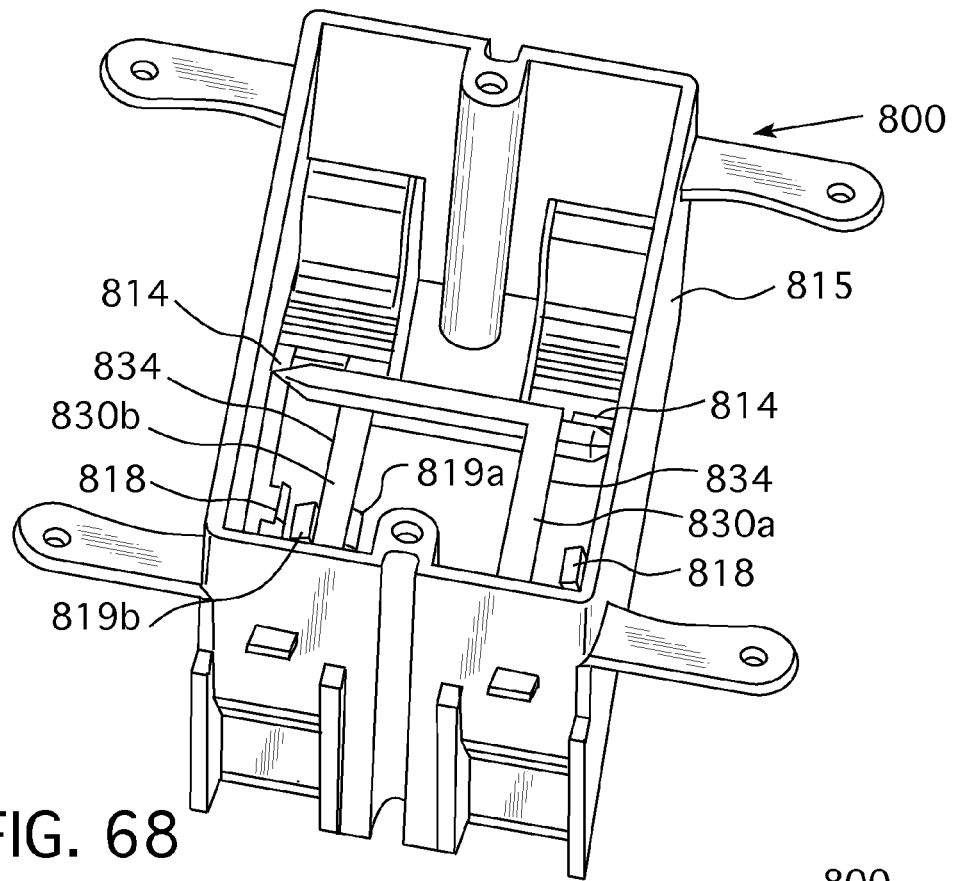
FIG. 68 is another perspective view of the electrical box of FIG. 67 showing the anchoring members and various details of the interior of the electrical box.
Figure 69:
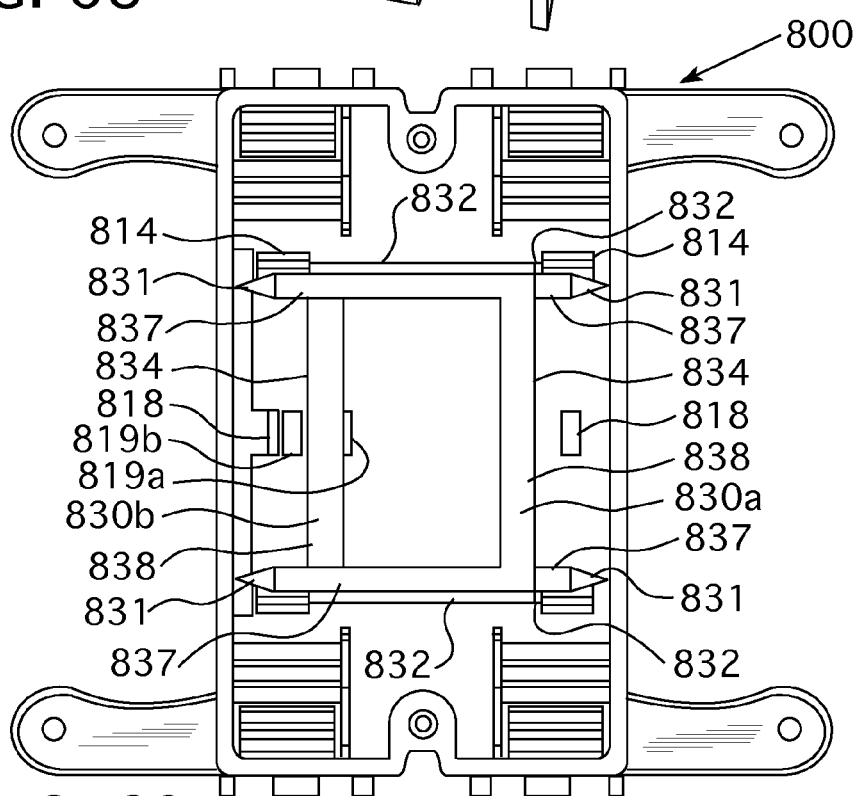
FIG. 69 is a front view of the electrical box of FIG. 67.
Figure 70:
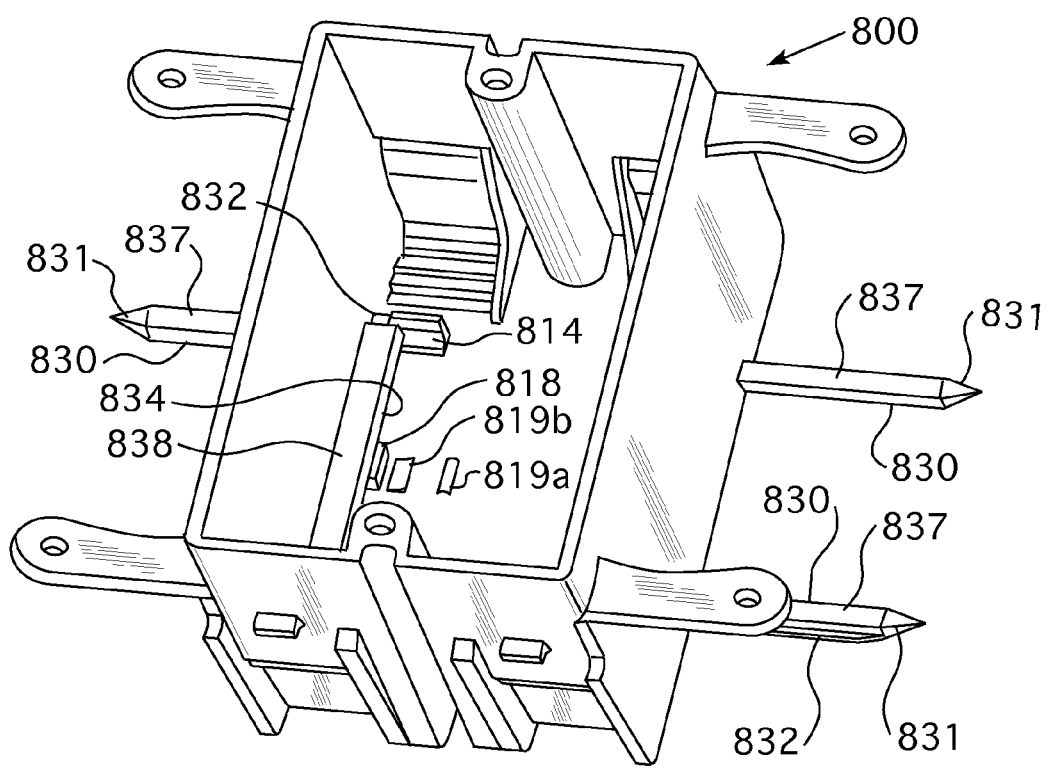
FIG. 70 is a perspective view of the electrical box of FIG. 67 with the two pairs of anchoring members translated into inserted positions.

In various embodiments and referring now to FIGS. 67-70, an electrical box may be provided similar as described previously, except at least the anchoring members may be configured to translate and not rotate about a fixed axis with respect to the container of the electrical box when moving from a storage position to an inserted position. FIG. 67 is a perspective view of a non-limiting embodiment of an electrical box 800 for installation in ICF with two pairs of translating but non-rotating anchoring members 830*a* and 830*b* in storage positions. FIG. 68 is another perspective view of the electrical box 800 of FIG. 67 showing the anchoring members 830*a* and 830*b* and various details of the interior of the electrical box 800. FIG. 69 is a front view of the electrical box 800 of FIG. 67. FIG. 70 is a perspective view of the electrical box of FIG. 67 with the two pairs of anchoring members 830*a* and 830*b* translated into inserted positions. The anchoring members 830*a* and 830*b* may function like drawers in that each may be slid or translated, from a storage position (see FIGS. 67-69), through wall holes 816 formed in the walls of container 815, into inserted positions (see FIG. 70).

Referring now to FIGS. 68-69, various features may be formed and/or attached to the container 815 to help hold the anchoring members 830*a* and 830*b* in storage positions. For example, anchoring members 830*a* and 830*b* may be held against the floor of the container 815 and/or each other by shoulders 814 protruding from the floor of the container 815. Shoulders 814 are designed to slidably engage side tapered walls 832 of anchoring members 830*a* and 830*b* such that anchoring members 830*a* and 830*b* may translate toward and away from holes 816 but not toward the front of the container 815. Further, forward bump 819*a* and backward stop 819*b* may be formed in the floor of the container 815 such that anchoring member 830*a* may be releasably held in the illustrated storage position until a user presses and/or pulls on finger operable portion 838. Likewise, anchoring member 830*b* may be held in the storage position by friction between shoulders 814 and the top surface of anchoring member 830*a*. By way of example, once a user pushes on finger operable surface 834 of anchoring members 830*a* and 830*b* with sufficient force to overcome resistance provided by the forward bump 819*a* and to overcome the aforementioned friction, the insertable portions 837, including tips 831, of anchoring members 830*a* and 830*b* may be driven through wall holes 816. Once in the inserted positions, as illustrated in FIG. 70, backstops 818 formed in the container 815 may lock onto and prevent the anchoring members 830*a* and 830*b* from disengaging the ICF.

Further, electrical box 800 may be similar to other electrical boxes described above. For example, ports 860 may include integral molded clamps 861 or other types of port components as described above. Positioning tabs 820 and fastener holes 841 may be also similar to that previously described with respect to electrical box 700. Additionally, electrical box 800 may include captive nail guides 842 for attaching the electrical box 800 to a wood stud with a nail, for example, where it is undesirable to use fastener holes 841.

Figure 71:
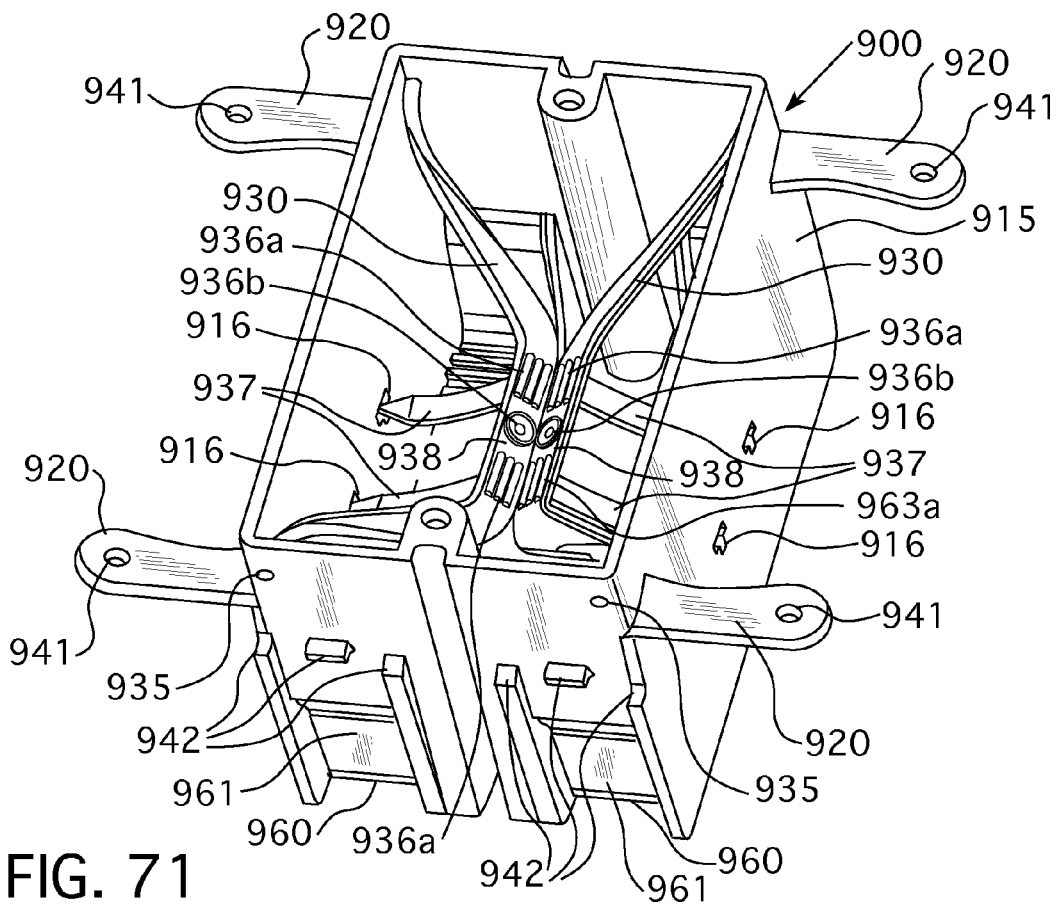
FIG. 71 is a perspective view of a non-limiting embodiment of an electrical box for installation in ICF with two pairs of anchoring members releasably connected together in storage positions; the anchoring members have both finger operable and tool operable portions.
Figure 72:
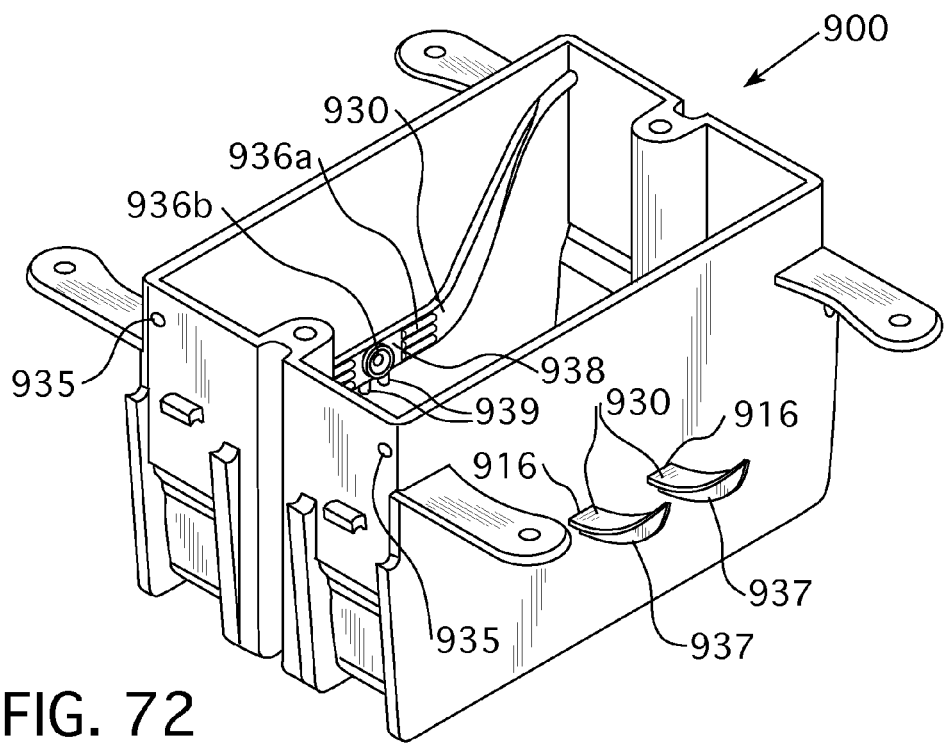
FIG. 72 is a perspective view of the electrical box of FIG. 71 with the two pairs of anchoring members in inserted positions
Figure 73:
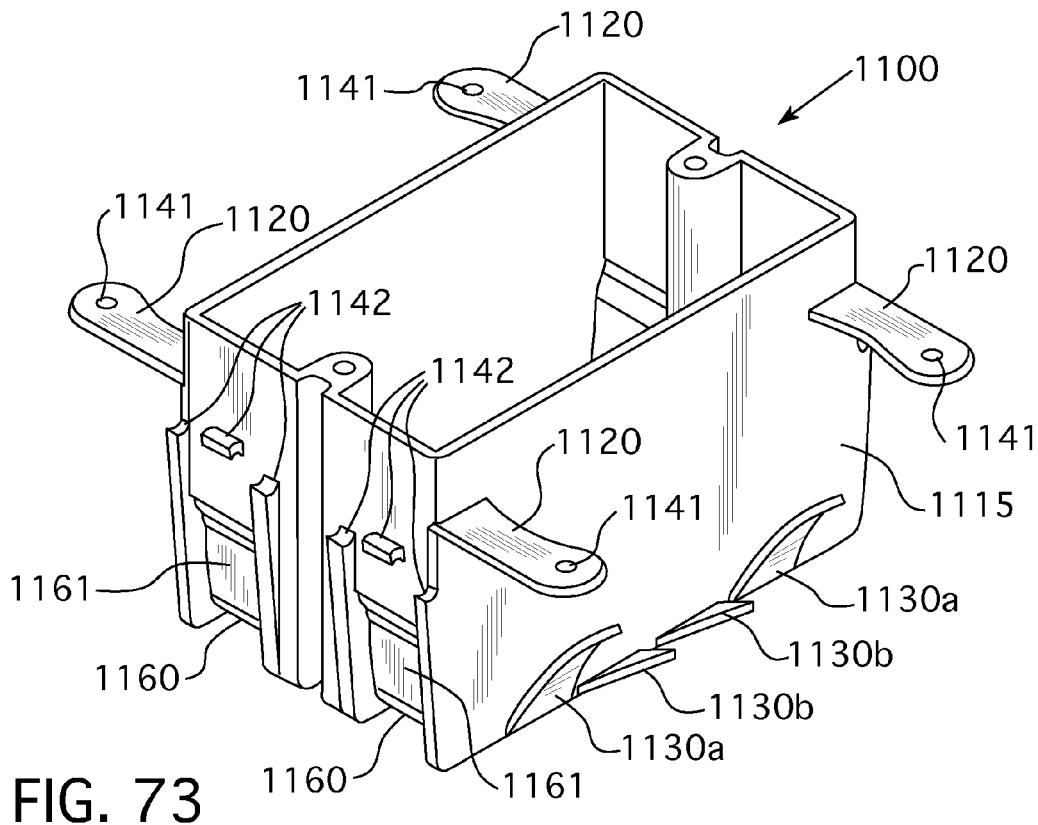
FIG. 73 is a perspective view of a non-limiting embodiment of an electrical box for installation in ICF with pointed, cantilevered anchoring members projecting outward from the box.

In various embodiments and referring now to FIGS. 71-72, an electrical box 900 may be provided similar as described previously, except at least an anchoring member 930 may include both a finger operable portion 936*a* and a tool operable portion 936*b*. FIG. 71 is a perspective view of a non-limiting embodiment of an electrical box 900 for installation in ICF with two anchoring members 930 releasably connected together in storage positions; the anchoring members have both finger operable portions 936*a* and tool operable portions 936*b*. FIG. 72 is a perspective view of the electrical box 900 with the two anchoring members in inserted positions. In various embodiments, and as seen in FIGS. 71-72, each anchoring member 930 may have more than one, e.g. two, insertable portions 937. Anchoring member 930 has a user operable portion 938 that comprises both a finger operable portion 936*a* and a tool operable portion 936*b* that may be adjacent to each other. Alternatively, although not shown, a finger operable portion and a tool operable portion may be combined together into one portion of anchoring member 930. The finger operable portion 936*a* may comprise textured finger grips as described above. The tool operable portion 936*b* may comprise an angled recess configured to receive a tool, such as the head of a screwdriver. The angled recess of the tool operable portion 936*b* may be angled such that the screwdriver head, for example, is properly aligned and does not slide while a user is applying force to the portion 936*b*. Initially, the anchoring members 930 are in storage positions as shown in FIG. 71. The anchoring members 930 may be releasably held in the storage positions by clips 939 extending from the user operable portion 938 (see FIG. 72). Clips 939 on each anchoring member 930 are designed to interconnect and releasably lock the anchoring members in the storage positions. Once a user applies sufficient force to each anchoring member 930 via either finger operable portion 936a or tool operable portion 936b, the clips 939 may flex and release anchoring members 930 such that each insertable portion 937 rotates about hinge protrusion 935 and swings toward the inserted position, through wall hole 916 (see FIG. 72) as described above.

Further, electrical box 900 may be similar to other electrical boxes described above. For example, ports 960 may include integral molded clamps 961 or other types of port components as described above. Positioning tabs 920 and fastener holes 941 may be also similar to that previously described with respect to electrical box 700. Additionally, electrical box 800 may include captive nail guides 942 for attaching the electrical box 900 to a wood stud with a nail, for example, where it is undesirable to use fastener holes 941.

Figure 74:
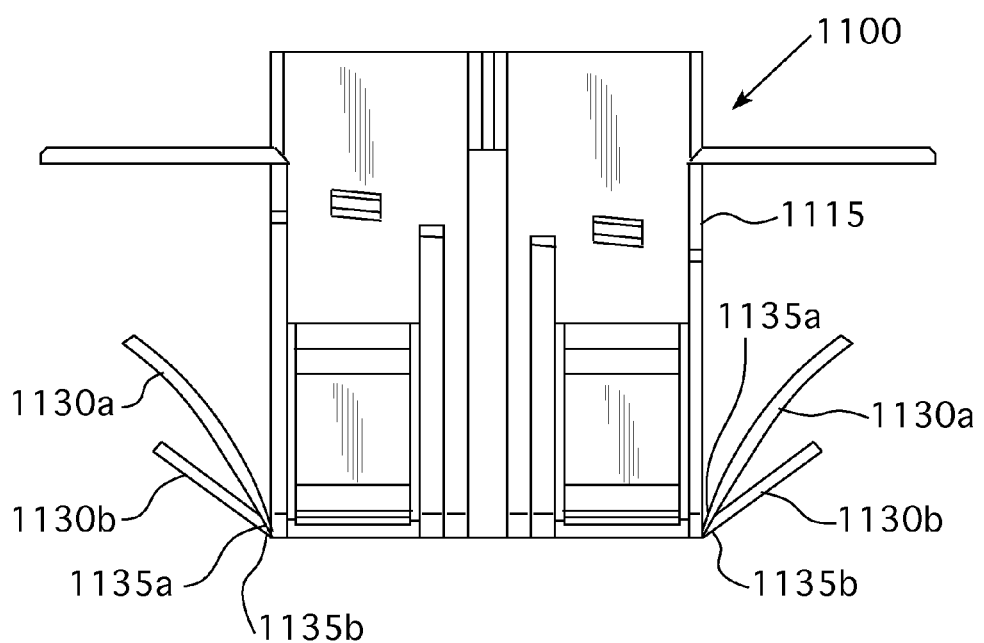
FIG. 74 is a side view of the electrical box of FIG. 73.

In various embodiments and referring now to FIGS. 73-76, an electrical box 1100, 1200 may be provided similar as described above, except at least the ICF anchoring structure(s) may include at least one cantilevered anchoring member 1130a,b, 1230 projecting from the container of the electrical box 1100, 1200. Each anchoring member 1130a,b, 1230 may be configured to grip a surface (e.g. a surface of cavity 1030 as seen in FIG. 48) when the surface applies an external force on the anchoring member toward the container. In other words, each cantilevered anchoring member 1130a,b, 1230 may provide an internal resistive force away from the container 1115 when an external force is applied to a free end of the anchoring member towards the container 1115, 1215, such that cantilevered anchoring member 1130a,b, 1230 bends toward the container about each anchoring member's 1130a,b, 1230 fixed end. Because such cantilevered anchoring members 1130a,b, 1230 may be unitary and integrally formed from the same material, e.g. plastic, as the container 1115, 1215, cantilevered anchoring members may be desirable to reduce the number of movable and/or assembled parts of the electrical box. Exemplary cantilevered anchoring members may be seen in FIG. 73, which is a perspective view of a non-limiting embodiment of an electrical box 1100 for installation in ICF with pointed, cantilevered anchoring members 1130a and 1130b projecting outward from the box. FIG. 74 is a side view of the electrical box 1100. The anchoring members 1130a,b may be pointed and of various sizes; for example, a first anchoring member 1130a may be larger than a second anchoring member 1130b. Each anchoring member 1130a,b may be configured to flex or bend about a thinned section 1135a,b, respectively. Accordingly, the electrical box 1110 may be pressed into a recess in an ICF such that the pointed, cantilevered anchoring members 1130a,b are forced into the material of the ICF. The anchoring members 1130a,b thus may grip the container 1115 in the ICF in a barb-like fashion.

Further, electrical box 1100 may be similar to other electrical boxes described above. For example, ports 1160 may include integral molded clamps 1161 or other types of port components as described above. Positioning tabs 1120 and fastener holes 1141 may be also similar to that previously described with respect to electrical box 700. Additionally, electrical box 1100 may include captive nail guides 1142 for attaching the electrical box 1100 to a wood stud with a nail, for example, where it is undesirable to use fastener holes 1141.

Figure 75:
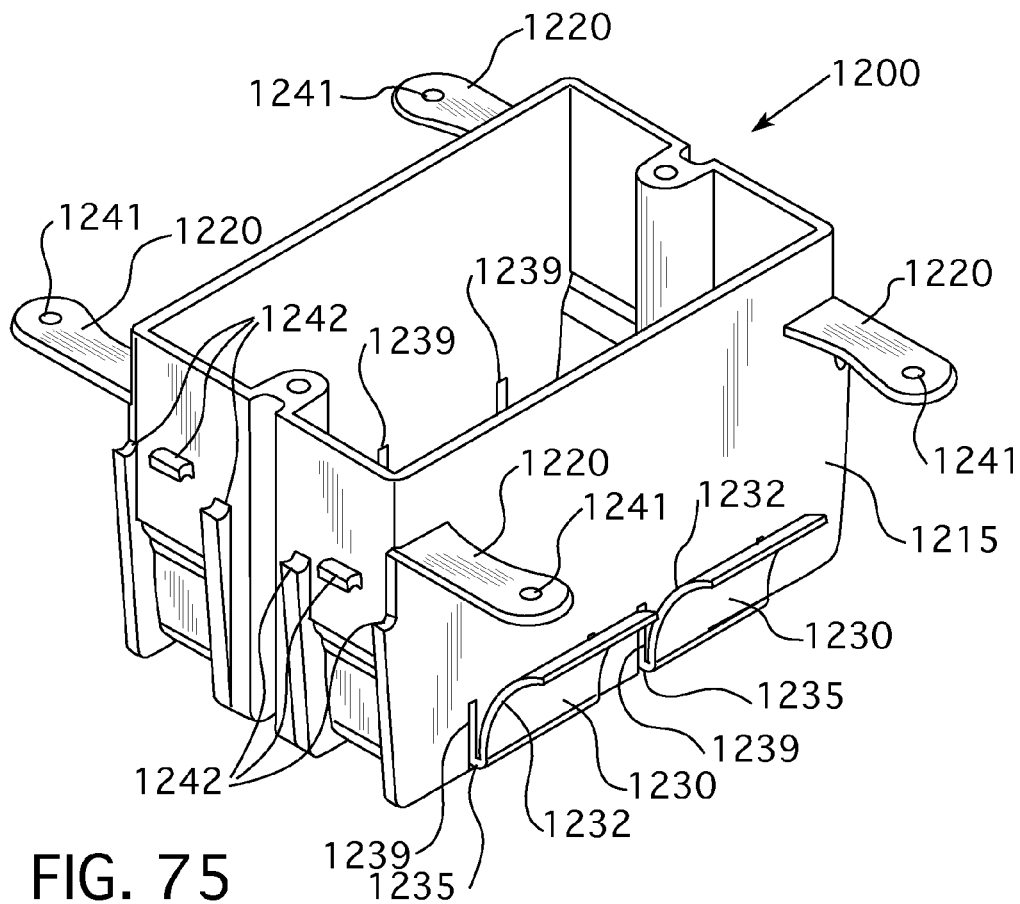
FIG. 75 is a perspective view of a non-limiting embodiment of an electrical box for installation in ICF with curved, cantilevered anchoring members projecting outward from the box.
Figure 76:
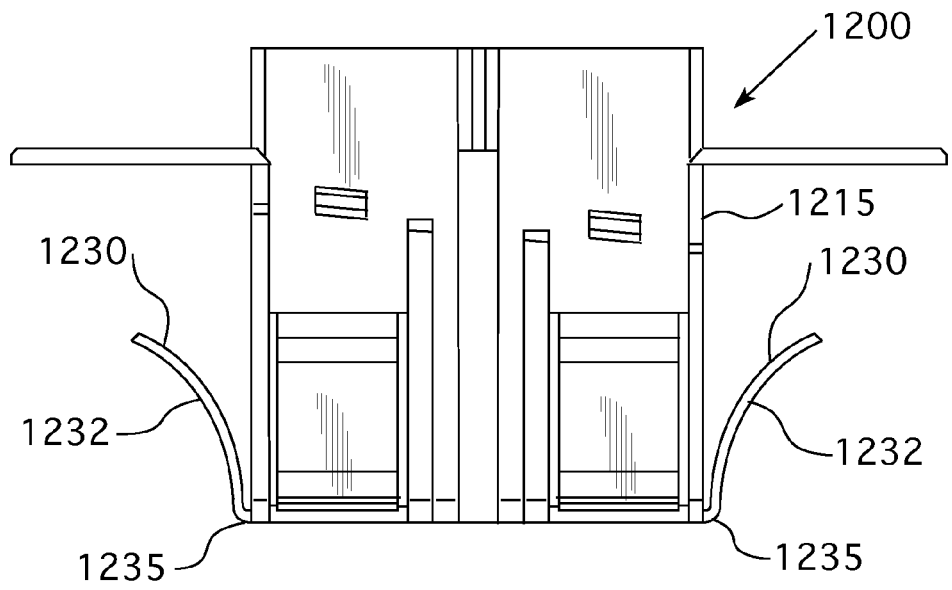
FIG. 76 is a side view of the electrical box of FIG. 75.

Also demonstrative of at least another embodiment including cantilevered anchoring members, FIG. 75 is a perspective view of a non-limiting embodiment of an electrical box 1200 for installation in ICF with curved, cantilevered anchoring members projecting 1230 outward from the box. FIG. 76 is a side view of the electrical box 1200 of FIG. 75. Anchoring members 1230 may not be pointed but may still become embedded in ICF material because of each members' 1230 geometry. For example, a cantilevered anchoring member may be a single wall protruding from a container. Such a single wall may be angled with respect to a wall of a container (see, e.g., anchoring members 1130a,b in FIG. 74). Alternatively, and as illustrated in FIGS. 75-76, more complex geometry of anchoring members may provide additional resistive force into ICF material. For example, cantilevered anchoring members 1230 may comprise a first wall 1235 protruding from the container 1215 and a curved wall 1232 extending from the first wall 1235. Further, the container may define at least one slot 1239 therein adjacent to first wall 1235. Accordingly, as box 1200 is pressed into a recess in ICF, the cantilevered anchoring members 1230 may move toward the container 1215 as first wall 1235 contacts the material of the ICF and is pushed toward and into slot 1239. Such motion causes the free end of curved wall 1232 of anchoring member 1230 to be further forced away from container 1215 and into the material of the ICF. The anchoring members 1230 thus may grip the container 1215 in the ICF in a press-fit-like fashion.

Further, electrical box 1200 may be similar to other electrical boxes described above. For example, ports 1260 may include integral molded clamps 1261 or other types of port components as described above. Positioning tabs 1220 and fastener holes 1241 may be also similar to that previously described with respect to electrical box 700. Additionally, electrical box 1200 may include captive nail guides 1242 for attaching the electrical box 1200 to a wood stud with a nail, for example, where it is undesirable to use fastener holes 1241.

Figure 77:
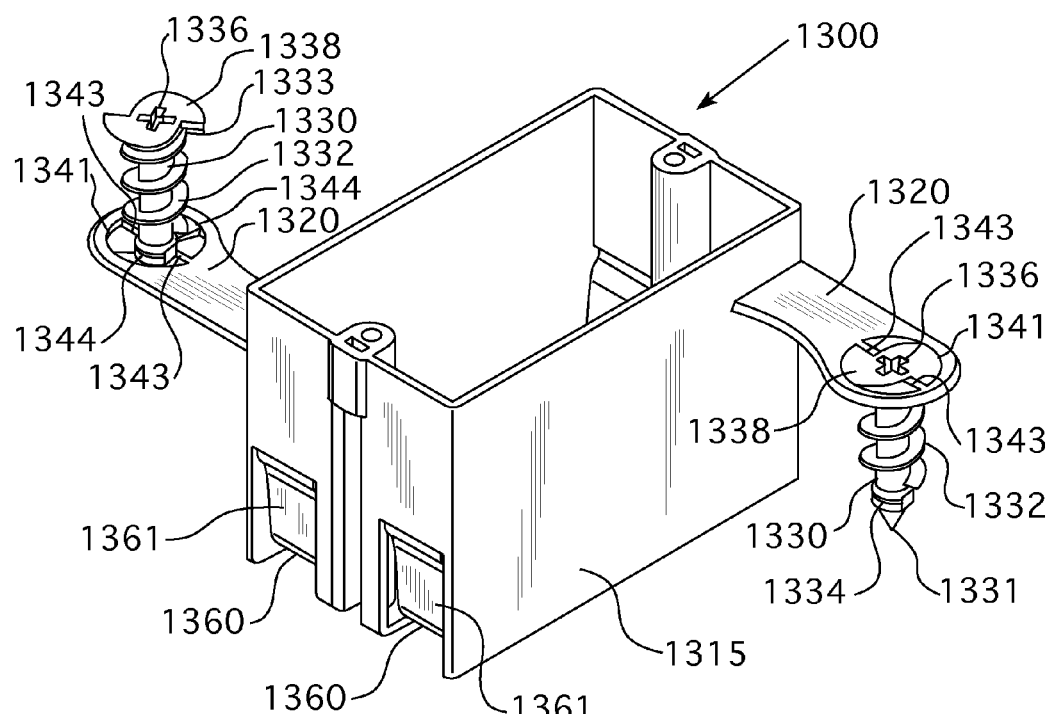
FIG. 77 is a perspective view of a non-limiting embodiment of an electrical box for installation in ICF with one helical anchoring member shown in a non-inserted position and another helical anchoring member in a fully inserted position.

In various embodiments and referring now to FIG. 77, an electrical box 1300 may be provided similar as described above, except at least the ICF anchoring structure may be a helical anchoring member 1330. For example, FIG. 77 is a perspective view of a non-limiting embodiment of an electrical box 1300 for installation in ICF with one helical anchoring member 1330 shown in a non-inserted position (the anchoring member 1330 to the left-most side of the figure) and another helical anchoring member 1330 in a fully inserted position (the anchoring member 1330 to the right-most side of the figure). At least one positioning tab 1320 may project from a wall of the container 1315 of the electrical box, and each positioning tab 1320 may define a hole 1341 therethrough, where each positioning tab 1320 also includes at least one stop 1343 formed therein. Further, each anchoring member 1330 may comprise helical threads 1332 extending from a user operable portion 1338 of the anchoring member 1330, where the anchoring member 1330 is configured to rotate in a first direction with respect to the positioning tab 1320 such that the helical threads 1332 are advanced through the hole 1341, and where the stop 1343 of the positioning tab 1320 is configured to engage the user operable portion 1338 such that further rotation in the first direction is inhibited once each anchoring member reaches the fully inserted position. This may be accomplished by the user operable portion 1338 including a side surface 1333 that may be sized and configured to engage a corresponding surface of stop 1343. The side surface 1333 and a surface of stop 1343 may be transverse to the desired rotation of helical anchoring member 1330. Additionally, rotation of helical anchoring member 1330 may interact with at least one angled wall 1344 formed in the positioning tab such that helical threads 1332 engage the angled wall 1344. Accordingly, rotation of helical anchoring member 1330 advances helical threads 1332 along angled wall 1344 and through hole 1341 until side surface 1333 contacts stop 1343. This inhibition of rotational movement in a direction prevents the helical anchoring member 1330 from being over rotated and, as a result, potentially over boring or stripping a hole created by the anchoring member 1330 in an ICF material. Formed in anchoring member 1330, near tip 1331 may also be a recess 1334 that is designed to receive angled wall 1344 to hold anchoring member 1330 in a storage or other non-inserted position as illustrated. Also, anchoring member 1330 may include a tool groove 1336 that may receive the head of a screwdriver, for example.

Further, electrical box 1300 may be similar to other electrical boxes described above. For example, ports 1360 may include integral molded clamps 1361 or other types of port components as described above.

Figure 78:
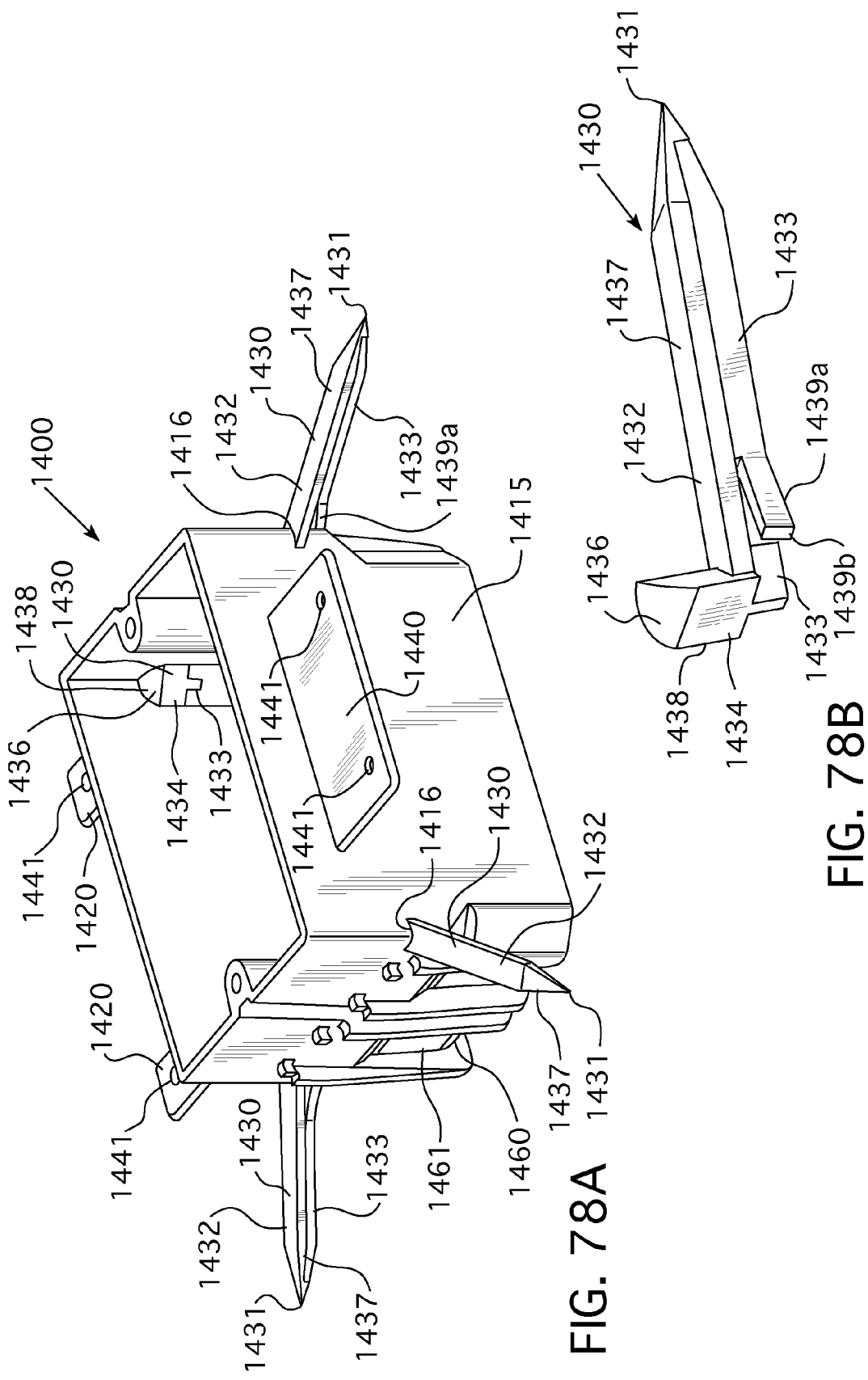
FIG. 78A is a perspective view of a non-limiting embodiment of an electrical box for installation in ICF with four locking anchoring members in fully inserted positions.
FIG. 78B is a perspective view of a locking anchoring member from the electrical box of FIG. 78A.

In various embodiments and referring now to FIGS. 78A-78B, an electrical box 1400 may be provided similar as described above, except at least the electrical box uses locking anchoring members 1430. Anchoring members may be movably connected to a container using a rotational or translational mechanism as described in various embodiments above. Alternatively, and as illustrated, anchoring members 1430 may be freely associated from container 1415 until pressed into fully inserted positions. For example, FIG. 78A is a perspective view of a non-limiting embodiment of an electrical box 1400 for installation in ICF with four locking anchoring members 1430 in fully inserted positions. FIG. 78B is a perspective view of a locking anchoring member 1430 from the electrical box 1400 of FIG. 78A. Each anchoring member 1430 may comprise an anchoring wall 1432 and a cantilevered arm 1439a extending from the anchoring wall 1432. As shown in FIG. 78A, a surface 1439b (see FIG. 78B) of cantilevered arm 1439a is configured to lock, in a snap-fit fashion, the anchoring member 1430 against a wall of container 1415 when the anchoring member 1430 is in the fully inserted position through a hole 1416 defined in a wall of container 1415. Each hole 1416 may be located at a different corner between two walls of container 1415, thereby spreading the contact area between an ICF and anchoring walls 1432 at approximately 45 degree angles to the respective walls.

Additionally, each anchoring member 1430 may comprise a finger operable portion 1438 and an insertable portion 1437 extending from the finger operable portion 1438. The insertable portion 1438 may include anchoring wall 1432 and may be sized and configured to pass through a hole 1416 in a wall of container 1415. However, the finger operable portion 1438 may be sized and configured such that the portion 1438 does not pass through the hole 1416, as shown in FIG. 78A. Further, the anchoring wall 1432 may be tapered and the insertable portion 1437 of anchoring member 1430 may also include a second tapered wall 1433 that tapers together with the anchoring wall to form a tip 1431. Corner hole 1416 through which tapered walls 1432, 1433 may pass, also may have a shape that is congruent to a cross-section of walls 1432, 1433.

Further, electrical box 1400 may be similar to other electrical boxes described above. For example, ports 1460 may include integral molded clamps 1461 or other types of port components as described above. Both large positioning tab 1440 and small positioning tabs 1420 may include fastener holes 1441 such that either side of electrical box may be attached to an object via holes 1441 if desired and as explained above.

FIGS. 79-83B and 86A-86B illustrate various embodiments of an electrical box, similar as described above, except at least including a port and a bracket clamp that may accommodate a variety of types of electrical cables. For example, referring now to FIGS. 79 and 81-83B, an electrical box 1500, 1700, 1900 may comprise a port 1560 defined in a wall of a container 1515, 1715, 1915, where the port 1560 is configured to insertably receive an electrical cable. Movably engaged with the container 1515, 1715, 1915 may be at least one bracket clamp 1561 that may comprise at least two legs, e.g. first leg 1567 and second leg 1568, protruding from a body 1569. Each bracket clamp 1561 may be moved within its respective port 1560. The two legs 1567, 1568 of each bracket clamp 1561 may be configured to engage an electrical cable when the bracket clamp 1561 is moved toward an electrical cable inserted in the port 1560. Each bracket clamp 1561 may be moved with respect to a port 1560 via a bracket screw 1562. The legs 1567, 1568 and the range of movement of bracket clamp 1561 within port 1560 make it possible for the port 1560 and bracket clamp 1561 combination to grip a variety of types of electrical cables, for instance, metallic sheathed (e.g. armored or BX) cables and/or non-metallic sheathed (e.g. plastic or NMD) cables without required disassembly, modification, and/or alteration of bracket clamp 1561.

With respect to each port 1560, bracket clamps are operably connected via screw holes 1566 (see FIG. 83A) to bracket screws 1562, which move bracket clamp 1561 toward and away from container 1515, 1715, 1915 when rotated by a driver, for example. Briefly, the electrical box may be initially supplied with the bracket clamps 1561 in an open or non-clamped position (see FIG. 81. for an example of contrasting clamp 1561 positions). When a user desires to insert a cable into the electrical box 1500, 1700, 1900, the user may break a knockout 1563 of a port 1560 from inside the electrical box 1500, 1700, 1900 by using a screwdriver, for example. Such a knockout 1563 can be seen from inside the electrical box as illustrated in FIG. 82; each knockout 1563 may include a thinned portion of material along its periphery to facilitate its breakage when desired. A cable (not shown) may be then inserted into container 1515, 1715, 1915 of electrical box 1500, 1700, 1900 via a port 1560. The cable may be inserted into the port 1560 at least until the cable reaches a back of port 1560, adjacent to where a knockout was previously located. Note that in FIGS. 79 and 81-82, knockouts 1563 of ports 1560 are not removed. After placement, the cable may be held in place by adjusting bracket screw 1562 to move the legs 1567, 1568 of bracket clamp 1561 toward and into contact with the cable. Screw 1562 may be then tightened sufficiently such that bracket clamp 1561 clamps cable within port 1560.

Figure 79:
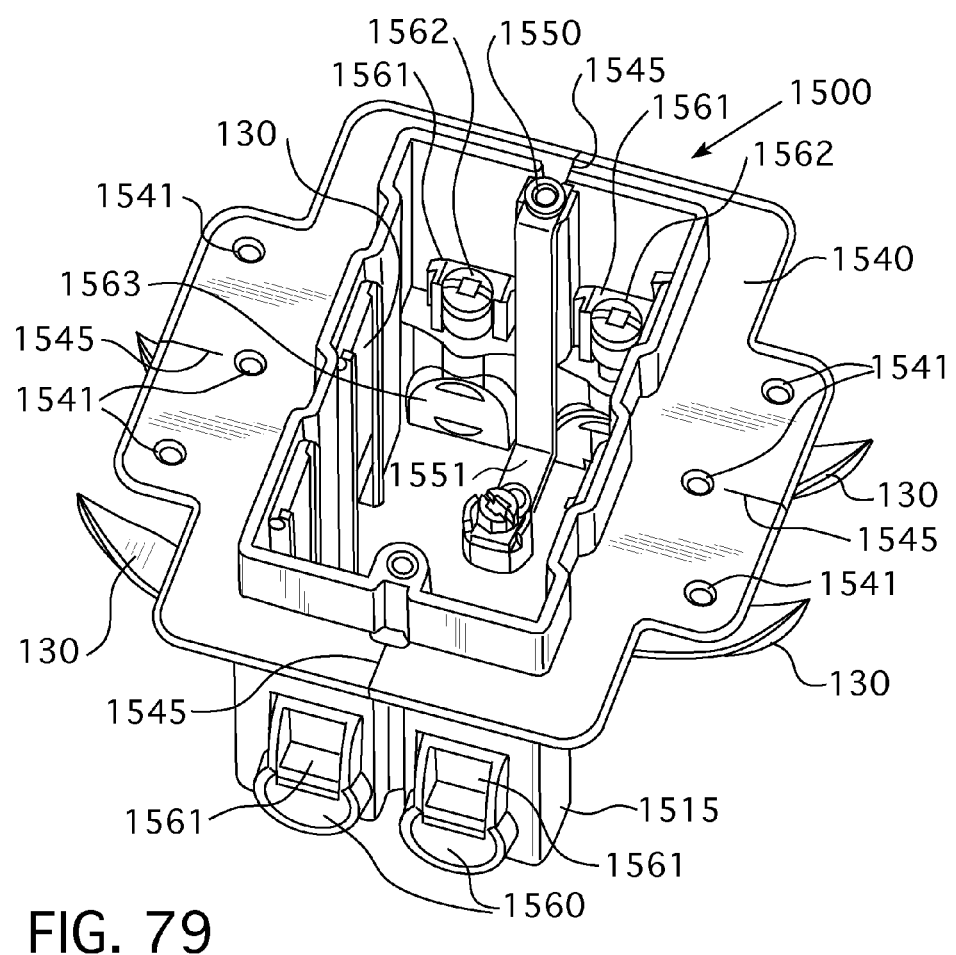
FIG. 79 is a perspective view of a non-limiting embodiment of a single-gang electrical box for installation in ICF with four anchoring members in inserted positions; the electrical box includes ports and plastic bracket clamps configured to receive either metallic sheathed cables or non-metallic sheathed cables without requiring alteration of the bracket clamps.

More specifically, FIG. 79 is a perspective view of a non-limiting embodiment of a single-gang electrical box 1500 for installation in ICF with four anchoring members 130 in inserted positions; the electrical box 1500 includes ports and plastic bracket clamps 1561 configured to receive either metallic sheathed cables or non-metallic sheathed cables without requiring alteration of the bracket clamps 1561. In addition to the above, the electrical box 1500 may be similar to those previously described, except for at least the following. The metallic grounding components 1551 may be mounted appropriately to at least one inside surface of container 1515 via a grounding fastener hole 1550 in the same. Also, positioning tab 1540 may extend around the entire perimeter of the shape of the container, to maximize the contact area between positioning tab 1540, an ICF surface, and/or a piece of drywall or other finishing materials, for example. Positioning tab 1540 may also include fastener holes 1541 and guide marks 1545 formed therein. The positioning tab may be larger at the fastener hole locations to provide for increased surface area contact between positioning tab and an external object to which the electrical box 1500 is mounted. Guide marks 1545 may allow for a series of electrical boxes 1500 to be positioned as desired, for instance they may be centered along a wall or walls in a room by using a laser level to align each box's 1500 guide marks 1545, for example.

Figure 80:
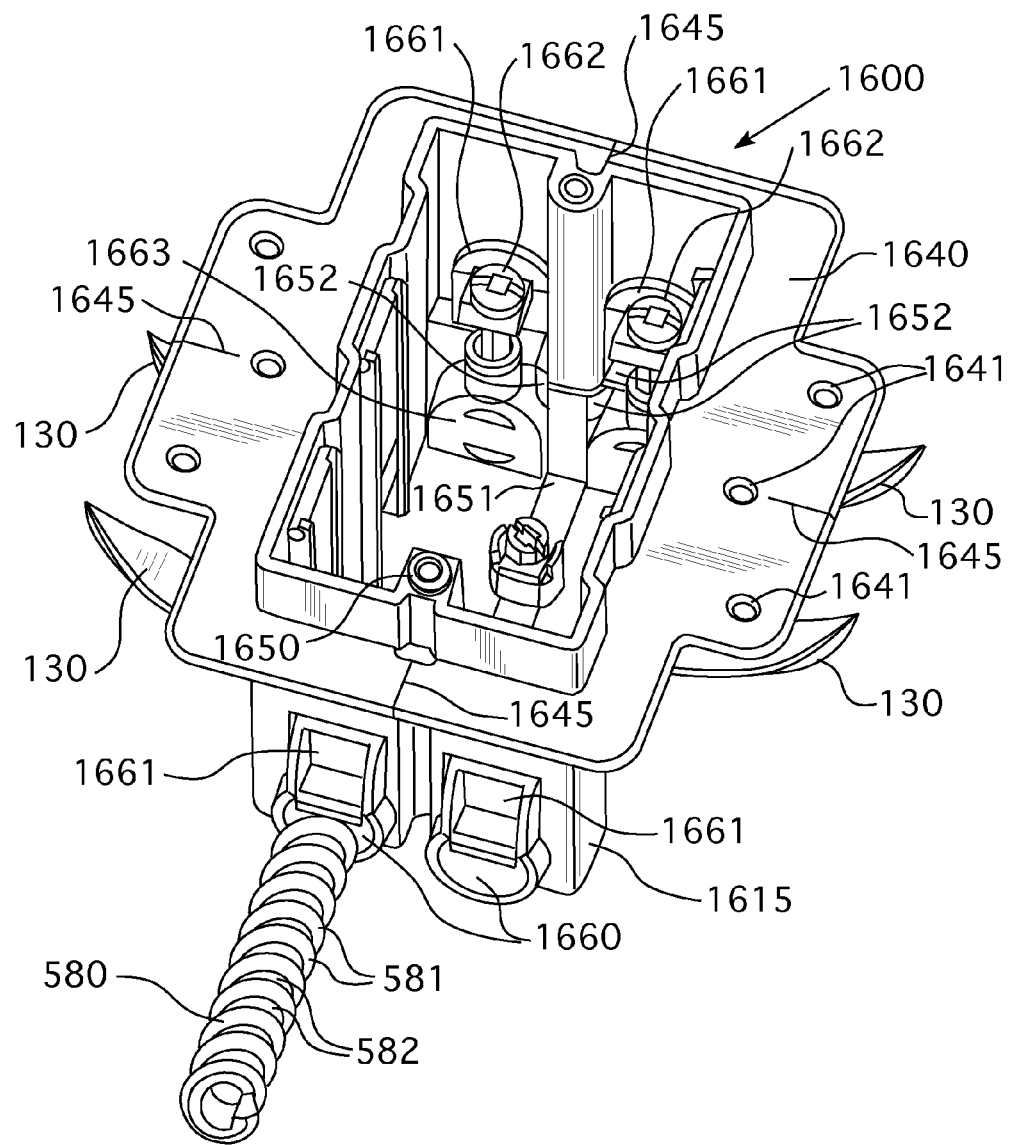
FIG. 80 is a perspective view of a non-limiting embodiment of a single-gang electrical box for installation in ICF with four anchoring members in inserted positions; the electrical box includes ports and steel bracket clamps configured to receive either metallic sheathed cables or non-metallic sheathed cables without requiring alteration of the bracket clamps; a metallic sheathed cable is shown inserted into a port with a bracket clamp engaged thereon.
Figure 81:
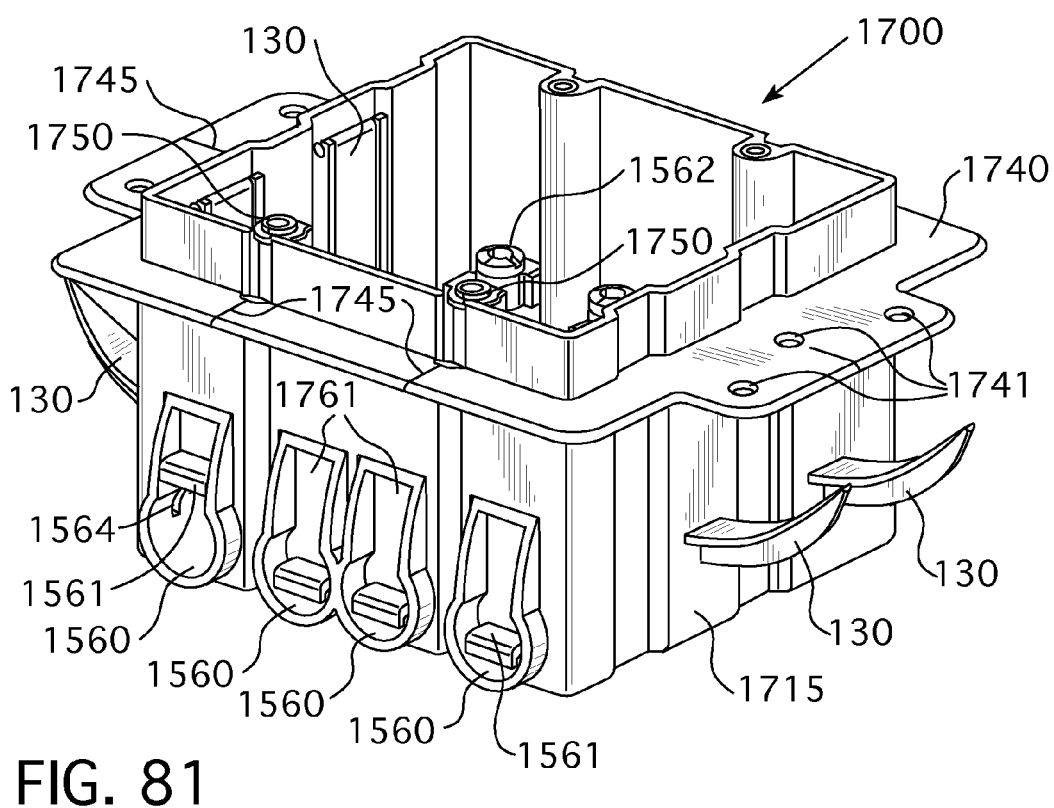
FIG. 81 is a perspective view of a non-limiting embodiment of a double-gang electrical box for installation in ICF with four anchoring members in inserted positions; the electrical box includes ports and plastic bracket clamps configured to receive either metallic sheathed cables or non-metallic sheathed cables without requiring alteration of the bracket clamps; three bracket clamps are shown in fully closed positions; one bracket clamp is shown in an open position.

The movement and configuration of each bracket clamp 1561 relative to port 1560 may be best understood with reference to FIGS. 81-83B. FIG. 81 is a perspective view of a non-limiting embodiment of a double-gang electrical box 1700 for installation in ICF with four anchoring members 130 in inserted positions; the electrical box 1700 includes ports 1560 and plastic bracket clamps 1561 configured to receive either metallic sheathed cables or non-metallic sheathed cables without requiring alteration of the bracket clamps; three bracket clamps 1560 are shown in fully closed positions, and one bracket clamp 1560 (the left-most one on the figure) is shown in an open position. FIG. 82 is a partial perspective view of the interior of a non-limiting embodiment of a single-gang electrical box 1900 for installation in ICF with the anchoring members removed; the electrical box includes ports 1560 and plastic bracket clamps 1561 configured to receive either metallic sheathed cables or non-metallic sheathed cables without requiring alteration of the bracket clamps 1561. FIG. 83A is a perspective view of a non-limiting embodiment of a bracket clamp 1561 that is configured to engage an electric cable. FIG. 83B is a side view of the bracket clamp 1561 of FIG. 83A. Container 1715, 1915 may also comprise at least one slot 1564 extending into each port 1560, where the bracket clamp 1561 is slidably engaged in the slot 1564 via wings 1565 extending from body 1569. The slot 1564 may extend a length into the port 1560, where the length may be dimensioned such that the bracket clamp 1561 may slidably engage either a metallic sheathed cable or a non-metallic sheathed cable without requiring alteration of the bracket clamp 1561. Accordingly, the port 1560 may be sized and configured to receive a metallic sheathed cable, which is typically larger in size than a non-metallic sheathed cable. Referring now to FIG. 80 for an exemplary metallic sheathed cable 580, the cable 580 may have a shape having a helical valley 582 defined by a helical rib 581. As can be seen in FIGS. 83A and 83B, the legs 1567, 1568 of the bracket clamp 1561 may be spaced apart from each other such that each leg 1567 and 1568 may engage a different portion of the helical valley 582 of the metallic sheathed cable 580. Thus, the spaced legs 1567, 1568 may securely grip the metallic sheathed cable 580 such that the latter does not significantly move with respect to the port 1560.

Figure 86A:
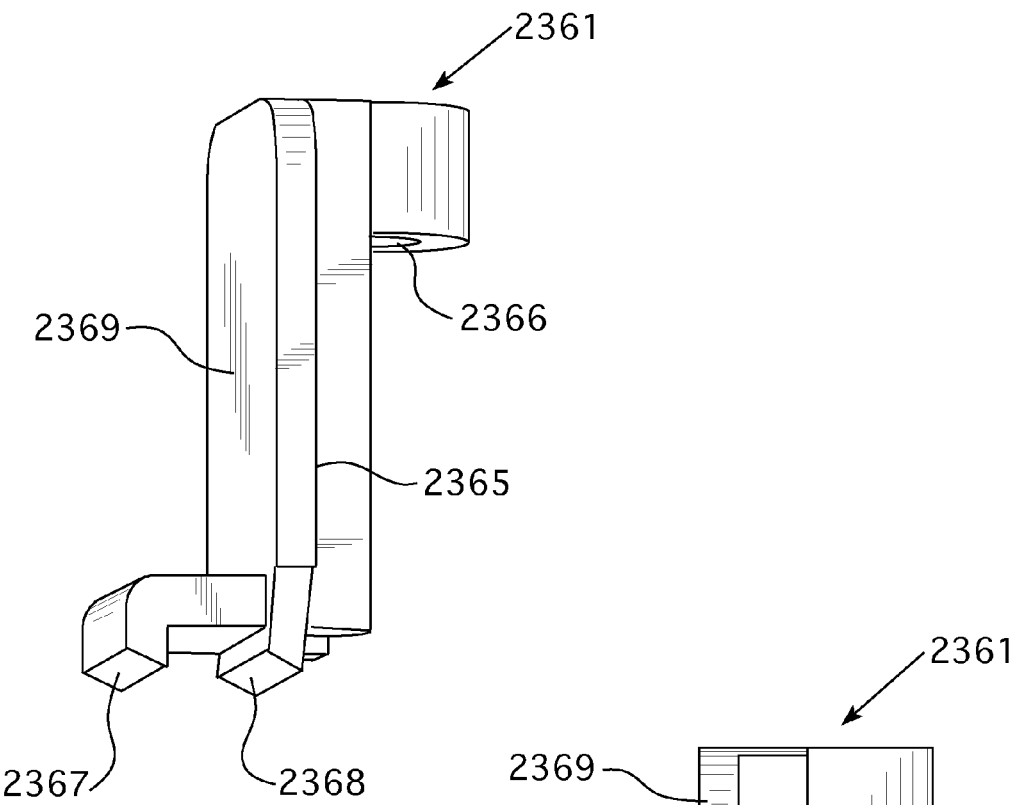
FIG. 86A is a perspective view of a non-limiting embodiment of an angled bracket clamp that is configured to engage an electric cable.
Figure 86B:
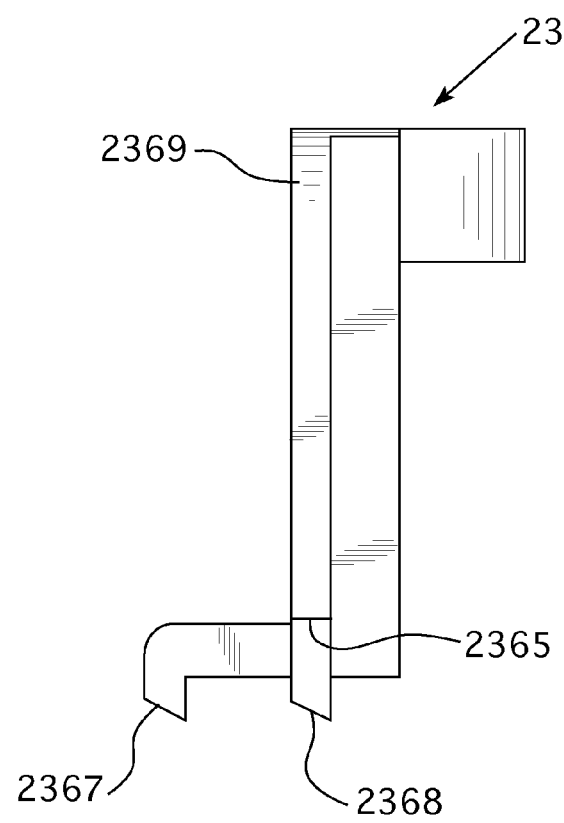
FIG. 86B is a side view of the angled bracket clamp of FIG. 86A.

Further, a bracket clamp may be provided which is also configured to effectively grip non-metallic, e.g. plastic, sheathed cable. FIG. 86A is a perspective view of a non-limiting embodiment of an angled bracket clamp 2361 that is configured to engage an electric cable. FIG. 86B is a side view of the angled bracket clamp 2361 of FIG. 86A. Bracket clamp 2361 is similar to bracket clamp 1561 described above and includes, among other things, a body 2369 with at least two legs 2367, 2368 protruding therefrom. Extending from body may also be wings 2365 which are configured to slidably engage a slot 1564 in a container 1515 (see FIGS. 81 and 82, for example). However, at least one of the legs 2367, 2368 of bracket clamp 2361 may also comprise at least two walls that are oblique to each to form an angled leg 2367, 2368, as illustrated. The angle of legs 2367, 2368 enables the bracket clamp 2361 to better grip or pinch a non-metallic sheathed cable inserted in a port of an electrical box. Accordingly, the legs 2367, 2368 may be both spaced apart to grip a metallic sheathed cable and angled to grip a non-metallic sheathed cable.

While plastic bracket clamps may be generally described above, metallic (e.g. steel) bracket clamps may also be used with an electrical box according to various embodiments. For example, FIG. 80 is a perspective view of a non-limiting embodiment of a single-gang electrical box for installation in ICF with four anchoring members 130 in inserted positions; the electrical box includes ports 1660 and steel bracket clamps 1661 configured to receive either metallic sheathed cables or non-metallic sheathed cables without requiring alteration of the bracket clamps 1661; a metallic sheathed cable 580 is shown inserted into a port 1660 with a bracket clamp 1661 engaged thereon. The steel bracket clamp 1661 may be generally similar in shape and function to bracket clamp 1561 and 2361 described above.

In addition to the above, electrical box 1600 may be similar to electrical boxes previously described, except at least for the following. As discussed above, the metallic grounding components 1651 may be mounted appropriately to at least one inside surface of container 1615 via a grounding fastener hole 1650. However, owing to the metallic material of bracket clamps 1661, the bracket clamps 1661 and/or bracket screws 1661 may be grounded via metallic grounding arms 1652 of grounding components 1651. Positioning tabs 1640, fastener holes 1641, and guide marks 1645 may be similar to that previously described with respect to electrical box 1500.

Figure 84:
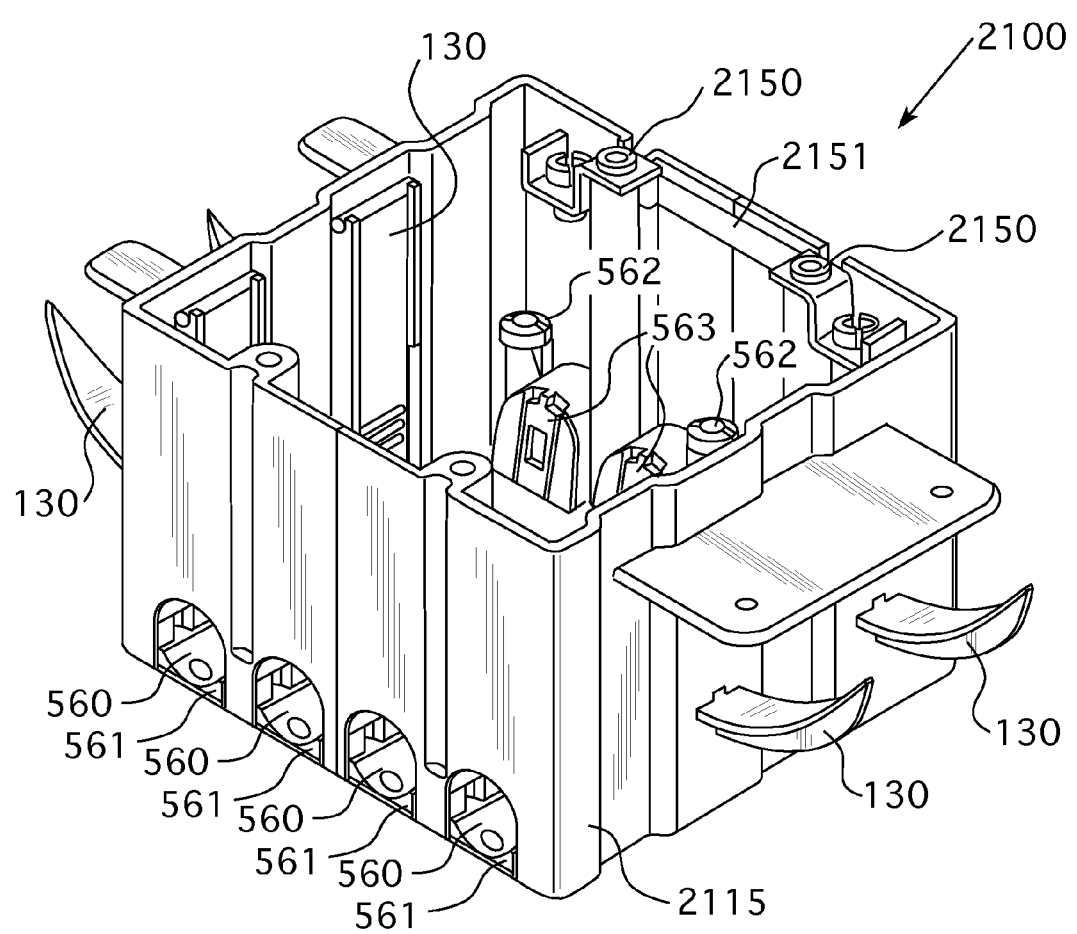
FIG. 84 is a perspective view of a non-limiting embodiment of a double-gang electrical box with anchoring members mounted therein; the electrical box has ports configured to receive metallic sheathed cables; the anchoring members are shown in inserted positions.
Figure 85:
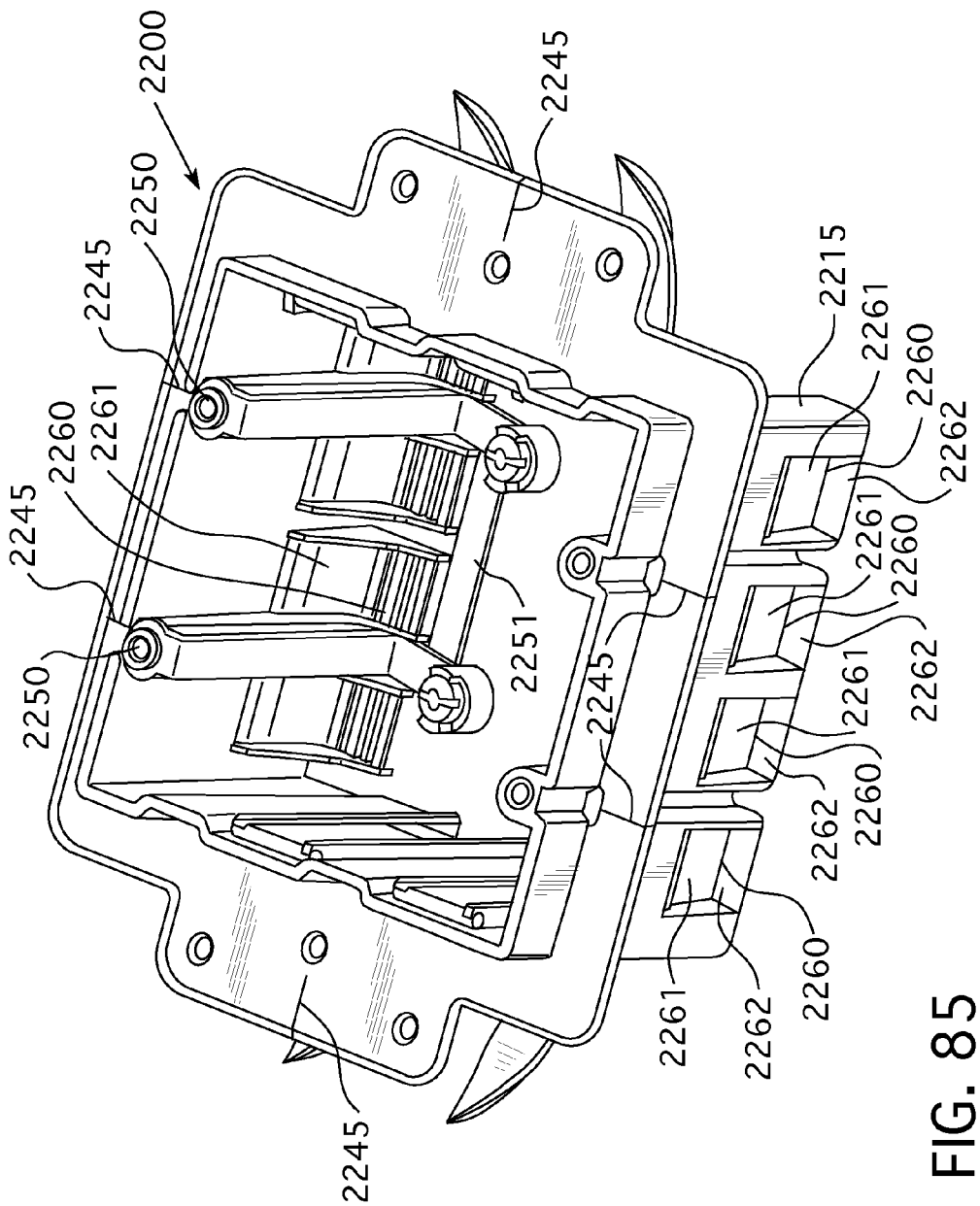
FIG. 85 is a perspective view of a non-limiting embodiment of a double-gang electrical box with anchoring members mounted therein; the electrical box has ports configured to receive non-metallic sheathed cables; each port has an angled integral molded clamp and a guide wall for receiving a non-metallic sheathed cable.

Various additional embodiments may be found in FIGS. 84 and 85. FIG. 84 is a perspective view of a non-limiting embodiment of a double-gang electrical box 2100 with anchoring members mounted 130 therein; the electrical box has ports 560 configured to receive metallic sheathed cables; the anchoring members 130 are shown in inserted positions. The ports 560 include bracket clamps 561, bracket screws 562, and knockouts 563 as previously described. Further, metallic grounding components 2151 may be configured to be flush with at least one upper surface of a wall of box 2100. The grounding components may be mounted appropriately to a container of electrical box 2100 via grounding fastener holes 2150 in the same.

FIG. 85 is a perspective view of a non-limiting embodiment of a double-gang electrical box 2200 with anchoring members 130 mounted therein; the electrical box 2200 has ports 2260 configured to receive non-metallic sheathed cables; each port has an angled integral molded clamp 2261 and a guide wall 2262 for receiving a non-metallic sheathed cable. Guide wall 2262 may serve as a guide or pocket to receive and align a non-metallic sheathed cable (e.g. an NMD cable) appropriately into port 2260.

Although various embodiments have been described herein, many modifications and variations to those embodiments may be implemented. For example, the electrical box can be sized and/or configured to hold at least a portion of various types and sizes of electrical devices in addition to outlets and switches. For instance, the electrical box may be sized and/or configured to hold, but is not limited to holding, electrical outlets, switches, receptacles, sockets, light switches, wall fixtures, ceiling fixtures, electrical junctions, control circuits, on-off switches, dimmer switches, ceiling fans, ceiling lights, wall lights, electrical components, and other electrical connections and/or controls. Further, the anchoring members may be of various styles that allow a user to operate the same without the use of a tool; for example, each anchoring member have a finger operable surface that is large enough for more than one finger and/or each anchoring member may have more than one insertable portion and/or the insertable portion may be of different shapes than shown herein. In addition, combinations of the described embodiments may be used. For example, an electrical box may have multiple types of ports, clamps, and/or brackets to support both non-metallic sheathed cables (e.g. "NMD" cables) and metallic sheathed cables (e.g. "armored" or "BX" cables). Also, where materials are disclosed for certain components, other materials may be used. The foregoing description and following claims are intended to convey and cover all such modification and variations.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. An electrical box, comprising:
   a container configured to receive an electrical device, wherein the container comprises at least one wall, the at least one wall defining a hole therethrough, wherein the at least one wall defines an opening sized and configured to insertably receive the electrical device; and
   at least one anchoring member operably connected to the container such that the anchoring member is movable between a storage position and an inserted position, wherein the anchoring member is movable between the storage position and the inserted position by a user without a tool, wherein the inserted position includes at least part of the anchoring member positioned outside the container and part of the anchoring member positioned within the hole, and wherein the anchoring member is configured to anchor the container to an object outside the container when the anchoring member is in the inserted position.

2. The electrical box of claim 1, wherein the anchoring member comprises a prong.

3. The electrical box of claim 1, further comprising a stop configured to releasably hold the anchoring member in the storage position.

4. The electrical box of claim 3, wherein the stop is a deformable stop.

5. The electrical box of claim 1, wherein the storage position includes the entire anchoring member positioned inside the container.

6. The electrical box of claim 5, wherein the container further comprises a deformable stop formed in the wall, wherein the stop extends into the hole such that a portion of the anchoring member is resisted from passing through the hole when the anchoring member is in the storage position.

7. The electrical box of claim 1, wherein the inserted position includes part of the anchoring member positioned outside the container and part of the anchoring member positioned inside the container.

8. The electrical box of claim 1, further comprising at least one positioning tab protruding from the wall of the container.

9. The electrical box of claim 8, wherein the positioning tab defines at least one fastener hole that is configured to receive at least one fastener for mounting the electrical box to an object.

10. The electrical box of claim 8, wherein the container comprises a shape having a perimeter, and wherein the positioning tab extends along the entire perimeter.

11. The electrical box of claim 1, comprising at least two of the anchoring members, wherein the at least two anchoring members are connected to each other.

12. The electrical box of claim 1, wherein the anchoring member is rotatably mounted to the container.

13. The electrical box of claim 12, wherein the opening of the container defines a plane, and wherein the anchoring member is rotatably mounted to the container such that the anchoring member may rotate about an axis that is parallel to the plane of the opening.

14. The electrical box of claim 12, wherein the opening of the container defines a plane, and wherein the anchoring member is rotatably mounted to the container such that the anchoring member may rotate about an axis that is perpendicular to the plane of the opening.

15. The electrical box of claim 1, wherein the anchoring member comprises a finger operable portion and an insertable portion extending from the finger operable portion, wherein the insertable portion is sized and configured to pass through the hole in the wall of the container, and wherein the finger operable portion is sized and configured such that it does not pass through the hole.

16. The electrical box of claim 15, wherein the anchoring member further comprises at least one hinge protrusion extending from the finger operable portion, and wherein the hinge protrusion is operably engaged with a hinge in the container to form a hinged joint about which the anchoring member may rotate.

17. The electrical box of claim 15, wherein the insertable portion of the anchoring member includes a first tapered wall and a second tapered wall that taper together to form a tip.

18. The electrical box of claim 17, wherein the hole in the wall of the container is congruent in shape to the combination of the first tapered wall and the second tapered wall.

19. The electrical box of claim 15, wherein the anchoring member further comprises a tool operable portion adjacent to the finger operable portion.

20. The electrical box of claim 1, wherein the anchoring member is configured to translate but not rotate about a fixed axis with respect to the container when moving from the storage position to the inserted position.

21. The electrical box of claim 1, wherein the electrical device is selected from the group consisting of electrical switches and electrical outlets.

22. The electrical box of claim 1, wherein the at least one wall of the container comprises an interior surface defining at least one recess formed therein, wherein the inserted position includes at least part of the anchoring member nested within the at least one recess.

23. The electrical box of claim 1, wherein the object outside the container is at least one insulated concrete form.

24. The electrical box of claim 1, wherein the object outside the container is at least one insulated concrete form made at least partially of foam.

25. The electrical box of claim 1, wherein the object outside the container is at least one insulated concrete form made at least partially of polystyrene.

26. The electrical box of claim 1, wherein the anchoring member is configured to anchor the container to an object outside the container without the use of a separate fastener when the anchoring member is in the inserted position.

27. A method for installing an electrical box, the method comprising the steps of:
   placing the electrical box into an electrical box recess in an insulated concrete form, wherein the electrical box comprises an container configured to receive an electrical device and an anchoring member movably connected to the electrical box; and pressing on the anchoring member with a person's hand without a tool such that the anchoring member moves from a storage position to an inserted position, wherein the inserted position includes at least part of the anchoring member embedded in at least a portion of the insulated concrete form.

28. The method of claim 1, further comprising the steps of positioning the electrical box against a surface of the insulated concrete form, creating a marking of at least a portion of the electrical box in the surface of the insulated concrete form, cutting into the surface and along the marking to free a portion of the insulated concrete form, and removing the freed portion to create the electrical box recess in the insulated concrete form.

\* \* \* \* \*